(12) United States Patent
Takeda et al.

(10) Patent No.: US 8,033,579 B2
(45) Date of Patent: Oct. 11, 2011

(54) FLUID DEVICE CONNECTING STRUCTURE

(75) Inventors: Hideyuki Takeda, Kasugai (JP);
Tetsuya Ishihara, Nagoya (JP); Ryo Muramatsu, Nagoya (JP)

(73) Assignee: CKD Corporation, Kamaki-Shi (JP)

( * ) Notice: Subject to any disclaimer, the term of this patent is extended or adjusted under 35 U.S.C. 154(b) by 284 days.

(21) Appl. No.: 12/230,401

(22) Filed: Aug. 28, 2008

(65) Prior Publication Data
US 2009/0091125 A1     Apr. 9, 2009

(30) Foreign Application Priority Data

| Oct. 5, 2007 | (JP) | ................................. 2007-262261 |
| Jul. 10, 2008 | (JP) | ................................. 2008-180545 |

(51) Int. Cl.
*F16L 23/08* (2006.01)
*F16L 23/16* (2006.01)

(52) U.S. Cl. .......................... 285/367; 285/112; 285/336

(58) Field of Classification Search .................. 285/367, 285/365, 366, 39, 112, 336; 24/19, 279, 24/282, 24, 20 LS, 28; 248/74.1, 74.4; 411/6–8, 411/327, 329, 951, 508, 913
See application file for complete search history.

(56) References Cited

U.S. PATENT DOCUMENTS

| 1,362,784 | A | * | 12/1920 | Cooper | .................. 24/282 |
| 1,928,122 | A | * | 9/1933 | Bennett | .................. 285/112 |
| 2,338,006 | A | * | 12/1943 | Morehouse | |
| 3,141,685 | A | * | 7/1964 | Watts | .................. 285/93 |
| 4,202,568 | A | * | 5/1980 | Strom | .................. 285/365 |
| 4,795,197 | A | * | 1/1989 | Kaminski et al. | |
| 5,018,768 | A | * | 5/1991 | Palatchy | .................. 285/367 |
| 5,377,940 | A | * | 1/1995 | Cabe et al. | |
| 5,466,018 | A | * | 11/1995 | Stobbart | .................. 285/334.2 |
| 5,947,533 | A | * | 9/1999 | Fisher et al. | .................. 285/350 |

(Continued)

FOREIGN PATENT DOCUMENTS

JP       U-60-29992       2/1985

(Continued)

OTHER PUBLICATIONS

Japanese Office Action issued on Nov. 10, 2009 in Japanese Patent Application No. 2008-180545 (with translation).

*Primary Examiner* — James Hewitt
(74) *Attorney, Agent, or Firm* — Oliff & Berridge, PLC

(57) ABSTRACT

For simply and reliably coupling first and second fluid devices, a fluid device connecting structure is arranged to couple first and second connection parts of the first and second fluid devices by use of a coupling member by placing a resin seal member in seal grooves formed in the connection parts. The first connection part includes a first mounting groove for attachment jig and a first fitting groove provided between the first mounting groove and an end face of the first connection part to receive the coupling member. The second connection part includes a second mounting groove for the jig and a second fitting groove provided between the second mounting groove and an end face of the second connection part to receive the coupling member. The coupling member includes a plurality of split members each including a first projecting portion held in contact with an end-face-side inside surface of the first fitting groove and a second projecting portion held in contact with an end-face-side inside surface of the second fitting groove, the first and second projecting portions being arranged at a predetermined distance.

8 Claims, 35 Drawing Sheets

U.S. PATENT DOCUMENTS

| | | | | |
|---|---|---|---|---|
| 6,070,912 | A * | 6/2000 | Latham | 285/61 |
| 6,709,212 | B1 * | 3/2004 | Lauchner | 411/913 |
| 7,581,764 | B2 * | 9/2009 | Ishihara | 285/336 |
| 2005/0212291 | A1 * | 9/2005 | Edwards | 285/364 |

FOREIGN PATENT DOCUMENTS

| | | |
|---|---|---|
| JP | A-2002-161992 | 6/2002 |
| JP | A-2004-197826 | 7/2004 |
| JP | A-2006-064080 | 3/2006 |
| JP | A-2006-144948 | 6/2006 |

\* cited by examiner

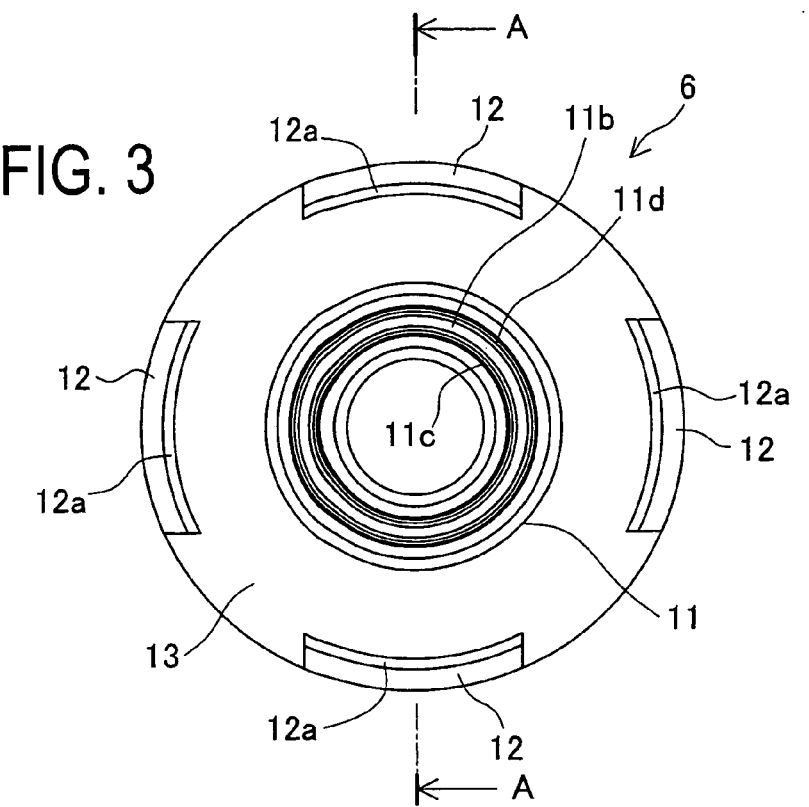
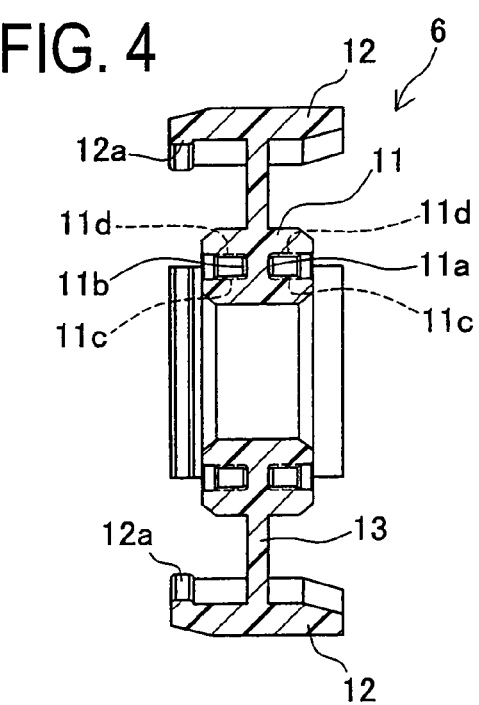

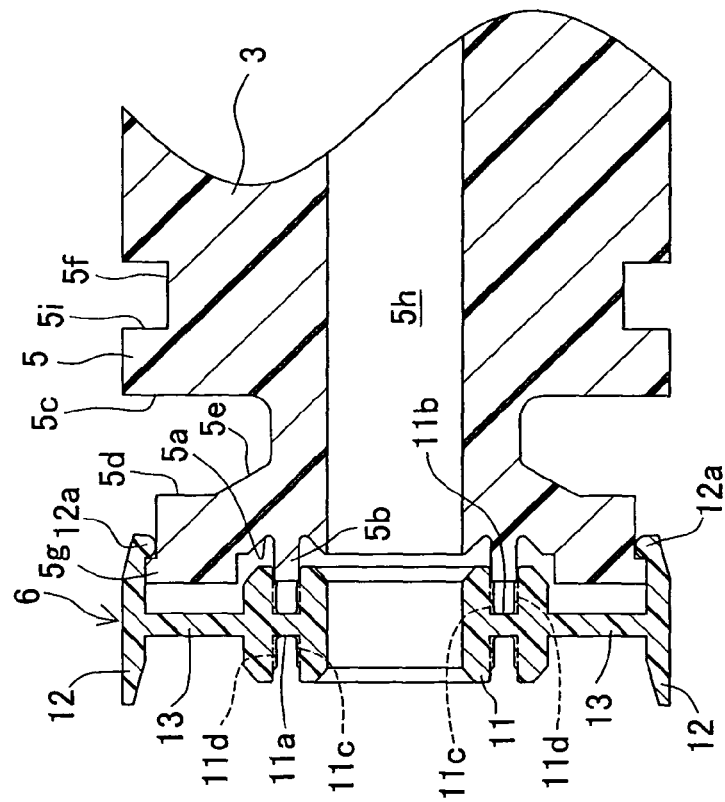
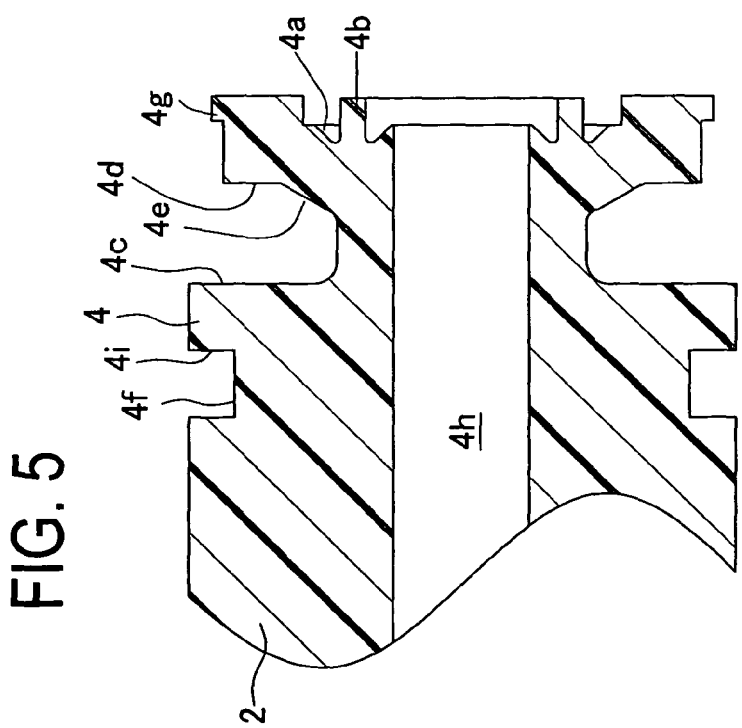
FIG. 5

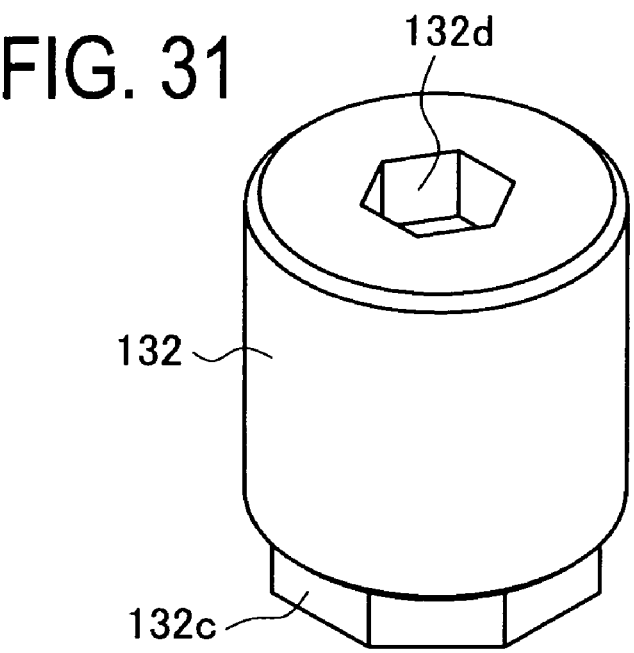
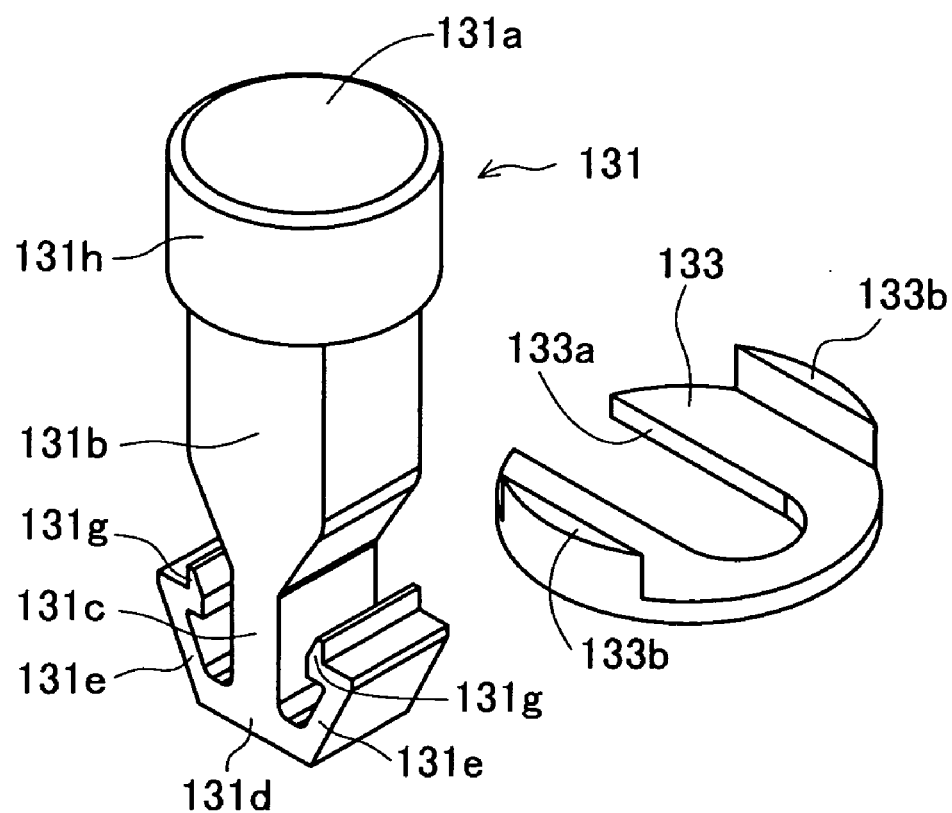
FIG. 31

FLUID DEVICE CONNECTING STRUCTURE

BACKGROUND OF THE INVENTION

1. Field of the Invention

The present invention relates to a fluid device connecting structure for coupling first and second fluid devices with a connection member, and a fluid device unit.

2. Description of Related Art

Heretofore, in a semiconductor manufacturing process, a liquid crystal manufacturing process, etc., various fluid devices have been used for control of chemical liquids. For example, the fluid devices may include valves such as a flow rate control valve and an opening/closing valve, filters, sensors such as a pressure sensor and a flow rate sensor, and piping blocks such as a joint block and a passage block. Recently, connection parts of those fluid devices are directly connected to each other with a coupling member to form an integral unit for a compact apparatus.

FIG. 45 is a sectional view of a conventional fluid device connecting structure 1100.

This conventional fluid device connecting structure 1100 is arranged such that first and second fluid devices 1101 and 1102 have connection parts 1103 and 1104 formed with seal grooves 1105 and 1106 respectively, between which a seal member 1107 is fitted, and a coupling member 1108 is mounted on the periphery of connecting portions of the connection parts 1103 and 1104.

The coupling member 1108 includes a cylindrical nut 1109 and a split ring 1110. The cylindrical nut 1109 has a cylindrical shape with one open end. The other closed end is formed with an insertion hole 1109a in which a protrusion 1104a of the connection part 1104 is inserted. The split ring 1110 has an annular shape including an inner surface that contacts an outer surface of the connection part 1104 and an outer surface that contacts an inner surface of the nut 1109. This ring 1110 is constituted of a plurality of split pieces so as to be mounted on the outer surface of the connection part 1104.

The coupling member 1108 is mounted in such a way that an end of the connection part 1104 of the second fluid device 1102 is inserted in the nut 1109 through the insertion hole 1109a, then the nut 1109 is displaced toward the second fluid device 1102 to expose the connection part 1104 as shown by a dashed line in FIG. 45, and then the split ring 1110 is fit on the outer surface of the connection part 1104. After that, as shown in a solid line in FIG. 45, the nut 1109 is slid toward the first fluid device 1101, internal threads 1109b formed on an inner surface of the nut 1109 are engaged with external threads 1103a formed on an outer surface of the connection part 1103 of the first fluid device 1101. The nut 1109 is screwed on the connection part 1103 until the split ring 1110 abuts on the protrusion 1104a of the connection part 1104. This screw feed allows the seal member 1107 to be fitted in the seal grooves 1105 and 1106, thus sealing the connecting portions of the connection parts 1103 and 1104 (for example, see JP2006-64080A).

However, to mount the split ring 1110, the conventional fluid device connecting structure 1100 needs a space for allowing movement of the nut 1109 and a space for screwing the nut 1109 on the connection part 1103. This would require troublesome works and working space for coupling the fluid devices. Accordingly, when the conventional fluid device connecting structure 1100 is applied to a semiconductor manufacturing apparatus in which a number of fluid devices are arranged in complicated pattern, a space for sliding or screwing the nut 1109 on the connection part 1103 could not be ensured. It would take much time to screw the nut 1109 on the connection part 1103 properly to provide predetermined sealing strength.

SUMMARY OF THE INVENTION

The present invention has been made in view of the above circumstances and has an object to overcome the above problems and to provide a fluid device connecting structure capable of easily and reliably coupling first and second fluid devices, and a fluid device unit.

To achieve the purpose of the invention, there is provided a fluid device connecting structure comprising: a first fluid device including a first connection part made of resin, a passage having an open end in an end face of the first connection part, and a seal groove formed in the end face of the first connection part around the open end of the passage; a second fluid device including a second connection part made of resin, a passage having an open end in an end face of the second connection part, and a seal groove formed in the end face of the second connection part around the open end of the second passage; a seal member placed between the seal grooves of the first and second connection parts; and a coupling member made of resin configured to couple the first and second connection parts to each other so that the seal member is placed between the seal grooves of the first and second connection parts, wherein the first connection part includes: a first mounting groove formed on an outer periphery of the first connection part; and a first fitting groove formed between the first mounting groove and the end face of the first connection part, the first fitting groove being configured to receive the coupling member, the second connection part includes: a second mounting groove formed on an outer periphery of the second connection part; and a second fitting groove formed between the second mounting groove and the end face of the second connection part, the second fitting groove being configured to receive the coupling member, and the coupling member includes a plurality of split members each including a first projecting portion held in contact with an end-face-side inside surface of the first fitting groove and a second projecting portion held in contact with an end-face-side inside surface of the second fitting groove, the first and projecting portions being arranged at a predetermined distance.

According to another aspect, the invention provides a fluid device unit in which a plurality of fluid devices is coupled by use of the above fluid device connecting structure.

BRIEF DESCRIPTION OF THE DRAWINGS

FIG. 3 is a plan view of a seal member;

FIG. 4 is a sectional view of the seal member taken along a line A-A in FIG. 3;

FIG. 5 is an exploded sectional view of first and second connection parts and the seal member;

FIG. 31 is an exploded view of the clamping member of FIG. 30;

DETAILED DESCRIPTION OF THE PREFERRED EMBODIMENTS

A detailed description of preferred embodiments of a fluid device connecting structure and a fluid device unit embodying the present invention will now be given referring to the accompanying drawings.

First Embodiment

<Entire Configuration of Fluid Device Unit>

Figure 13:
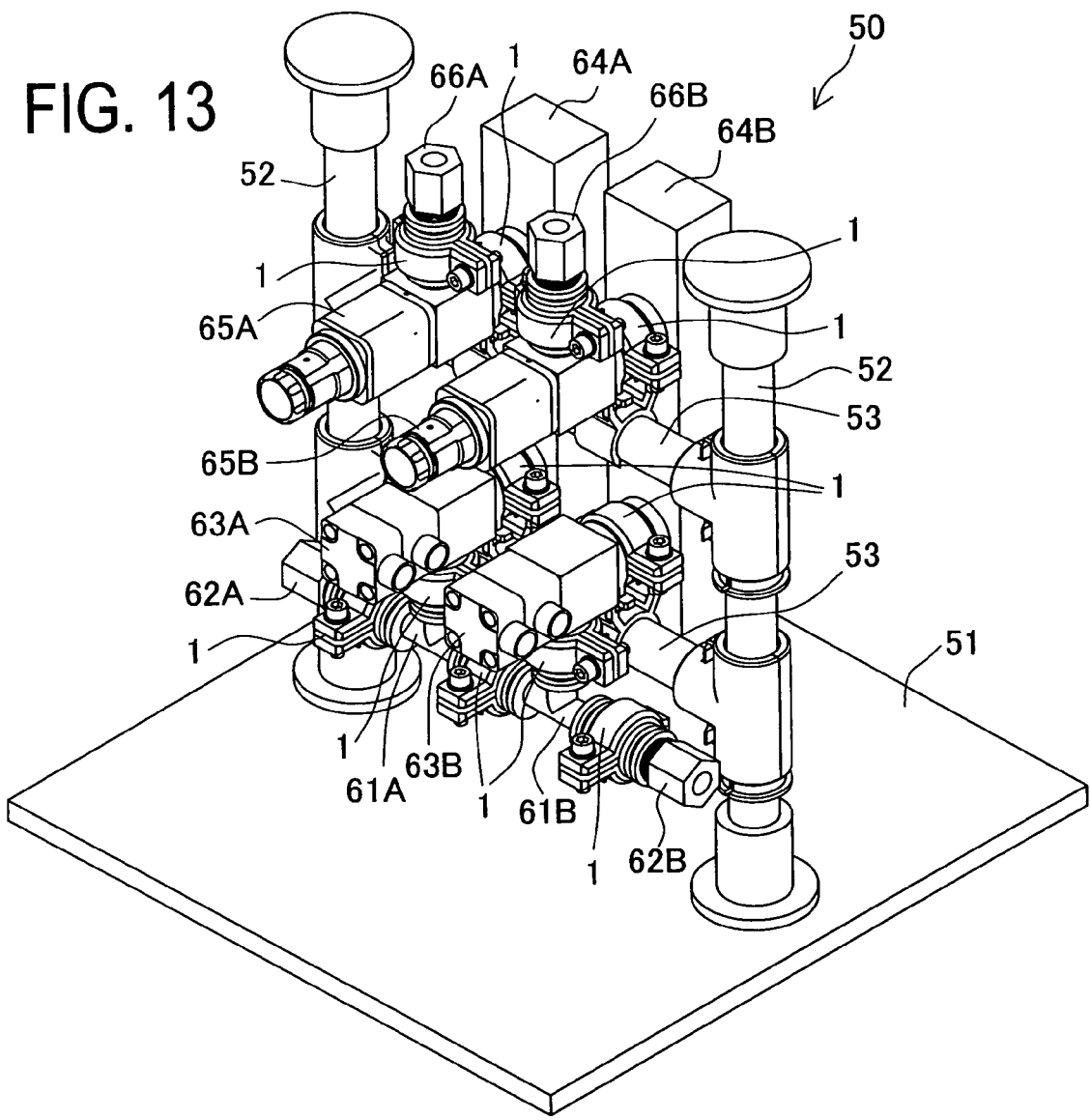
FIG. 13 is an external perspective view of a fluid device unit utilizing the fluid device connecting structure of FIG. 1.

FIG. 13 is an external perspective view of a fluid device unit 50 utilizing a fluid device connecting structure 1 of the first embodiment.

The fluid device connecting structure 1 of this embodiment is applied to the fluid device unit 50 to be used for example in a semiconductor manufacturing process. The fluid device unit 50 is placed for example upstream of a processing chamber to be used in the semiconductor manufacturing process to control a flow rate of a chemical liquid to be supplied to wafer. In the fluid device unit 50, branch pipes 61A and 61B, joints 62A and 62B, air-operated valves 63A and 63B, flowmeters 64A and 64B, manual valves 65A and 65B, and joints 66A and 66B, which are examples of the "fluid device", are coupled by use of the fluid device connecting structures mentioned later. The fluid device unit 50 is attached on mounting shafts 53 provided extending between two columns 52 vertically placed on a mounting plate 51, so that the above fluid devices are disposed in three-dimensional arrangement.

Such fluid device unit 50 is configured such that a chemical liquid flowing from the joint 62A to the joint 62B through the branch pipes 61A and 61B is distributed to the air-operated valves 63A and 63B through the branch pipes 61A and 61B, and passes through the flow meters 64A and 64B, and then is outputted from the joints 66A and 66B through the manual valves 65A and 65B.

The fluid device unit 50 is sometimes used for a highly corrosive chemical liquid. Therefore the fluid devices constituting the fluid device unit 50, namely, the air-operated valves 63A and 63B, flowmeters 64A and 64B, manual valves 65A and 65B, branch pipes 61A and 61B, and joints 62A, 62B, 66A, and 66B are made of resin resistant to corrosion such as PFA (Tetra fluoro ethylene-perfluoro alkylvinyl ether copolymer), PTFE (polytetrafluoroethylene), PP (polypropylene), PPS (polyphenylene sulfide), excepting components needing to be made of metal or rubber for respective functions.

<Entire Configuration of Fluid Device Connecting Structure>

Figure 1:
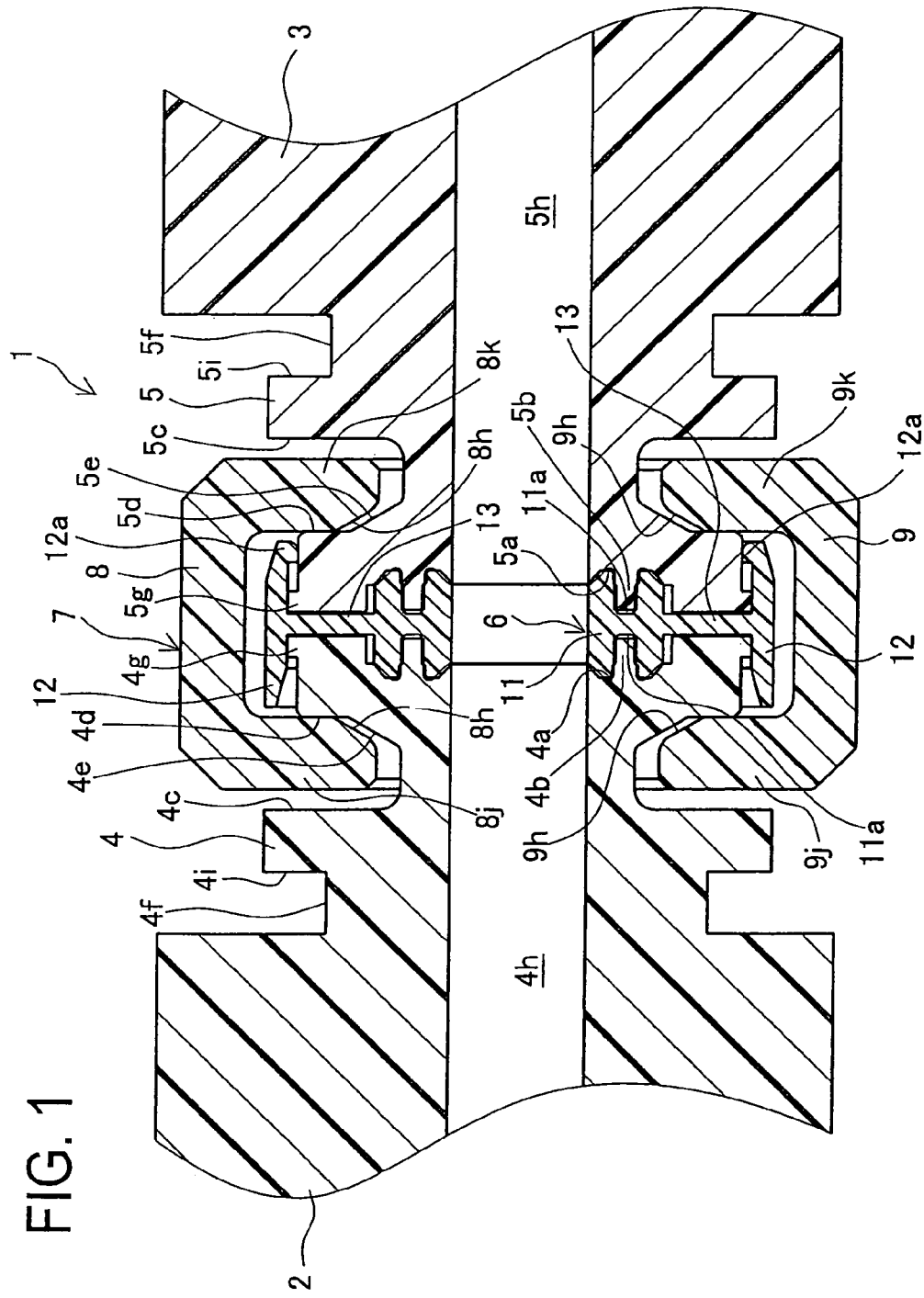
FIG. 1 is a sectional view of a fluid device connecting structure in a first embodiment according to the present invention.
Figure 2:
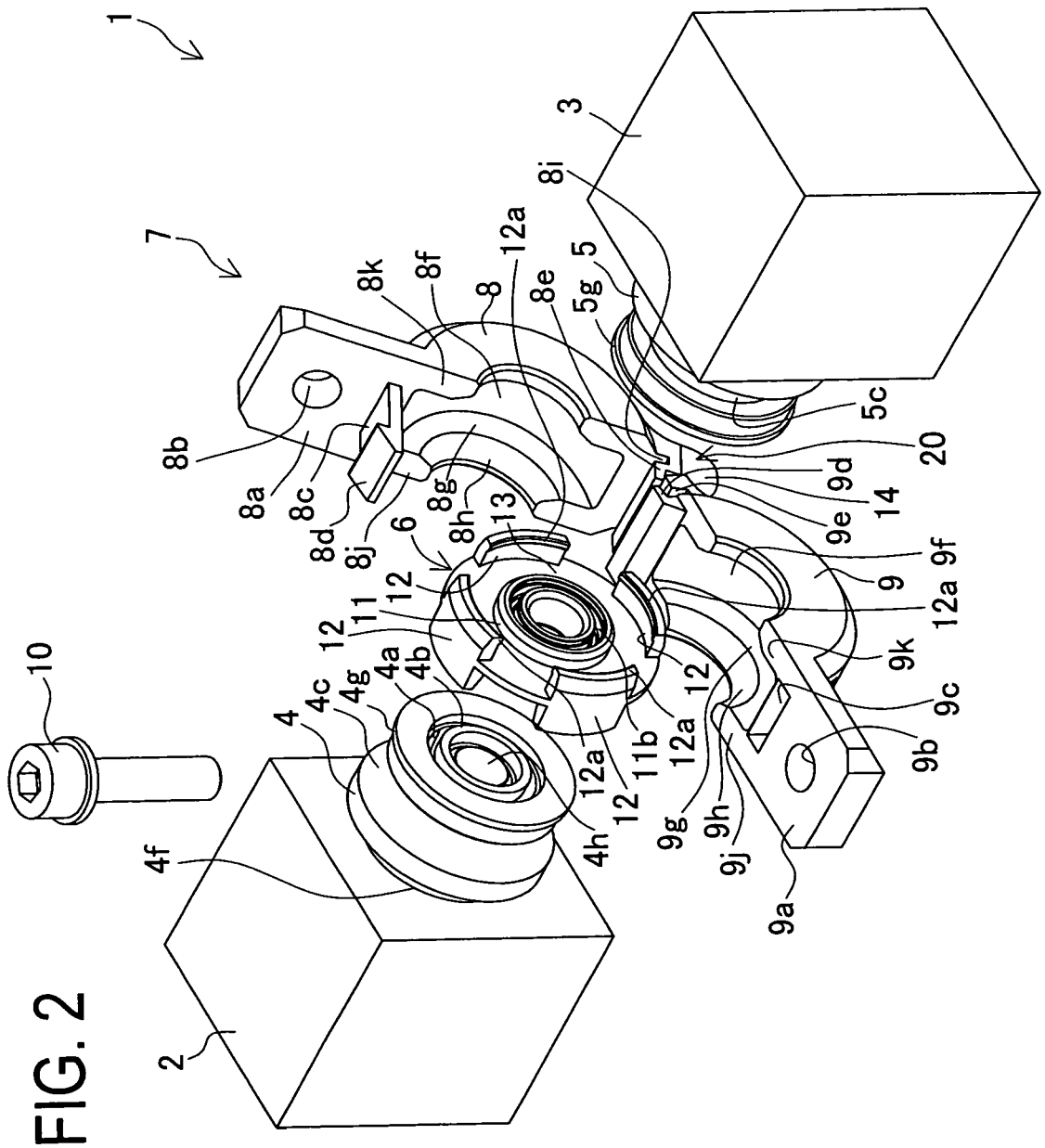
FIG. 2 is an exploded perspective view of the fluid device connecting structure of FIG. 1.

FIG. 1 is a sectional view of the fluid device connecting structure 1 of the first embodiment. FIG. 2 is an exploded perspective view of the fluid device connecting structure 1 of FIG. 1.

The fluid device connecting structure 1 includes a resin seal member 6 placed between first and second connection parts 4 and 5 of first and second fluid devices 2 and 3, and a coupling member 7 for coupling the first and second connection parts 4 and 5. The first and second fluid devices 2 and 3 correspond to the branch pipes 61A and 61B, joints 62A and 62B, air-operated valves 63A and 63B, flowmeters 64A and 64B, manual valves 65A and 65B, and joints 66A and 66B shown in FIG. 13.

<Configuration of First and Second Connection Parts>

FIG. 5 is an exploded sectional view of the first and second connection parts 4 and 5 and the seal member 6 shown in FIG. 1.

The first and second connection parts 4 and 5 are each made of fluorocarbon resin such as PTFE having heat resistance and corrosion resistance. The first and second connection parts 4 and 5 have the same structure.

Specifically, the first and second connection parts 4 and 5 have a cylindrical shape formed with fluid passages 4h and 5h having open ends. The first and second connection parts 4 and 5 are formed with seal grooves 4a and 5a around respective passage open ends in respective end faces. In the seal grooves 4a and 5a, annular protrusions 4b and 5b are provided concentric with the passages 4h and 5h respectively. The first and second connection parts 4 and 5 are provided with flanges 4g and 5g extending outward from outer peripheries of the end faces, respectively.

The first and second connection parts 4 and 5 are formed, on outer peripheries, with first and second circumferential mounting grooves 4f and 5f respectively for attachment of a jig 15 mentioned later. An end-face-side inside surface 4i of the first mounting groove 4f is parallel with the end face of the first connection part 4 and flat perpendicular to an axis line of the passage 4h. Similarly, an end-face-side inside surface 5i of the second mounting groove 5f is parallel with the end face of the second connection part 5 and flat perpendicular to an axis line of the passage 5h.

The first connection part 4 includes a first circumferential fitting groove 4c between the first mounting groove 4f and the end face of the first connection part 4. The second connection part 5 includes a second circumferential fitting groove 5c between the second mounting groove 5f and the end face of the second connection part 5. The first and second fitting grooves 4c and 5c are formed to have a depth corresponding to the annular protrusions 4b and 5b respectively in FIG. 5. An end-face-side inside surface 4d of the first fitting groove 4c is parallel with the end face of the first connection part 4 and flat perpendicular to the axis line of the passage 4h. Similarly, an end-face-side inside surface 5d of the second fitting groove 5c is parallel with the end face of the second connection part 5 and flat perpendicular to the axis line of the passage 5h. The first and second fitting grooves 4c and 5c include tapers 4e and 5e closer to the bottom sides than the end-face-side inside surfaces 4d and 5d. The tapers 4e and 5e are formed so that the groove widths of the first and second fitting grooves 4c and 5c are decreased toward the bottom sides of the first and second grooves 4c and 5c.

<Seal Member>

FIG. 3 is a plan view of the seal member 6 shown in FIG. 1. FIG. 4 is a sectional view of the seal member 6 taken along a line A-A in FIG. 3.

The seal member 6 is made of resin such as PFA, hard and resistant to corrosive, and provided with a body part 11, lugs 12, and an extended part 13.

As shown in FIGS. 3 and 4, the body part 11 is formed in a short cylindrical shape. The body part 11 is formed with circumferential grooves 11a and 11b (an example of the "annular groove") on both end faces, taking a symmetric H-shaped section as shown in FIG. 4. These grooves 11a and 11b are engageable with the annular protrusions 4b and 5b of the first and second connection parts 4 and 5. The circumferential grooves 11a and 11b are designed to have a width equal to or slightly smaller than the thickness of the annular protrusions 4b and 5b, as shown in FIG. 5. The circumferential grooves 11a and 11b are respectively provided with press-fit allowances 11c and 11d in inside inner walls and outside inner walls closer to the bottoms than the openings so that the widths of the grooves 11a and 11b closer to respective bottoms are smaller than the thickness of the annular protrusions 4b and 5b as shown in FIG. 5. The body part 11 of the seal member 6 has an inner surface and an outer surface which are partly slant as shown in FIG. 4 in conformity to slant bottoms of the seal grooves 4a and 5a (see FIG. 5). This can prevent the circumferential grooves 11a and 11b of the seal member 6 to widen when the annular protrusions 4b and 5b of the first and second connection parts 4 and 5 are press fitted in the grooves 11a and 11b of the seal member 6, to avoid a decrease in sealing strength.

As shown in FIGS. 3 and 4, the seal member 6 includes the extended portion 13 extending outward from the outer surface of the body part 11. This extended portion 13 is formed circumferentially along the outer surface of the body part 11. At an outer edge of the extended portion 13, a plurality of lugs 12 spaced at predetermined intervals is integrally provided. Each lug 12 includes a hooked portion 12a protruding radially inward (toward the center) to be engaged with the protrusions 4g and 5g of the first and second connection parts 4 and 5.

<Coupling Member>

Figure 6:
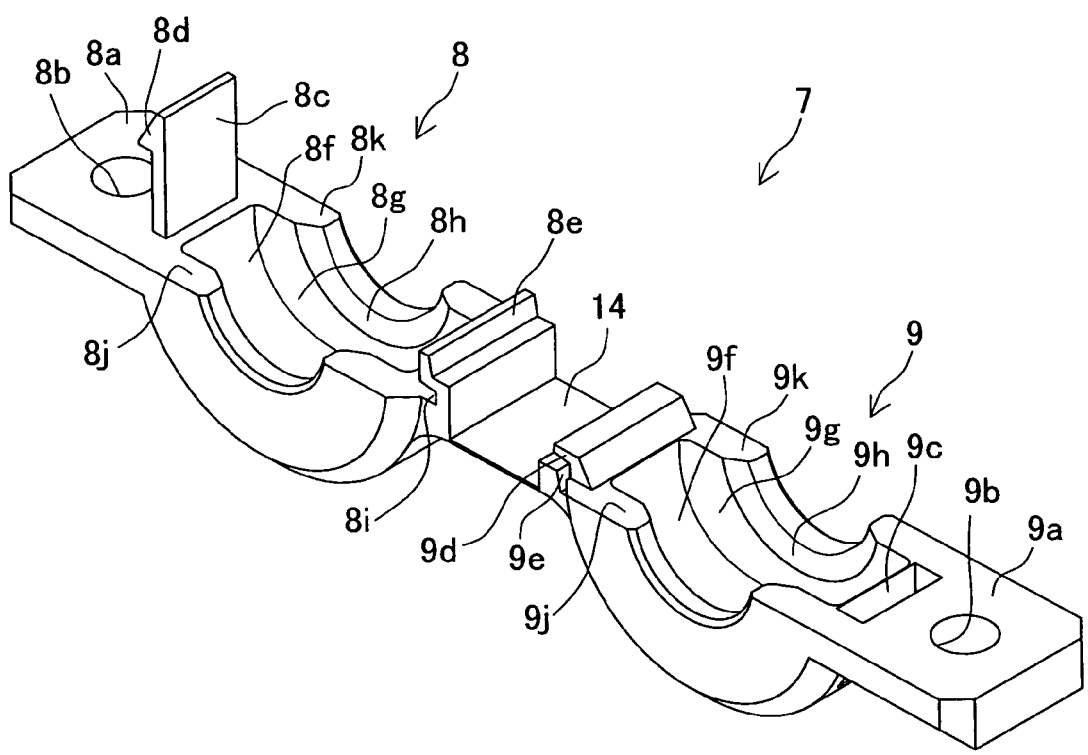
FIG. 6 is an external perspective view of a coupling member.
Figure 7:
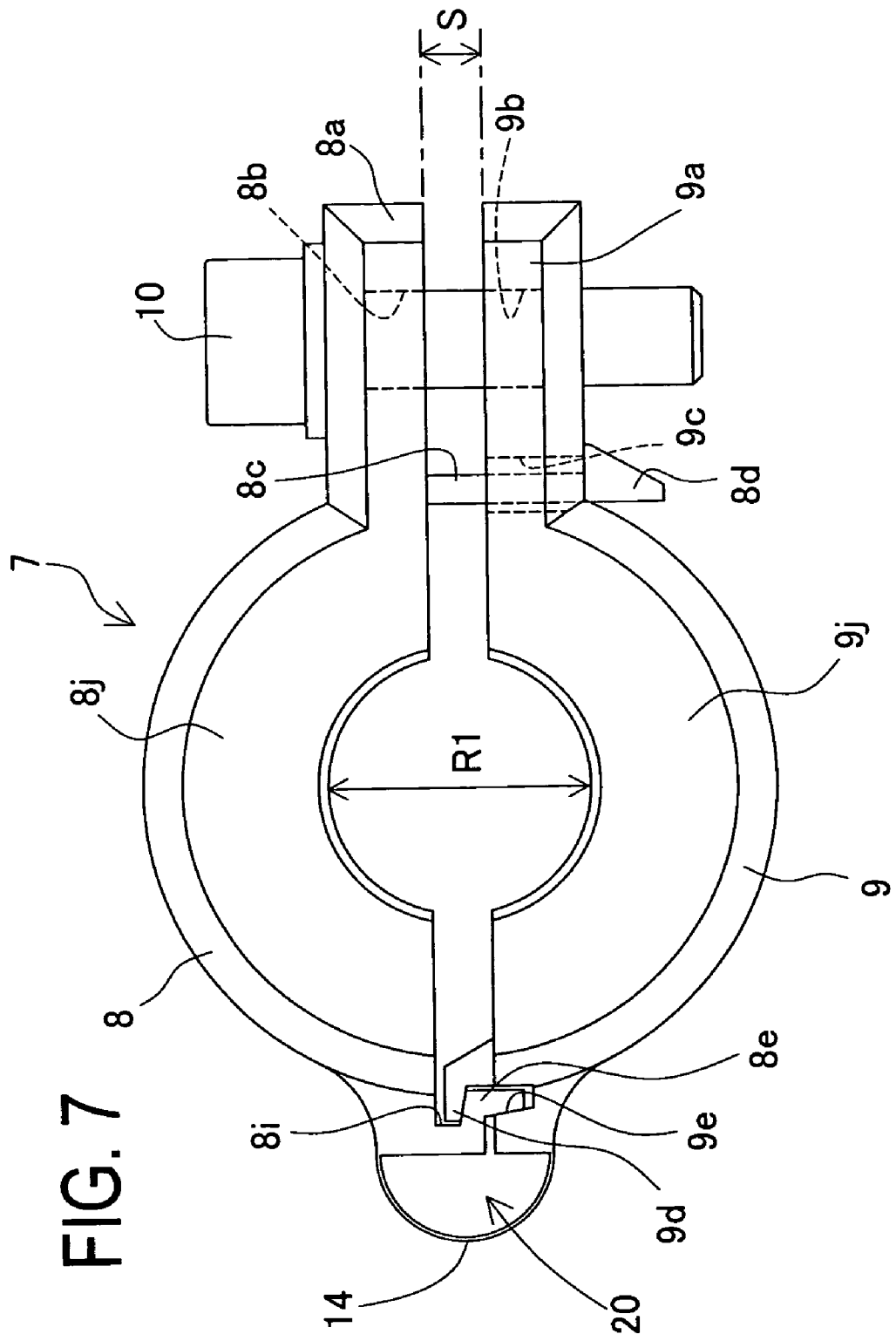
FIG. 7 is a side view showing an initial assembly state of the coupling member.

FIG. 6 is an external perspective view of the coupling member 7 shown in FIG. 1. FIG. 7 is a side view of the coupling member 7 in an initial assembly state.

As shown in FIG. 7, the coupling member 7 is of an annular shape and composed of a first split member 8 and a second split member 9. These first and second split members 8 and 9 are integrally connected with each other by a deformable connecting band 14 made of a thin film as shown in FIG. 6. The first and second split members 8 and 9 and the connecting band 14 are integrally made of fluorocarbon resin such as PVDF (polyvinylidene fluoride (vinylidene difluoride)) having strength and corrosion resistance by injection molding, cutting, or the like.

As shown in FIGS. 6 and 7, each of the first and second split members 8 and 9 is formed in a semicircular block shape. The first and second split members 8 and 9 are provided with extended portions 8a and 9a each extending sideways from one end of a mating face (in a radial direction). The extended portion 8a (9a) is formed with a bolt hole 8b (9b) in which a clamping member 10 formed of a fluorocarbon resin screw is threadedly engaged. A locking claw 8c elastically deformable is vertically provided on the extended portion 8a. This claw 8c has a hooked distal end 8d. The second split member 9 is formed with a through hole 9c in which the claw 8c is inserted. The through hole 9c is formed to allow the claw 8c to pass therethrough by elastically deforming the distal end 8d, and the distal end 8d having passing through the through hole 9c to return to its original shape and then be engaged on the surface of the extended portion 9a around the opening of the through hole 9c.

As shown in FIGS. 6 and 7, the first split member 8 includes a first protrusion 8e and a first recess 8i formed on an end of the mating face with the second split member 9, opposite to the extended portion 8a. The second split member 9 includes, on an end of the mating face with the first split member 8, opposite to the extended portion 9a, a second recess 9e in which the first protrusion 8e is engaged and a second protrusion 9d which is engaged in the first recess 8i.

The first recess 8i is formed extending in a radial direction of the first split member 8 in FIG. 7. The first protrusion 8e is formed protruding from the mating face of the first split member 8 (in a direction perpendicular to the extending direction of the first recess 8i). The second protrusion 9d is provided with its distal end bent in the radial direction of the second split member 9. The second recess 9e is formed extending in a vertical direction to the mating face of the second split member 9 (in a direction perpendicular to the distal end of the second protrusion 9d). Accordingly, when the first and second protrusions 8e and 9d are engaged in the second and first recesses 9e and 8e respectively, these protrusions 8e and 9d abut on the inner surfaces of the recesses 9e and 8i (in a direction of separating the first and second split members 8 and 9 and in a direction perpendicular to the separating direction). The first and second protrusions 8e and 9d and the first and second recesses 8i and 9e constitute a rotatable connecting part 20.

The first split member 8 is formed with a circumferentially holding groove 8f and first and second projecting portions 8j and 8k spaced facing at a predetermined distance in an axial direction of the first split member 8 perpendicular to the radial direction. The second split member 9 is formed with a circumferentially holding groove 9f and second protrusions portions 9j and 9k spaced facing at a predetermined distance in an axial direction of the second split member 9 perpendicular to the radial direction. Herein, the "predetermined distance" corresponds to a distance between the end-face-side inside surface 4d of the first fitting groove 4c and the end-face-side inside surface 5d of the second fitting groove 5c when the first and second connection parts 4 and 5 are drawn or clamped together to produce predetermined sealing strength. The first projecting portions 8j and 9j and the second projecting portions 8k and 9k are formed with tapers 8h and 9h on inner surfaces around semicircular cutouts continuous with the mating faces and straight surfaces 8g and 9g extending from the tapers 8h and 9h outwardly in the radial direction of the first and second split members 8 and 9 respectively.

<Jig>

In the fluid device connecting structure 1 of the first embodiment, the first and second connection parts 4 and 5 are drawn together by use of a jig 15 to mount the coupling member 7 around those connection parts 4 and 5. This jig 15 is explained below.

Figure 8:
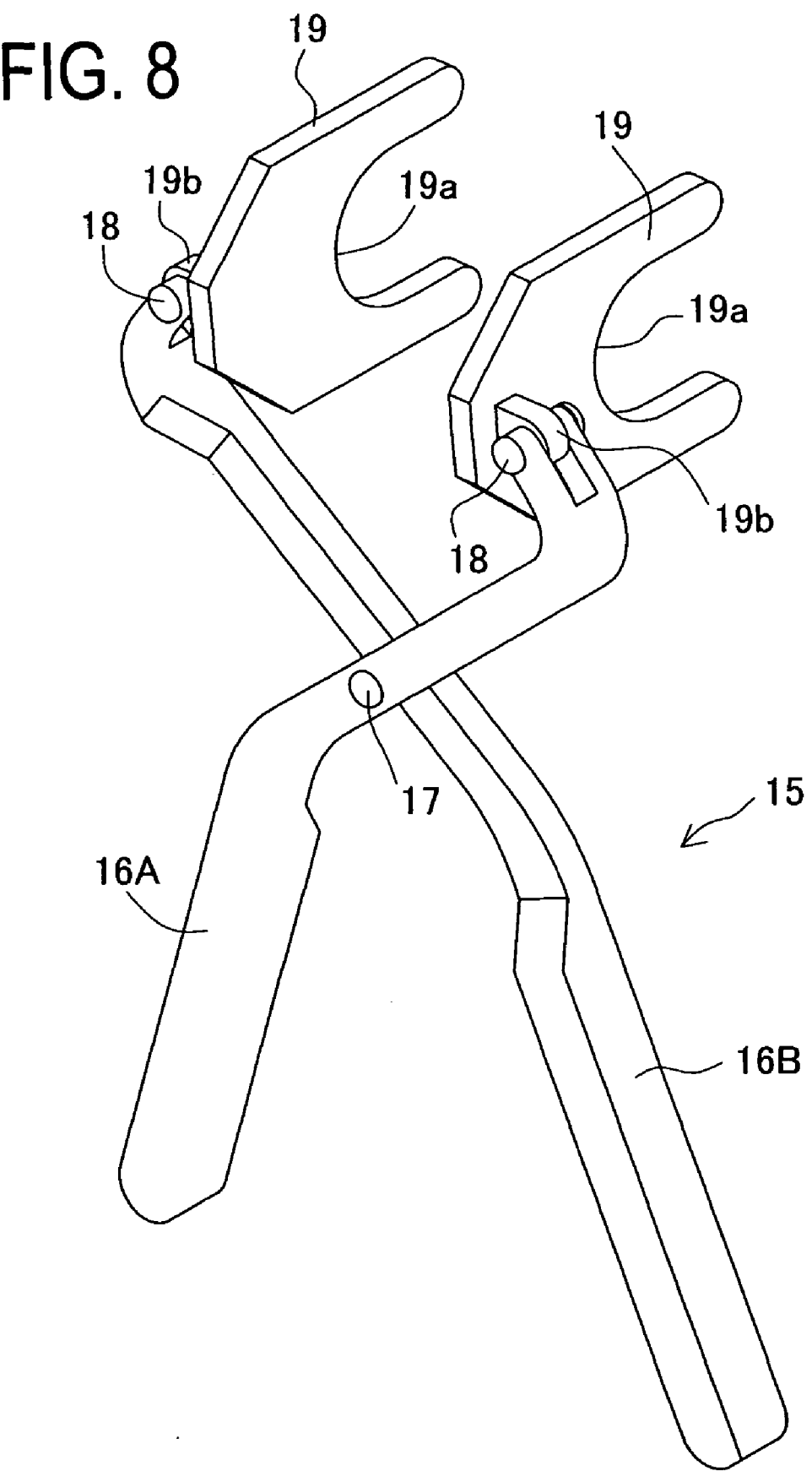
FIG. 8 is an external perspective view of a jig to be used for assembling components of the fluid device connecting structure of FIG. 1.

FIG. 8 is an external perspective view of the jig 15 to be used in assembling the components of the fluid device connecting structure 1 shown in FIG. 1.

The jig 15 is made of metal (stainless steel, etc.) so rigid as to prevent deformation in a clamping operation. The jig 15 includes two handles 16A and 16B which are rotatably connected at an intersection 17. Each of the handles 16A and 16B has an inwardly bent end in which a spindle 18 is provided perpendicular to a rotating direction of each handle 16A, 16B. A support portion 19b of a pressurizing plate 19 is rotatably mounted on each spindle 18. Each pressurizing plate 19 is formed with a U-shaped groove 19a engageable with the first mounting groove 4f of the first connection part 4 (or the second mounting groove 5f of the second connection part 5). The handles 16A and 16B are designed to be longer between each spindle 18 (an upper end) and the intersection 17 and than between the intersection 17 and a lower end of a grip portion to facilitate drawing the first and second connection parts 4 and 5 together.

<Coupling Method of Fluid Devices>

An explanation is given to a method of coupling the first and second fluid devices 2 and 3.

As shown in FIG. 5, firstly, for example the hooked portion 12a of the seal member 6 is hooked on the protrusion 5g of the second connection part 5 to set the seal member 6 around the outer periphery of the second connection part 5, preventing dropping of the seal member 6. The seal member 6 has separate lugs 12 and hence can change the diameter of the seal member 6 defined by the lugs 12. Accordingly, the seal member 6 can be attached to the second connection part 5 easily. In this case, the protrusion 5b of the second connection part 5 is lightly inserted at its distal end into the groove 11b of the seal member 6.

Successively, the first connection part 4 is set in the lugs 12 and pushed along the lugs 12 toward the second connection part 5 so that the protrusion 4b of the first connection part 4 is lightly inserted at its distal end into the groove 11a of the seal member 6.

Figure 9:
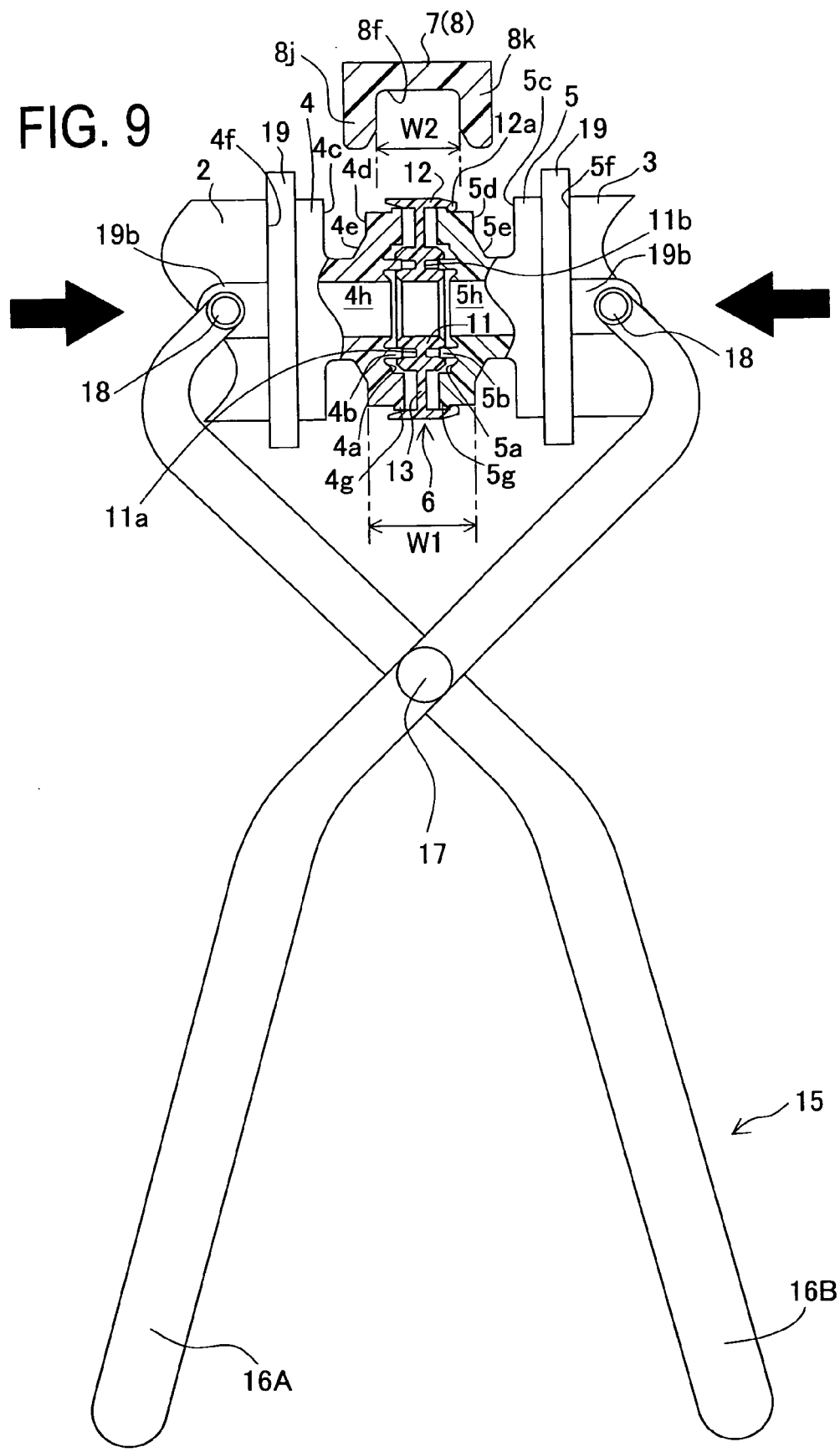
FIG. 9 is a view to explain an assembly manner of the fluid device connecting structure of FIG. 1, particularly showing a clamping manner using the jig.

FIG. 9 is a view to explain an assembly manner of the fluid device connecting structure 1 shown in FIG. 1, particularly showing a clamping manner using the jig 15.

As shown in FIG. 9, the jig 15 is set until the first and second connection parts 4 and 5 are inserted deeply in the U-shaped grooves 19a of the pressurizing plates 19 respectively, thereby placing the pressurizing plates 19 on the first and second mounting grooves 4f and 5f. At that time, a width W1 between the end-face-side inside surfaces 4d and 5d of the first and second fitting grooves 4c and 5c is wider than a width W2 of the holding groove 8f of the coupling member 7 (the distance between the first and second projecting portions 8j and 8k). Thus, the coupling member 7 is not allowed to be fitted on the first and second connection parts 4 and 5.

Therefore, a user grips the handles 16A and 16B of the jig 15 and pressurizes the first and second connection parts 4 and 5 to draw them to each other as indicated by arrows in FIG. 9. At that time, the pressurizing plates 19 are rotated about the spindles 18. In addition, the inside surfaces 4i and 5i of the first and second mounting grooves 4f and 5f are parallel to the end faces of the first and second connection parts 4 and 5 (vertical to the axis of the passages 4h and 5h). Consequently, the inside surfaces 4i and 5i of the first and second mounting grooves 4f and 5f of the first and second connection parts 4 and 5 are continuously pressurized in the axial direction of the passages 4h and 5h by the pressurizing plates 19. Accordingly, the annular protrusions 4b and 5b of the first and second connection parts 4 and 5 are gradually press-fitted into the grooves 11a and 11b of the seal member 6 uniformly in a circumferential direction.

If W1 is still wider than W2, an amount (distance) of the protrusions 4b and 5b press-fitted in the grooves 11a and 11b is so small as not to produce the predetermined sealing strength. In this case, the user has to grip the jig 15 more tightly to draw the first and second connection parts 4 and 5 closer to each other.

Figure 10:
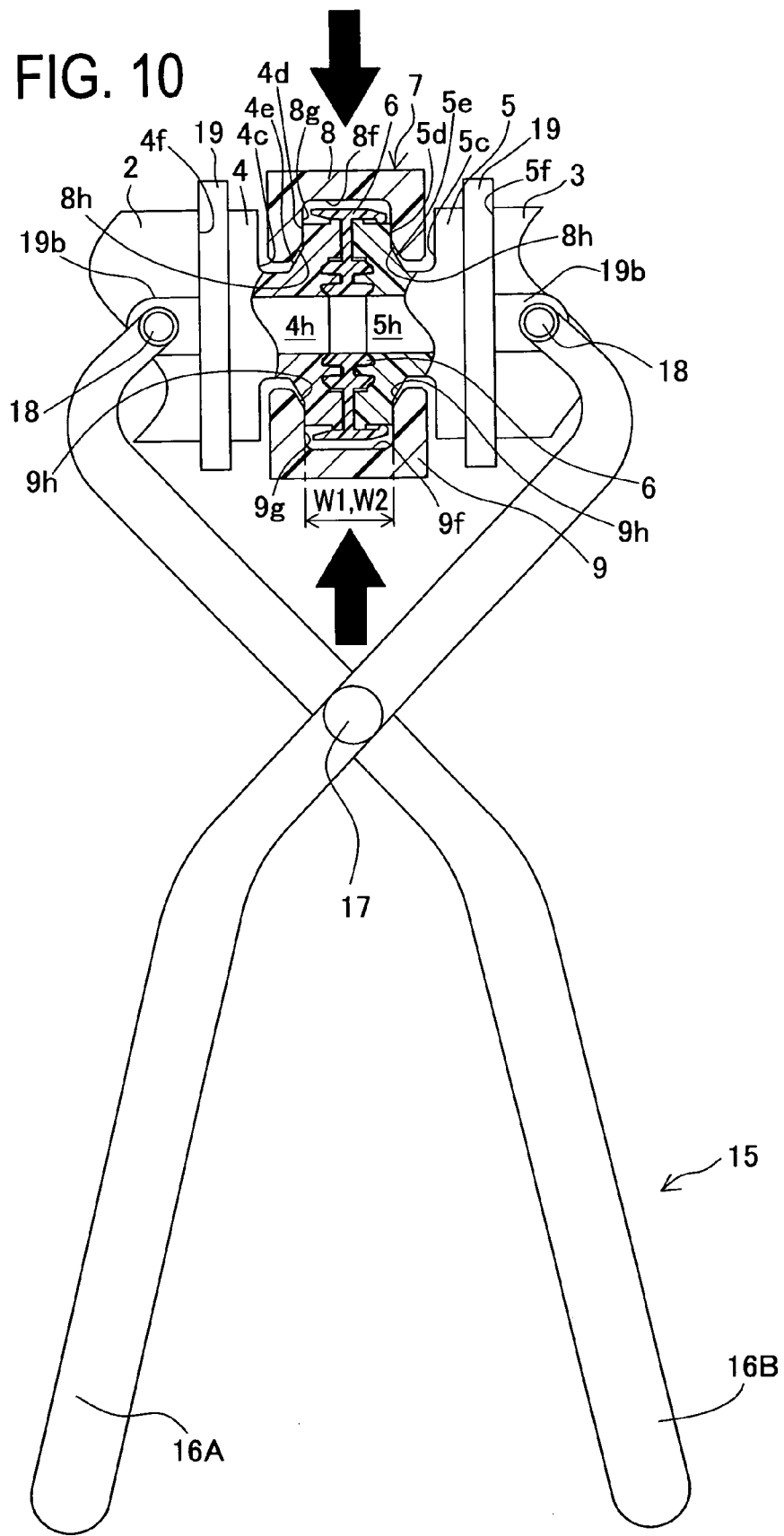
FIG. 10 is a view to explain the assembly manner of the fluid device connecting structure of FIG. 1, particularly showing a mounting manner of the coupling member.

FIG. 10 is a view to explain the assembly manner of the fluid device connecting structure 1 of FIG. 1, particularly showing mounting manner of the coupling member 7.

When the first and second connection parts 4 and 5 are drawn together until W1 becomes smaller than W2, the protrusions 4b and 5b of the first and second connection parts 4 and 5 are sufficiently press-fitted in the press-fit allowances 11c and 11d of the grooves 11a and 11b of the seal member 6 respectively, producing the predetermined sealing strength. While the first and second connection parts 4 and 5 are held in such a state by the jig 15, therefore, the coupling member 7 is mounted around the first and second connection parts 4 and 5.

In the coupling member 7, the first and second protrusions 8e and 9d are engaged in the second and first recesses 9e and 8i respectively, forming the rotatable connecting part 20. The first and second split members 8 and 9 are rotated about the connecting part 20 so that the first projecting portions 8j and 9j are engaged in the first fitting grooves 4c and the second projecting portions 8k and 9k are engaged in the second fitting groove 5c. The distal end 8d of the locking claw 8c of the first split member 8 abuts on an edge of the through hole 9c of the extended portion 9a, and the claw 8c is then inserted from its distal end 8d into the through hole 9c of the second split member 9 by being elastically deformed inward in the through hole 9c. After the distal end 8d has passed through the through hole 9c, the claw 8c returns to its original shape, causing the distal end 8d to engage with the extended portion 9a of the second split member 9. Accordingly, the claw 8 of the coupling member 7 will not be disengaged from the through hole 9c, so that the first and second split members 8 and 9 are engaged around the first and second connection parts 4 and 5.

Herein, in the coupling member 7, forces in different directions act on the first and second split members 8 and 9 when the split members 8 and 9 are mounted to the first and second connection parts 4 and 5 or when the locking claw 8c is elastically deformed in the through hole 9c and engaged with the extended portion 9a. The connecting band 14 is deformable to facilitate mounting of the coupling member 7. Therefore, if the forces in different directions act on the first and second split members 8 and 9, these split members 8 and 9 may not be engaged at fixed positions.

In this regard, the coupling member 7 is arranged such that the first and second protrusions 8e and 9d are engaged with the inner walls of the recesses 9e and 8i respectively on the mating faces of the first and second split members 8 and 9 continuous with the connecting band 14. Accordingly, the engagement between the first protrusion 8e and the second recess 9e and between the first recess 8i and the second protrusion 9d allows the first and second split members 8 and 9 to be engaged at the fixed position even when the forces in different directions act on those split members 8 and 9. The coupling member 7 can easily be mounted around the first and second connection parts 4 and 5 by opening and closing the first and second split members 8 and 9 about the rotatable connecting part 20 serving as a supporting point in which the first protrusion 8e is engaged in the second recess 9e and the second protrusion 9d is engaged in the first recess 8i, and inserting the locking claw 8c into the through hole 9c by elastically deforming the locking claw 8c for engagement with the extended portion 9a.

When the jig 15 is separated from the first and second mounting grooves 4f and 5f, a repulsive force is caused in the press-fitted portions of the seal member 6 and the first and second connection parts 4 and 5, causing the first and second connection parts 4 and 5 to move away from each other along the central axis of their connecting portions (i.e. in a lateral direction in FIG. 1).

In the initial assembly state, as shown in FIG. 1, the tapers 8h and 9h of the coupling member 7 are not in contact with the tapers 4e and 5e of the first and second connection parts 4 and 5. Only the straight surfaces 8g and 9g of the first and second projecting portions 8j, 9j, 8k, and 9k are in contact with the inside surfaces 4d and 5d of the first and second fitting grooves 4c and 5c, parallel to the end faces of the first and second connection parts 4 and 5. Accordingly, in the initial assembly state of the coupling member 7, only the force to separate the first and second connection parts 4 and 5 along the central axis thereof acts on the first and second projecting portions 8j, 9j, 9k, and 9k. In the coupling member 7, the first and second projecting portions 8j, 9j, 8k, and 9k receive the force from the first and second connection parts 4 and 5 and maintain the first and second connection parts 4 and 5 in connected relation.

At that time, in the initial assembly state of the coupling member 7, as shown in FIG. 7, a predetermined clearance S is produced between the extended portions 8a and 9a.

Meanwhile, when the first and second connection parts 4 and 5 are drawn to each other until the width W1 between the inside surfaces 4d and 5d of the first and second fitting grooves 4c and 5c becomes smaller than the width W2 of the holding groove 8f of the coupling member 7 (the distance between the first and second projecting portions 8i and 8k), the sealing strength becomes excessive. In this case, however, the connection parts 4 and 5 are pushed back along the central axis by the repulsive force caused by the press-fitted portions of the seal member 6 and the connection parts 4 and 5 until the inside surfaces 4d and 5d of the fitting grooves 4c and 5c come into contact with the first and second protrusions 8j, 9j, 8k, and 9k of the coupling member 7. Thus, the sealing strength is automatically adjusted to an appropriate level.

In the fluid device connecting structure 1 of the first embodiment, as above, the amount of drawing the first and second connection parts 4 and 5 to each other is controlled constantly by the first and second 8j, 9j, 8k, and 9k of the coupling member 7. It is therefore possible to easily and reliably position the first and second connection parts 4 and 5 in appropriate connected relation.

Herein, for example, when something bumps the coupling member 7 after mounted around the first and second connection parts 4 and 5 or the connection parts 4 and 5 are repeatedly deformed by thermal expansion and thermal contraction due to fluid temperature, the forces in different directions act on the first and second split members 8 and 9. In the coupling member 7, the split members 8 and 9 are integrally connected with each other by the claw 8c and the extended portion 9a which are engaged with each other and by the rotatable connecting part 20 in which the first and second protrusions 8e and 9d are engaged in the second and first recesses 9e and 8i respectively. The coupling member 7 receives the force acting on the first and second split members 8 and 9 in different directions by the claw 8c and extended portion 9a engaged with each other and by the connecting part 20, so that the split members 8 and 9 can be maintained in engagement relation and the first and second connection parts 4 and 5 can be coupled continuously.

<A Manner of Drawing the First and Second Connection Parts to Each Other>

In the fluid device connecting structure 1, the first and second connection parts 4 and 5, seal member 6, coupling member 7, and clamping member 10 are resin-molded components. Accordingly, for example, when an operation of causing a high-temperature chemical liquid to flow in the passages 4h and 5h and then cold pure water to flow therein is repeated, the first and second fluid devices 2 and 3 repeat expansion and contraction, leading to creep deformation, thus lowering sealing strength.

Figure 11:
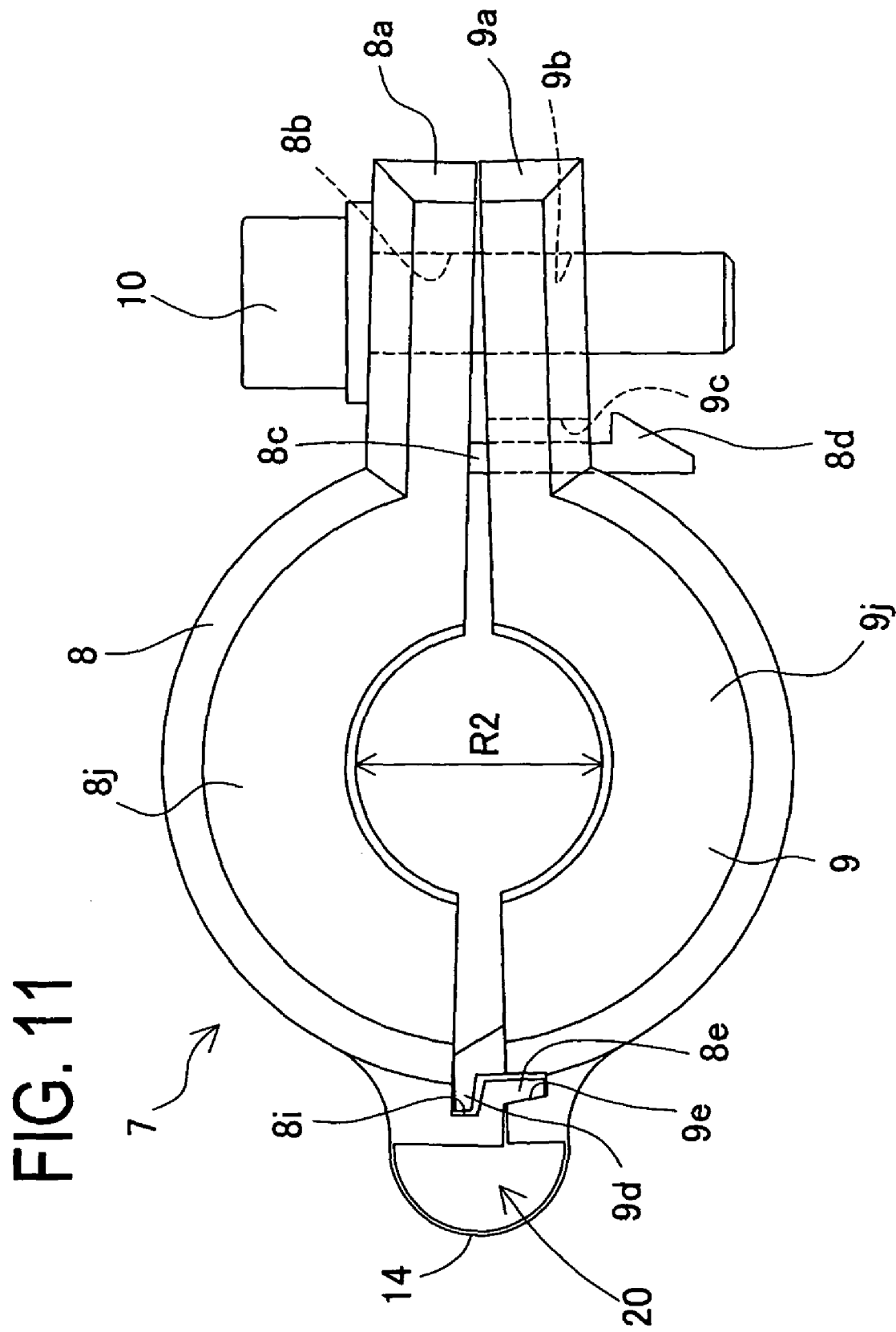
FIG. 11 is a side view of the coupling member showing a clamping force generating state.

FIG. 11 is a side view of the coupling member 7 showing a clamping force generating state.

Also in this case, in the fluid device connecting structure 1, the clamping member 10 is screwed in the bolt holes 8b and 9b as shown in FIG. 11. Thus, the clearance S (see FIG. 7) between the extended portions 8a and 9a produced in the initial assembly state becomes narrower, decreasing the inner diameter R2 than the inner diameter R1 in the initial assembly state.

Figure 12:
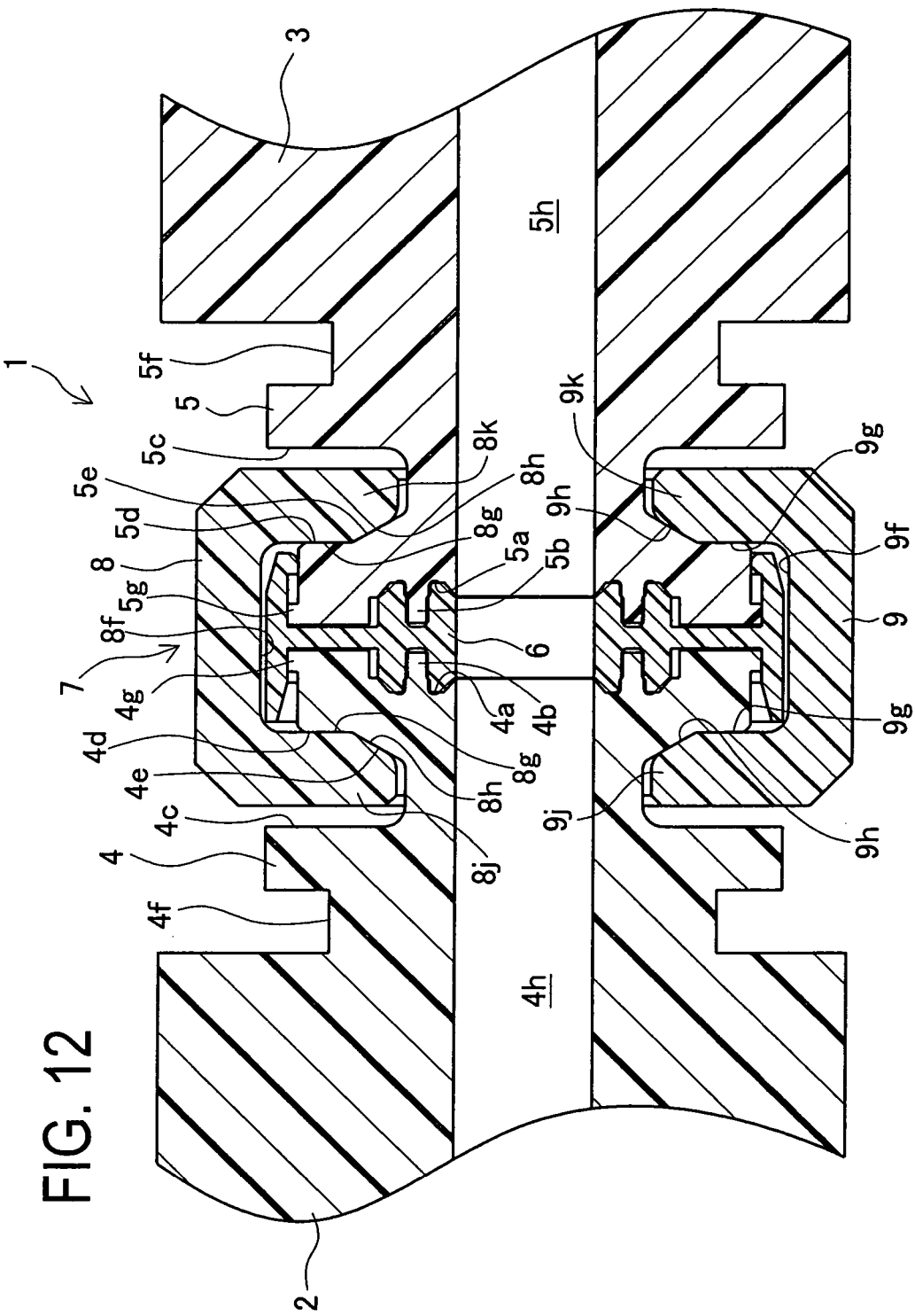
FIG. 12 is a sectional view of the fluid device connecting structure of FIG. 1 in a clamping force generating state.

FIG. 12 is a sectional view of the coupling member 7 showing a clamping force generating state.

At that time, the first and second split members 8 and 9 of the coupling member 7 are moved so that the tapers 8h and 9h of the split members 8 and 9 are slid along the tapers 4e and 5e of the inside surfaces 4d and 5d of the first and second fitting grooves 4c and 5c as shown in FIG. 12. The first and second connection parts 4 and 5 thus receive the force from the coupling member 7 to come close to each other, further press-fitting the protrusions 4b and 5b of the connection parts 4 and 5 into the grooves 11a and 11b of the seal member 6 to enhance the sealing strength.

In this case, however, the repulsive force is caused in the press-fitted portions of the first and second connection parts 4 and 5 and the seal member 6. This repulsive force perpendicularly acts on the tapers 8h and 9h and is split into a vertical component and a horizontal component with respect to the coupling member 7. In the following description, the "horizontal" represents the axial direction of the first and second connection parts 4 and 5 and the "vertical" represents a direction perpendicular to the axial direction of the first and second connection parts 4 and 5.

When the first and second projecting portions 8j, 9j, 8k, and 9k of the coupling member 7 come into contact with the end-face-side inside surfaces 4d and 5d or the tapers 4e and 5e of the first and second fitting grooves 4c and 5c, the first and second projecting portions 8i, 9j, 8k, and 9k receive a horizontal component force split from the force acting on the coupling member 7 by the first and second connection parts 4 and 5.

On the other hand, a vertical component force of the force acting on the coupling member 7 by the first and second connection parts 4 and 5 acts on engaging surfaces of the first protrusion 8e and the second recess 9e and on engaging surfaces the first recess 8i and the second protrusion 9d. Also in this case, the second protrusion 9d is engaged in the first recess 8i in a horizontal direction while pressing against the first split member 8, and hence the coupling member 7 receives the vertical component of the force.

The locking claw 8c is disengaged from the extended portion 9a when the clamping member 10 is screwed in the bolt holes 8d and 9b. However, the clamping member 10 holds the extended portions 8a and 9a. Accordingly, when the first and second connection parts 4 and 5 are drawn to each other by the clamping member 10, the coupling member 7 receives, by the clamping member 10, the vertical component force of the force exerted by the first and second connection parts 4 and 5.

The coupling member 7 receives the vertical component force by the clamping member 10 and the engaging surfaces of the second protrusion 9d and the first recess 8i as above, so that the first and second split members 8 and 9 can be prevented from separating from each other.

The coupling member 7 therefore can maintain the sealing strength even after the first and second connection parts 4 and 5 are drawn to each other by the clamping member 10.

<Operations and Advantages of the Fluid Device Connecting Structure of the First Embodiment>

The fluid device connecting structure 1 of the first embodiment is configured as above. Specifically, the pressurizing plates 19 of the jig 15 are attached in the first and second mounting grooves 4f and 5f, the first and second connection parts 4 and 5 are drawn to each other until the width W1 between the end-face-side inside surface 4d of the first fitting groove 4c and the end-face-side inside surface 5d of the second fitting groove 5c becomes smaller than the width W2 between the first and second projecting portions 8j and 8k and between the second projecting portions 9j and 9k of the coupling member 7. Thus, the seal member 6 is fitted in the seal grooves 4a and 5a of the first and second connection parts 4 and 5, producing the predetermined sealing strength.

In this state, the first and second protrusions 8e and 9d are engaged in the second and first recesses 9e and 8i respectively and also the distal end 8d of the claw 8c is hooked on the extended portion 9a of the second split member 9 to mount the first and second split members 8 and 9 around the first and second connection parts 4 and 5. Even when the jig 15 is removed from the first and second mounting grooves 4f and 5f, the connecting relation of the first and second connection parts 4 and 5 is maintained by the coupling member 7. Accordingly, the fluid device connecting structure 1 of the first embodiment has only to have the space for drawing the first and second connection parts 4 and 5 to each other to mount the first and second split members 8 and 9 around the connection parts 4 and 5. This makes it possible to easily and reliably connect the first and second fluid devices 2 and 3 even if no space is provided to move the cylindrical nut as in the conventional technique.

According to the fluid device connecting structure 1 of the first embodiment, additionally, the coupling member 7 (the first and second split members 8 and 9 each having a U-shape in section) is mounted on the connecting portions of the first and second connection parts 4 and 5 by engaging the first projecting portions 8j and 9j in the first fitting grooves 4c and the second projecting portions 8k and 9k in the second fitting groove 5c and holding the connection parts 4 and 5 between the split members 8 and 9. Thus, the fluid device connecting structure 1 of the first embodiment can achieve a compact structure for connecting the first and second connection parts 4 and 5.

In the fluid device connecting structure 1 of the first embodiment, furthermore, the end-face-side inside surface 4i of the mounting groove 4f and the end-face-side inside surface 4d of the first fitting groove 4c are parallel to the end face of the first connection part 4, and the end-face-side inside surface 5i of the second mounting groove 5f and the end-face-side inside surface 5d of the second fitting groove 5c are parallel to the end face of the connection part 5. When the first and second connection parts 4 and 5 are drawn to each other by the jig 15, or, when the connection parts 4 and 5 are connected by the coupling member 7, the end face of the first connection part 4 and the end face of the second connection part 5 can almost uniformly be pressed against each other, thereby uniformly sealing the seal member 6 in the circumferential direction.

According to the fluid device connecting structure 1 of the first embodiment, if the first and second connection parts 4 and 5 are creep-deformed, the first and second split members 8 and 9 are brought close to each other by the clamping member 10. This allows the tapers 8h and 9h of the coupling member 7 to slide along the tapers 4e and 5e of the connection parts 4 and 5, generating a clamping force to draw the first and second connection parts 4 and 5 to each other, thereby enhancing the sealing strength. Herein, the first and second split members 8 and 9 are urged to move apart from each other by the repulsive force caused between the connection parts 4 and 5 and the seal member 6. However, the clamping member 10 maintains the engagement relation of the first and second split members 8 and 9 and hence the coupling member 7 can maintain the sealing strength after the connection parts 4 and 5 are clamped. According to the fluid device connecting structure 1 of the first embodiment, consequently, the sealing strength can be easily enhanced even when the connection parts 4 and 5 are creep deformed.

In the fluid device connecting structure 1 of the first embodiment, the coupling member 7 is constituted of the first and second split members 8 and 9 and includes the rotatable connecting part 20 rotatably connecting one ends of those split members 8 and 9, the locking claw 8c provided in the first split member 8 to be elastically deformable, and the through hole 9c formed in the second split member 9. The coupling member 7 is configured such that the claw 8c passes through the through hole 9c by being elastically deformed and then returns to its original shape to engage with the extended portion 9a. According to the fluid device connecting structure 1 of the first embodiment, for example, even when only a small space is allowed between the fluid devices arranged in complicated pattern, the first split member 8 has only to be rotated with respect to the second split member 9 to push the claw 8c into the through hole 9c. Therefore, the coupling member 7 can easily be mounted to cover the connecting portions of the first and second connection parts 4 and 5.

In the fluid device connecting structure 1 of the first embodiment, the rotatable connecting part 20 is constituted of the first and second protrusions 8e and 9d and the first and second recesses 8i and 9e of the first and second split members 8 and 9. When the first and second protrusions 8e and 9d are engaged in the second and first recesses 9e and 8i respectively, the first and second protrusions 8e and 9d are engaged with the inner walls of the second and first recesses 9e and 8i in different directions (in the direction of separating the first and second split members 8 and 9 and in the direction perpendicular to the separating direction). According to the fluid device connecting structure 1 of the first embodiment, for example, in the case where the locking claw 8c is elastically deformed to be inserted through the through hole 9c and engaged with the extended portion 9a and even in the case where something bumps the coupling member 7 mounted on the first and second connection parts 4 and 5, causing the forces in different directions to act on the first and second split members 8 and 9, the split members 8 and 9 will not be separated.

In the fluid device connecting structure 1 of the first embodiment, in the initial assembly state where the coupling member 7 is mounted to the first and second connection parts 4 and 5, the clearance S is produced between the first and second split members 8 and 9. The clamping member 10 connects the split members 8 and 9 to eliminate the clearance S, thereby drawing the first and second connection parts 4 and 5 to each other. According to the fluid device connecting structure 1 of the present embodiment, therefore, the sealing strength can be enhanced by the clamping member 10.

Furthermore, in the fluid device connecting structure 1 of the first embodiment, the first and second split members 8 and 9 are connected integrally with each other by the connecting band 14. This makes it possible to prevent loss of the first and second split members 8 and 9 and avoid troublesome works of assembling the split members 8 and 9, and hence improve workability.

Figure 45:
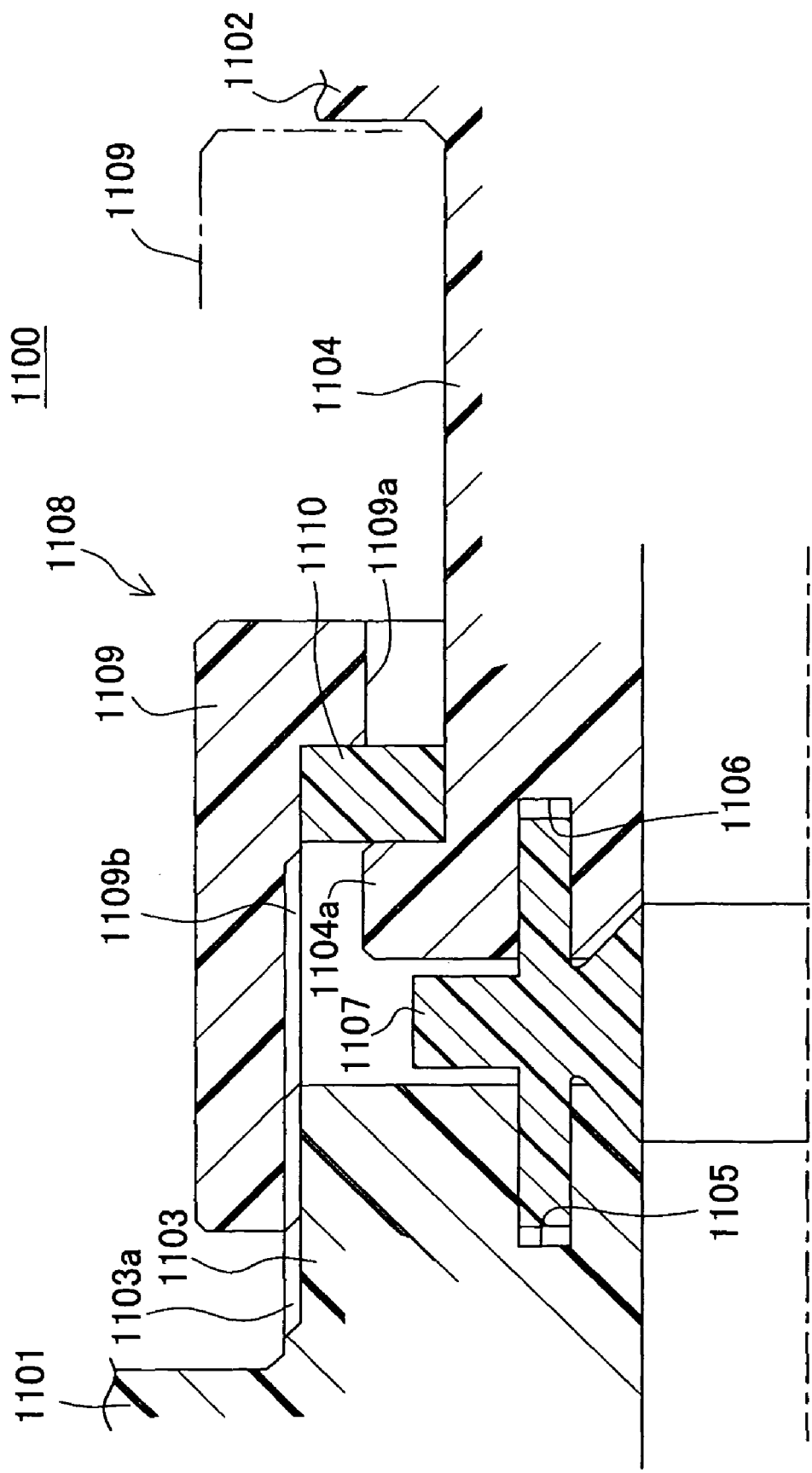
FIG. 45 is a sectional view of a conventional fluid device connecting structure.

The fluid device connecting structure 1 of the first embodiment needs a large force (e.g. 200 N or more) in order to press-fit the annular protrusions 4b and 5b of the first and second connection parts 4 and 5 into the press-fit allowances 11c and 11d of the circumferential grooves 11a and 11b of the seal member 6. If the conventional fluid device connecting structure 1100 (see FIG. 45) is used in such a case, the cylindrical nut 1109 could not be rotated easily by hand. The nut 1109 has to be fastened to the fluid devices by a spanner having a long handle. However, in some cases, the fluid device unit 50 including the fluid devices arranged closely as shown in FIG. 13 could not provide a space for rotation of the spanner between the fluid devices and thus the conventional fluid device connecting structure 1100 could not connect the fluid devices. On the other hand, according to the fluid device connecting structure 1 of the first embodiment, if a clearance for insertion of the pressurizing plates 19 of the jig 15 is provided between the fluid devices, it is possible to mount the coupling member 7 by drawing the first and second connection parts 4 and 5 to each other and engaging the first and second split members 8 and 9 around the connecting portions of the connection parts 4 and 5. According to the fluid device connecting structure 1 of the first embodiment, consequently, the seal member 6 can be press-fitted easily and reliably in the seal grooves 4a and 5a even when only a narrow space is provided around the fluid devices to be connected.

According to the fluid device connecting structure 1 of the first embodiment, a user is allowed to grip the jig 15 whose pressurizing plates 19 set in the first and second mounting grooves 4f and 5f to draw the first and second connection parts 4 and 5 to each other. Then, the first and second split members 8 and 9 have only to be engaged with each other around the connection parts 4 and 5 to connect the first and second fluid devices 2 and 3. As compared with the case where the cylindrical nut 1109 is rotated as in the conventional technique, the time required for connecting the first and second connection parts 4 and 5 can be shortened.

In the fluid device unit 50 of the first embodiment, the plurality of fluid devices 61A, 61B, 62A, 62B, 63A, 63B, 64A, 64B, 65A, 65B, 66A, and 66B are connected by use of the fluid device connecting structures 1. Those fluid devices 61A, 61B, 62A, 62B, 63A, 63B, 64A, 64B, 65A, 65B, 66A, and 66B can therefore be connected to each other simply and reliably. In the fluid device unit 50, the connecting parts of the fluid devices are identical in shape and made integral with the passage blocks, pipes, and others of the fluid devices, and also the connecting parts of the fluid devices are connected by use of the identical coupling members 7. This can provide commonality of components and hence reduction cost.

In the fluid device unit 50 of the first embodiment, the fluid devices are connected to each other by use of the compact fluid device connecting structures 1, so that a foot space of the entire unit can be reduced.

Second Embodiment

A second embodiment of a fluid device connecting structure of the invention will be described below.

The fluid device connecting structure of this embodiment is identical in structure to the fluid device connecting structure 1 of the first embodiment excepting a coupling member 7A. Accordingly, the following explanation will be focused on differences from the first embodiment without explaining the same or similar configurations as those of the first embodiment.

<Configuration of Coupling Member>

Figure 14:
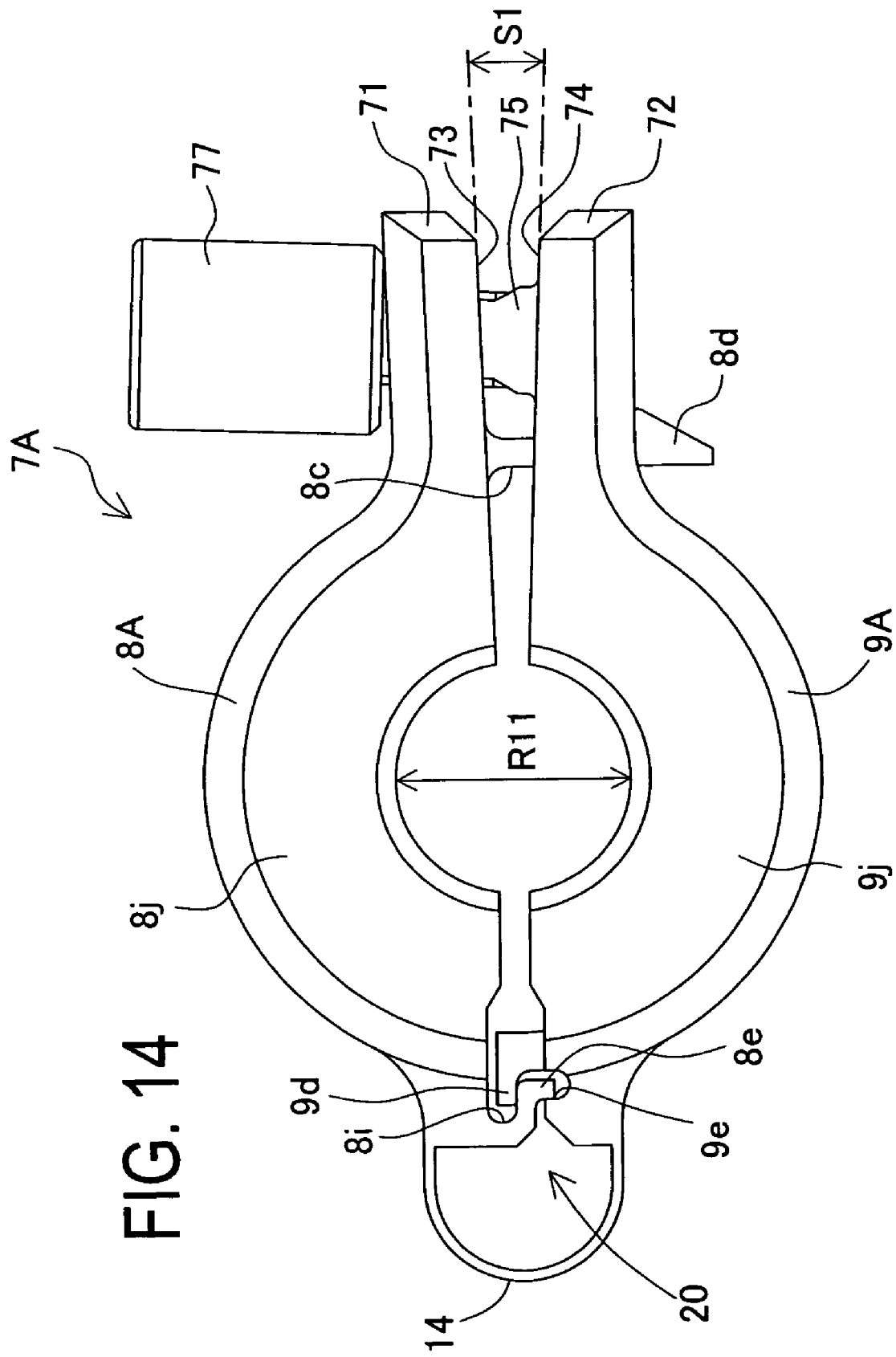
FIG. 14 is a side view of a coupling member to be used in a fluid device connecting structure in a second embodiment according to the present invention, showing an initial assembly state.
Figure 15:
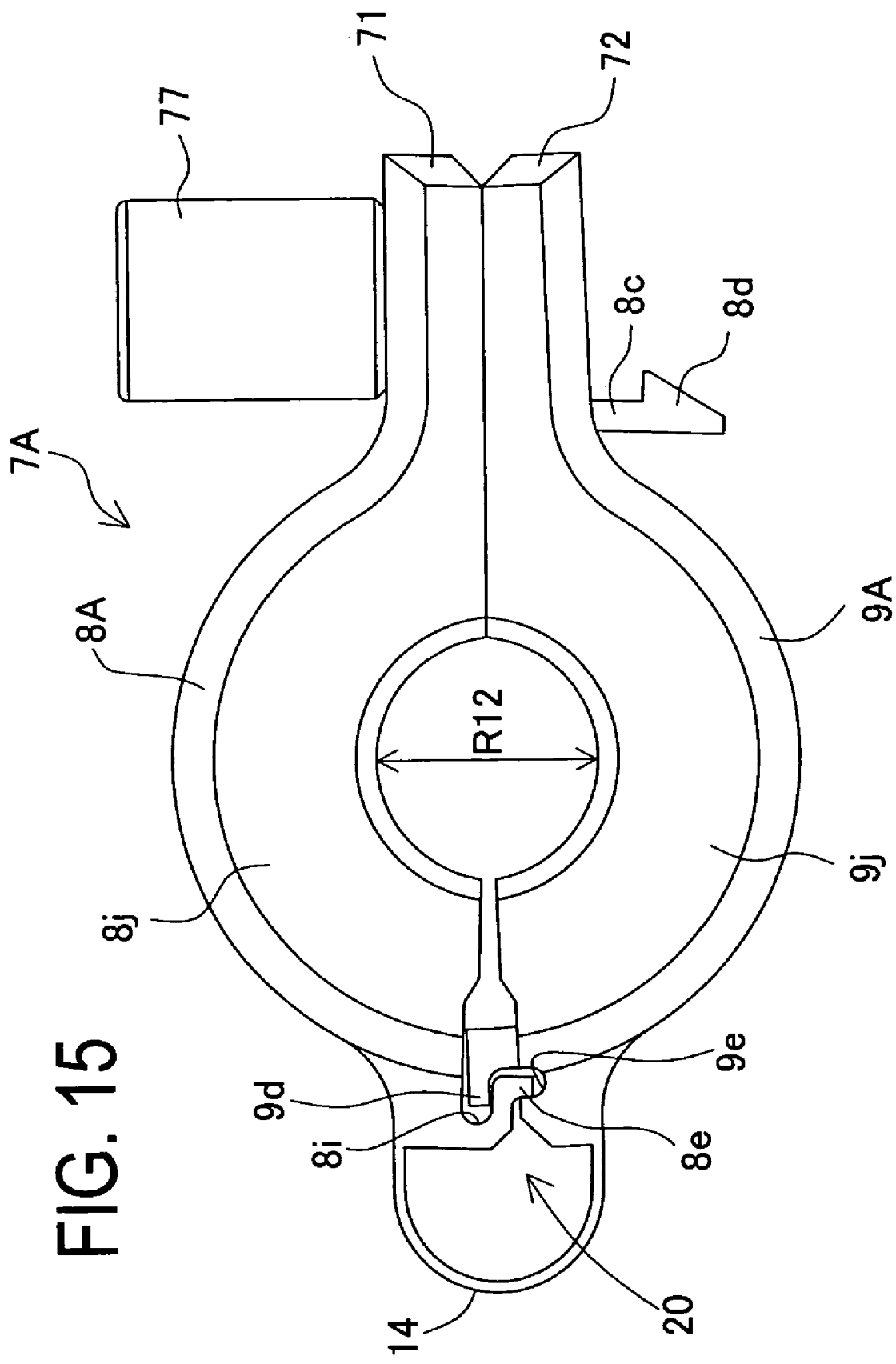
FIG. 15 is a side view of the coupling member of FIG. 14, showing a clamping force generating state.
Figure 16:
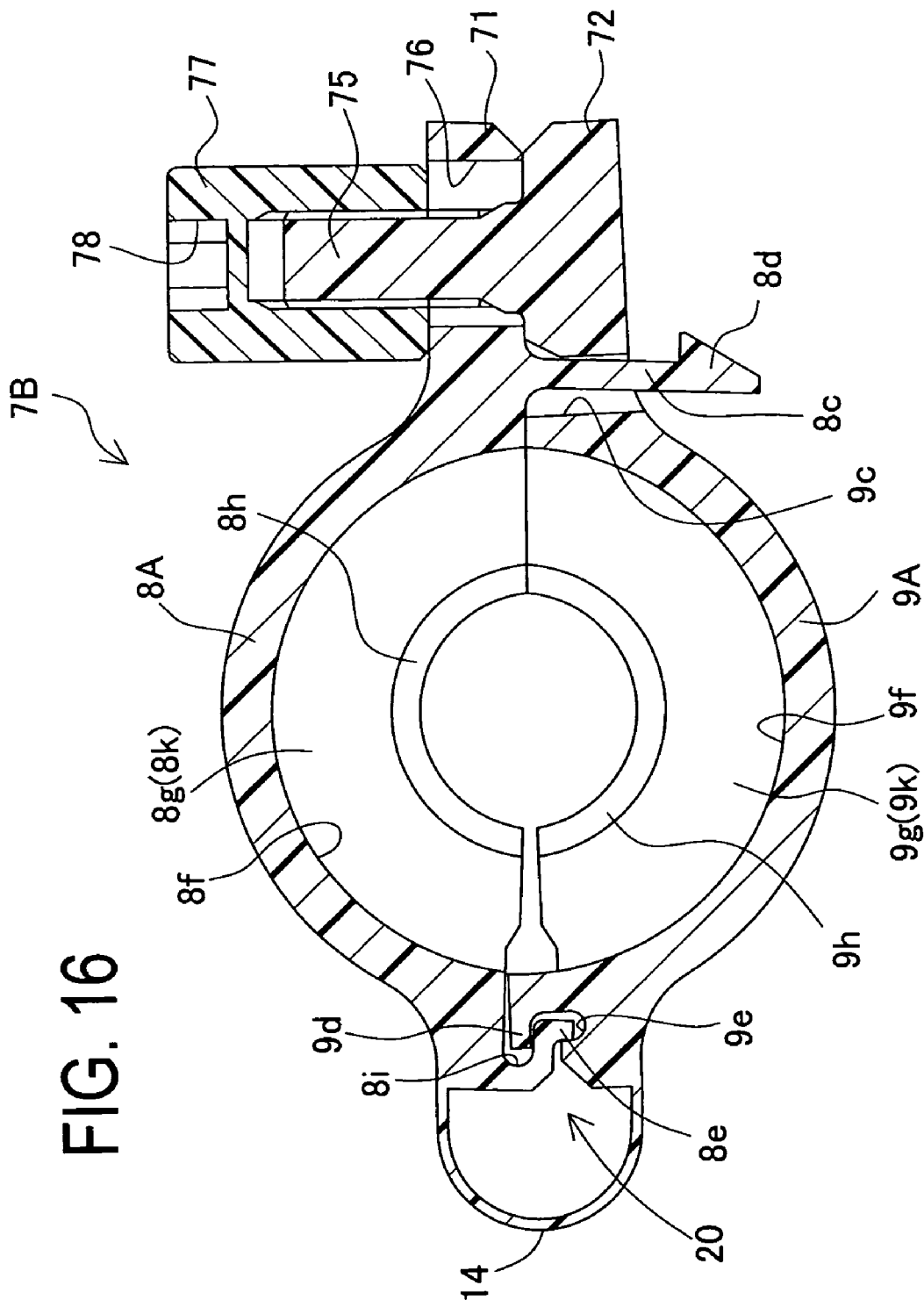
FIG. 16 is a sectional view of the coupling member of FIG. 15.

FIG. 14 is a side view of the coupling member 7A used in the fluid device connecting structure of the second embodiment, showing its initial assembly state. FIG. 15 is a side view of the 7A, showing a clamping force generating state. FIG. 16 is a sectional view of the coupling member 7A of FIG. 15.

The coupling member 7A is made of fluorocarbon resin by injection molding, integrally including a first split member 8A, a second split member 9A, and the connecting band 14. The first and second split members 8A and 9A are formed with extended portions 71 and 72 respectively. The split members 8A and 9A are designed so that the extended portions 71 and 72 include slant mating faces as shown in FIG. 14 to allow the extended portions 71 and 72 to come into contact without gaps in drawing the first and second connection parts 4 and 5 to each other as shown in FIG. 15. For this end, the split members 8A and 9A in the initial assembly state shown in FIG. 14 provide a clearance S1 with a predetermined angle between the extended portions 71 and 72.

The extended portion 72 is formed with a male screw part 75 (constituting a part of the "clamping member") vertically protruding from the mating face with the extended portion 71 and outside the through hole 9c as shown in FIG. 16. Specifically, the male screw part 75 is formed to incline with respect to the mating face of the extended portion 72 so as to become vertical relative to a contact face of the extended portion 71 which will contact with a female screw member 77 (constituting a part of the "clamping member") in drawing the first and second connection parts 4 and 5 to each other. The extended portion 71 is formed with a through hole 76 through which the male screw part 75 runs. The through hole 76 is formed to be larger in sectional area in a radial direction of the male screw part 75 so as not to interfere with opening/closing operation of the first and second split members 8A and 9A about the connecting part 20 as a supporting point. The male screw part 75 has a distal end that protrudes upward from the extended portion 71 through the through hole 76 and the resin female screw member 77 is threadedly mounted on the distal end of the male screw part 75. The female screw member 77 is formed on top thereof with a hexagonal hole 78 to be used for attachment of a tool to rotate the female screw member 77.

<Coupling Method of Fluid Devices>

After the first and second connection parts 4 and 5 of the first and second fluid devices 2 and 3 are drawn to each other, the above configured coupling member 7A is set in the first and second fitting grooves 4c and 5c of the connection parts 4 and 5. At that time, the coupling member 7A is mounted around the first and second connection parts 4 and 5 while the first and second protrusions 8e and 9d are engaged in the second and first recesses 9e and 8i respectively. The locking claw 8c is inserted in the through hole 9c and the distal end 8d is engaged with the extended portion 72 as shown in FIG. 14. Thus, the claw 8c of the first split member 8A is engaged with the extended portion 72 of the second split member 9A, forming the coupling member 7A in an annular shape, thereby maintaining the connecting relation between the first and second connection parts 4 and 5.

If the sealing strength of the first and second connection parts 4 and 5 lowers, the female screw member 77 is screwed on the male screw part 75 by attaching a tool to the hexagonal hole 78, thereby bringing the extended portions 71 and 72 into close contact with each other to eliminate the clearance S1. Then, as shown in FIGS. 15 and 16, the extended portions 71 and 72 closely contact with each other to reduce the inner diameter R12 than the inner diameter R11 (see FIG. 14) in the initial assembly state. The male screw part 75 is provided protruding from the extended portion 72 to be vertical relative to the contact face of the extended portion 71 contacting the female screw member 77. In the coupling member 7A, accordingly, the extended portions 71 and 72 can be held in close contact relation between the male screw part 75 and the female screw member 77. This can prevent the first and second split members 8A and 9A from becoming separated. Reduction in inner diameter of the coupling member 7A enables higher sealing strength as mentioned in the first embodiment.

<Operations and Advantages of the Fluid Device Connecting Structure of the Second Embodiment>

The fluid device connecting structure of the second embodiment is configured as above. Specifically, when the first and second connection parts 4 and 5 are drawn to each other, the repulsive force of the connection parts 4 and 5 acting on the contact faces of the tapers 4e and 5e of the first and second connection parts 4 and 5 and the tapers 8h and 9h of the coupling member 7A acts in a direction of separating the first and second split members 8A and 9A of the coupling member 7 and in a direction perpendicular to the separating direction, respectively. In the fluid device connecting structure of the second embodiment, however, the female screw member 77 of the coupling member 7A is screwed on the male screw part 75 to hold the extended portions 71 and 72 in contact relation without gaps therebetween. Consequently, the screw tightening force of the female screw member 77 and the male screw part 75 is unlikely to be loosed. According to the fluid device connecting structure of the second embodiment, the sealing strength produced when the first and second connection parts 4 and 5 are drawn to each other can be maintained stably.

In the fluid device connecting structure of the second embodiment, for example, when the first and second connection parts 4 and 5 are creep deformed, the female screw member 77 is screwed on the male screw part 75 to bring the first and second split members 8A and 9A close to each other, producing the force to draw the connection parts 4 and 5 to each other. Herein, the first and second split members 8A and 9A are urged to move apart from each other by the repulsive force caused between the connection parts 4 and 5 and the seal member 6. However, the coupling member 7A holds the engagement relation of the first and second split members 8A and 9A by threaded engagement between the female screw member 77 and the male screw part 75 and thus can maintain the clamping force generating condition. According to the fluid device connecting structure of the second embodiment, the sealing strength can be enhanced easily even if the first and second connection parts 4 and 5 are creep deformed.

Third Embodiment

Figure 17:
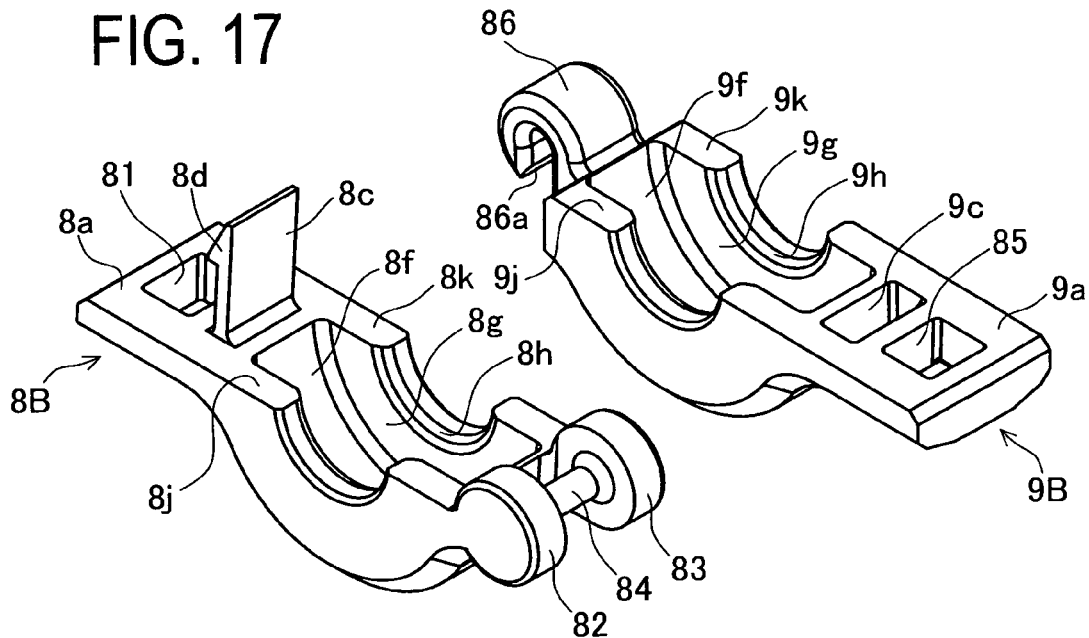
FIG. 17 is an exploded view of a coupling member to be used in a fluid device connecting structure in a third embodiment according to the present invention.
Figure 18:
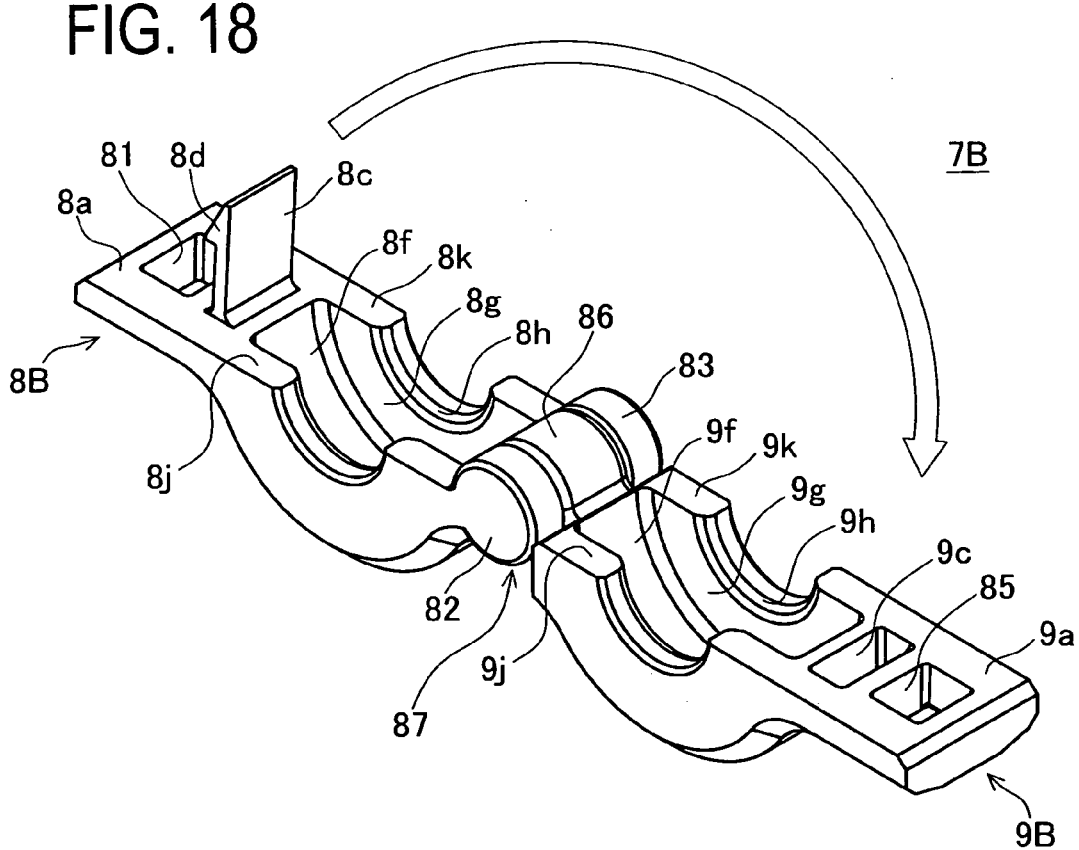
FIG. 18 is a view of assembled first and second split members constituting the coupling member of FIG. 17.
Figure 19:
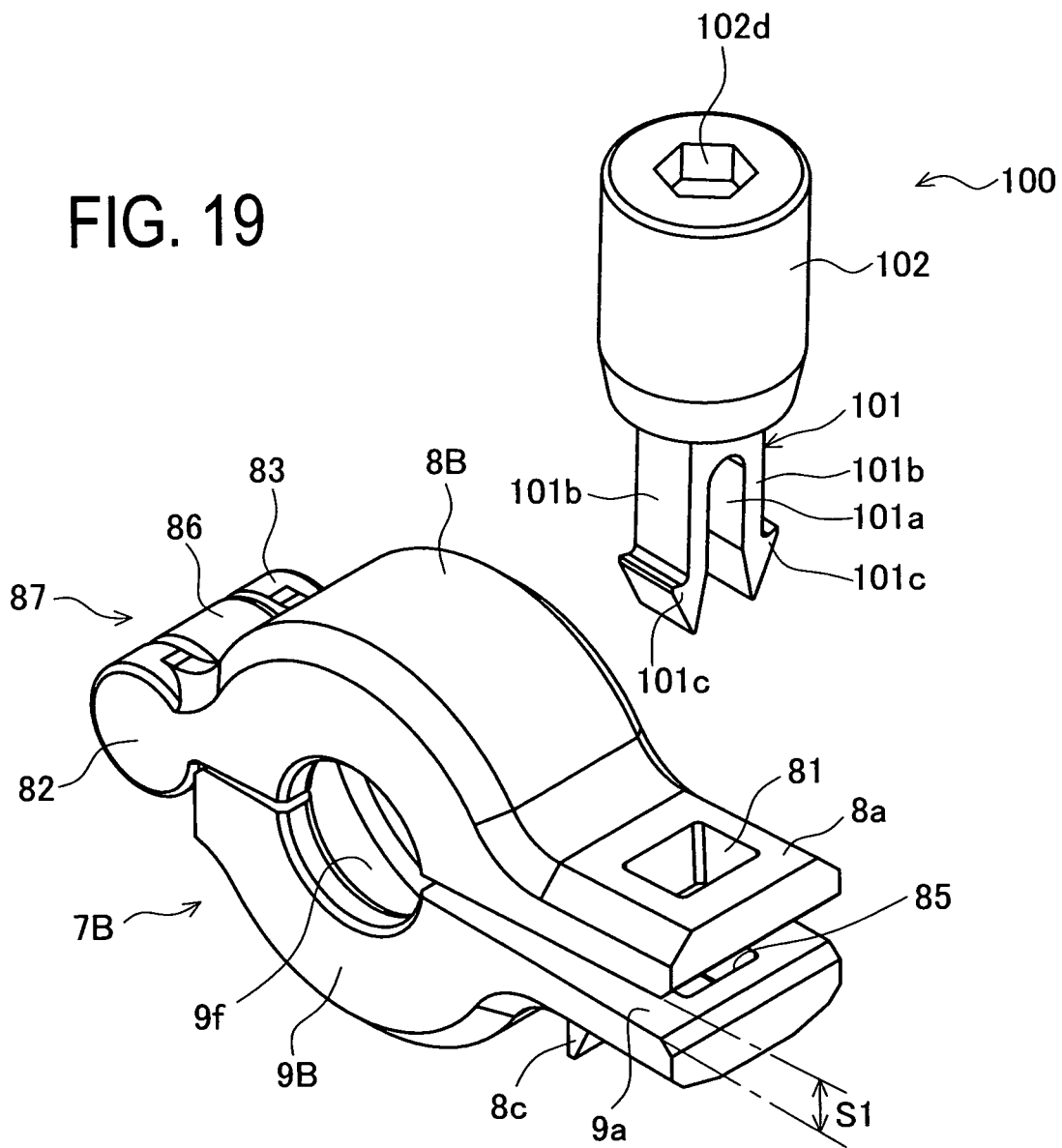
FIG. 19 is an external perspective view of the coupling member and a clamping member.
Figure 20:
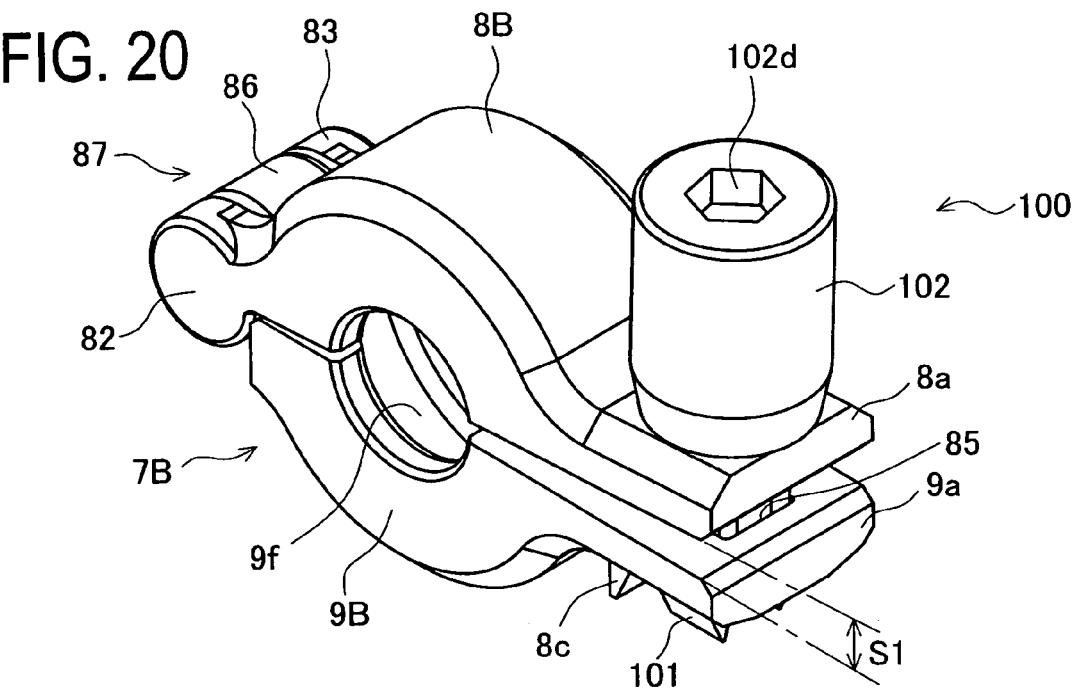
FIG. 20 is an external perspective view of the coupling member attached with the clamping member.
Figure 21:
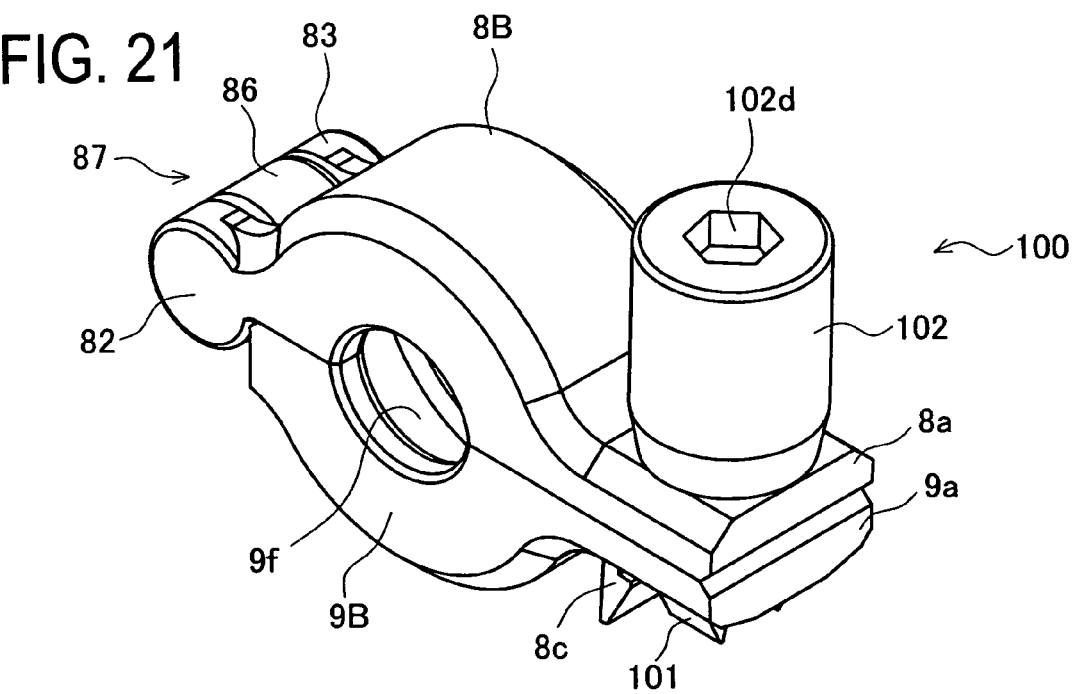
FIG. 21 is a view showing the coupling member showing a clamping force generating state.
Figure 22:
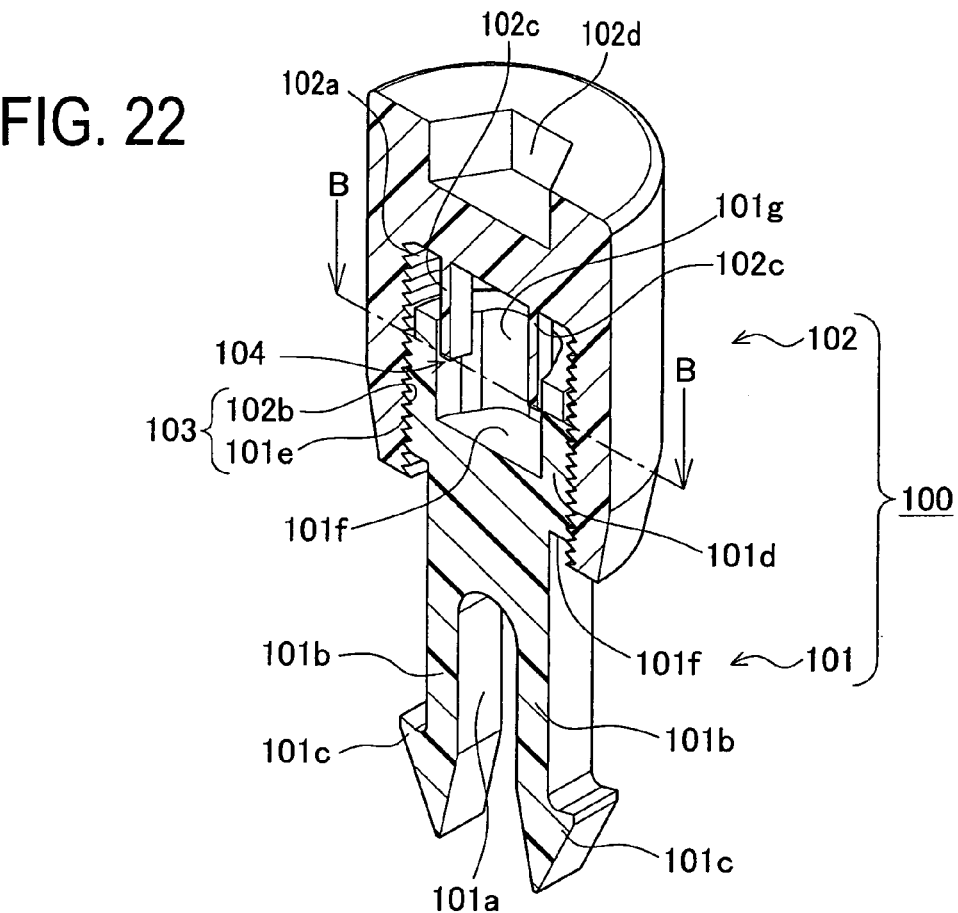
FIG. 22 is a longitudinal sectional view of the clamping member of FIG. 19.
Figure 23:
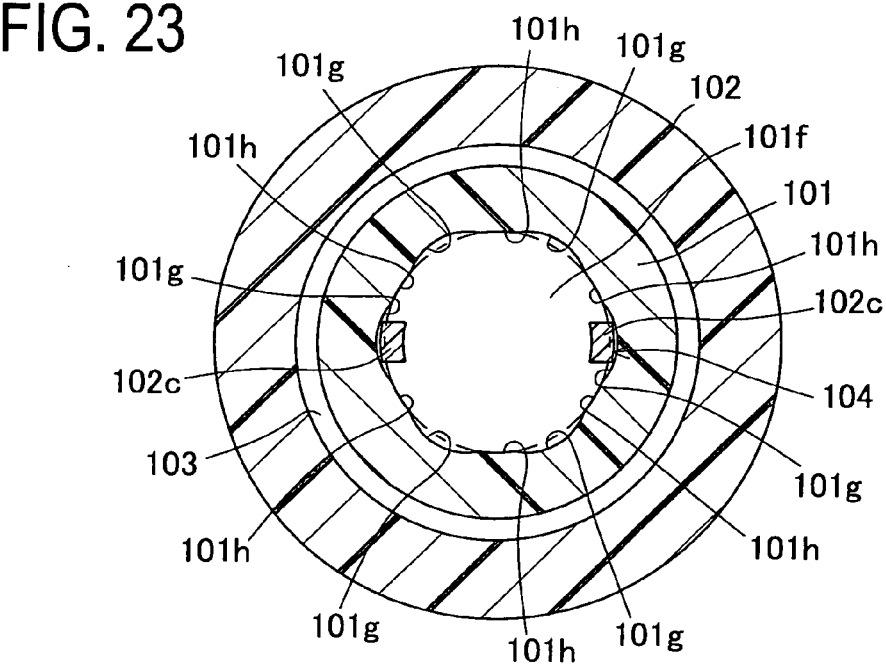
FIG. 23 is a sectional view of the clamping member taken along a line B-B in FIG. 22.

A third embodiment of a fluid device connecting structure of the invention will be described below. FIG. 17 is an exploded view of a coupling member 7B to be used in a fluid device connecting structure in the third embodiment. FIG. 18 is a view of assembled first and second split members 8B and 9B constituting the coupling member 7B. FIG. 19 is an external perspective view of the coupling member 7B and a clamping member 100. FIG. 20 is an external perspective view of the coupling member 7B attached with the clamping member 100. FIG. 21 is a view showing the coupling member 7B, showing a clamping force generating state. FIG. 22 is a longitudinal sectional view of the clamping member 100 shown in FIG. 19. FIG. 23 is a sectional view of the clamping member 100 taken along a line B-B in FIG. 22.

The fluid device connecting structure of the third embodiment is identical in structure to the fluid device connecting structure 1 of the first embodiment excepting the coupling member 7B and the clamping member 100. Accordingly, the following explanation will be focused on the coupling member 7B and the clamping member 100 by using the same reference signs for the same or similar components as those of the first embodiment without their detailed explanation.

<Configuration of Coupling Member>

As shown in FIG. 17, the coupling member 7B includes separate first and second split members 8B and 9B. These split members 8B and 9B are provided with extending portions 8a and 9a including slant mating faces so that the extended portions 8a and 9a can contact with each other without gaps therebetween in generating a clamping force to draw the first and second connection parts 4 and 5 to each other. Therefore the first and second split members 8B and 9B are designed to have a clearance S1 with a predetermined angle between the extended portions 8a and 9a in the initial assembly state as shown in FIG. 20. As shown in FIGS. 17 and 18, the extended portion 8a and 9a are formed with rectangular holes 81 and 85 (examples of the "attachment part") for attachment of the clamping member 100.

As shown in FIG. 17, the first split member 8B is provided with a pair of parallel support walls 82 and 83 opposite the extended portion 8a and a rotation shaft 84 is provided between the support walls 82 and 83. On the other hand, the second split member 9B is provided with a U-shaped rotatable engagement part 86 opposite the extended portion 9a. This engagement part 86 has an opening 86a that opens opposite the mating face of the second split member 9B which will contact with respect to the first split member 8B. The opening 86a of the engagement part 86 has a smaller width than the diameter of the rotation shaft 84. The coupling member 7B includes a rotatable connecting part 87 formed by press-fitting the engagement part 86 on the rotation shaft 84. In such coupling member 7B, the rotation shaft 84 is unlikely to disengage from the engagement part 86, allowing the first and second split members 8B and 9B to be connected integrally without separating from each other.

<Configuration of Clamping Member>

As shown in FIG. 19, the clamping member 100 includes a resin clip member 101 and a resin nut member 102. The clamping member 100 is configured to be attached to the coupling member 7B with one touch operation of pushing the clip member 101 into the attachment holes 81 and 85 of the coupling member 7B. Between the nut member 102 and the clip member 101, a rotation inhibiting mechanism 104 is provided to prevent the nut member 102 from rotating and coming loose with respect to the clip member 101.

The clip member 101 held against rotation as shown in FIG. 22 will be inserted in the attachment holes 81 and 85. The clip member 101 is formed with a slit 101a extending from a lower end in the axial direction, forming a pair of bifurcated leg-like flexible pieces 101b. Each flexible piece 101b is formed, at an end, with a locking portion 101c protruding opposite to the slit 101a. A cylindrical portion 101d is formed as an upper portion of the clip member 101. This cylindrical portion 101d has a bottom-closed hole 101f and external threads 101e. The inner surface of the cylindrical portion 101d is formed with valleys (recessed portions) 101g and crests (raised portions) 101h circumferentially alternately arranged as shown in 23.

As shown in FIG. 22, the nut member 102 has a cup shape including a hollow part 102a opening on one end face (a lower end face in the figure). The nut member 102 has internal threads 102b on the inner surface defining the hollow part 102a. The internal threads 102b are threadedly engaged with the external threads 101e of the clip member 101 to constitute a screw part 103. The nut member 102 is provided with a pair of engagement pieces 102c vertically extending downward from the bottom (i.e. an upper wall in FIG. 22) of the hollow part 102a. The engagement pieces 102c are arranged so that, when the nut member 102 is rotated relative to the clip member 101, the engagement pieces 102c are not elastically deformed in positions engaging with the valleys 101g but are elastically deformed in positions slidably engaging with the crests 101h to produce resistance. Accordingly, the engagement pieces 102c and the valleys 101g and the crests 101h constitute the rotation inhibiting mechanism 104. A tool attachment hole 102d is formed on the top of the nut member 102.

<Operations and Advantages of the Fluid Device Connecting Structure of the Third Embodiment>

In the coupling member 7B, as shown in FIGS. 17 and 18, the rotation shaft 84 is press-fitted in the opening 86a of the engagement part 86 to integrally combine the first and second split members 8B and 9B. Then, the first split member 8B is rotated about the connecting part 87 with respect to the second split member 9B as indicated by an arrow in FIG. 18 to cover the connecting portions of the first and second connection parts 4 and 5. The locking claw 8c flexibly runs through the through hole 9c. As shown in FIG. 19, the claw 8c inserted through the through hole 9c returns to its original shape and the distal end 8d is hooked on the extended portion 9a around the trough hole 9c. Thus, the first and second split members 8B and 9B are connected to each other at respective both ends by the connecting part 87 and the claw 8c. At that time, the coupling member 7B is mounted on the connecting portions of the first and second connection parts 4 and 5 with the clearance S1 provided between the extended portions 8a and 9a.

In the fluid device connecting structure of the third embodiment, as mentioned above, the coupling member 7B is constituted of the first and second split members 8B and 9B and includes the rotatable connecting part 87 that rotatably connects one ends of the first and second split members 8B and 9B, the locking claw 8c elastically deformably provided in the first split member 8B, and the through hole 9c formed in the second split member 9B to allow the claw 8c to pass therethrough in an elastically deformed state and then return to its original shape to be engaged on the extended portion 9a around the through hole 9c. According to the fluid device connecting structure of the third embodiment, for example, even in the case where only a small space is allowed between the fluid devices arranged in complicated pattern, the coupling member 7B can be mounted to cover the connecting portions of the first and second connection parts 4 and 5 by a simple one touch operation of rotating the first and second split members 8B and 9B and pushing the claw 8c into the through hole 9c.

In the fluid device connecting structure of the third embodiment, the rotatable connecting part 87 is constituted by the rotation shaft 84 in the first split member 8B and the U-shaped rotatable engagement part 86 engaging with the rotation shaft 84 in the second split member 9B, and the engagement part 86 has the opening that opens on the opposite side from the mating face of the second split member 9B which will contact with the first split member 8B. According to the fluid device connecting structure of the third embodiment, for example, even when something bumps the coupling member 7B, causing the forces in different directions to act on the first and second split members 8B and 9B, the split members 8B and 9B will not be separated from each other.

The clamping member 100 is previously attached to the coupling member 7B in the initial assembly state as shown in FIGS. 19 and 20. The clamping member 100 is attached to the coupling member 7B by aligning and inserting the lower ends of the pair of flexible pieces 101b with respect to the hole 81. At that time, the slant surfaces of the locking portions 101c are pressed against the inner wall of the attachment hole 81, thereby warping the flexible pieces 101b inward in the slit 101a. When the locking portions 101c pass through the attachment holes 81 and 85 and are released from the pressure from the extended portions 8a and 9a, the flexible pieces 101b return to their original shapes to be hooked on the extended portion 9a. Therefore, the clamping member 100 is less likely to be disengaged from the holes 81 and 85.

In the fluid device connecting structure of the third embodiment, accordingly, the clamping member 100 can be attached to the coupling member 7B by a simple one touch operation of pushing the clip member 101 of the clamping member 100 into the holes 81 and 85. This is good in workability. For instance, in the case where a number of fluid devices are incorporated in a wafer cleaning apparatus, particularly, the fluid device unit may be placed behind the other fluid devices. In this case, the clamping member 100 can be attached to the coupling member 7B if only the clamping member 100 is pushed into the attachment holes 81 and 85 without use of a tool.

In the case where the sealing strength of the first and second connection parts 4 and 5 then lowers, an unillustrated tool (such as a hexagonal wrench) is attached to the hole 102d to rotate the nut member 102. The nut member 102 pulls up the clip member 101 toward the nut member 102 by screw feed of the screw part 103 as shown in FIG. 21. Thus, the distance between the nut member 102 and the locking portions 101c is shortened, thereby bringing the extended portions 8a and 9a of the coupling member 7B closer to each other to eliminate the clearance S1. This results in a reduction in the diameter of the space produced between the holding groove 8f of the first split member 8B and the holding groove 9f of the second split member 9B in the coupling member 7B, generating a clamping force to draw the first and second connection parts 4 and 5 to each other. These connection parts 4 and 5 can thus have enhanced sealing strength.

According to the fluid device connecting structure of the third embodiment, as mentioned above, for example, when the first and second connection parts 4 and 5 are creep deformed, the first and second split members 8B and 9B are moved closer to each other by the clamping member 100 to generate a clamping force to the connection parts 4 and 5. Herein, the first and second split members 8B and 9B are urged to move apart from the each other by the repulsive force caused between the connection parts 4 and 5 and the seal member 6. However, the clamping member 100 can hold the first and second split members 8B and 9B in the engagement relation and hence the coupling member 7B can maintain the clamping force generating state. According to the fluid device connecting structure of the third embodiment, even when the first and second connection parts 4 and 5 are creep deformed, the sealing strength can be enhanced simply.

In the fluid device connecting structure of the third embodiment, in the initial assembly state where the coupling member 7B is attached to the first and second connection parts 4 and 5, the clearance S1 is provided between the first and second split members 8B and 9B. The clamping member 100 generates the force to draw the first and second connection parts 4 and 5 to each other by connecting the first and second split members 8B and 9B so as to eliminate the clearance S1. Accordingly, the fluid device connecting structure of the third embodiment can easily enhance the sealing strength by use of the clamping member 100.

Meanwhile, the nut member 102 of the clamping member 100 sometimes may loosen and rotate due to the repulsive force of the seal member 6, the heat transmitted thereto from the first and second connection parts 4 and 5 through the coupling member 7B, heat of ambient atmosphere in which the clamping member 100 is used, and vibration of an apparatus on which the fluid devices are mounted or others. If the nut member 102 loosens and rotates, the force of the coupling member 7B that holds the first and second connection parts 4 and 5 decreases, which may lower the sealing strength.

In this regard, as shown in FIG. 23, the clamping member 100 includes the rotation inhibiting mechanism 104 between the nut member 102 and the clip member 101. If the nut member 102 loosens and rotates relative to the clip member 101, the engagement pieces 102c are elastically deformed in sliding along the crests 101h, thus producing resistance. This resistance inhibits rotation of the nut member 102.

In the fluid device connecting structure of the third embodiment, as mentioned above, the first and second split members 8B and 9B of the coupling member 7B are formed with the attachment holes 81 and 85 in which the clamping member 100 is attached, and the clamping member 100 includes the clip member 101 inserted in the holes 81 and 85 and held against rotation, the nut member 102 threadedly mounted on the clip member 101, and the rotation inhibiting mechanism 104 for inhibiting rotation of the nut member 102 relative to the clip member 101. According to the fluid device connecting structure of the third embodiment, therefore, even when the first and second connection parts 4 and 5 and the coupling member 7B are creep deformed or the like, the rotation inhibiting mechanism 104 restrains the rotation of the nut member 102 and hence the connection parts 4 and 5 can be maintained in the connecting relation.

Herein, the rotatable engagement part 86 of the coupling member 7B has the opening that opens opposite the mating face of the second split member 9B. Accordingly, even when the coupling member 7B receives the force in a direction to separate the first and second split members 8B and 9B by thermal deformation, fluid pressure, or the like of the first and second connection parts 4 and 5, the rotation shaft 84 supported in the rotatable engagement part 86 in a different direction from the separating direction will not disengage from the engagement part 86.

Fourth Embodiment

Figure 24:
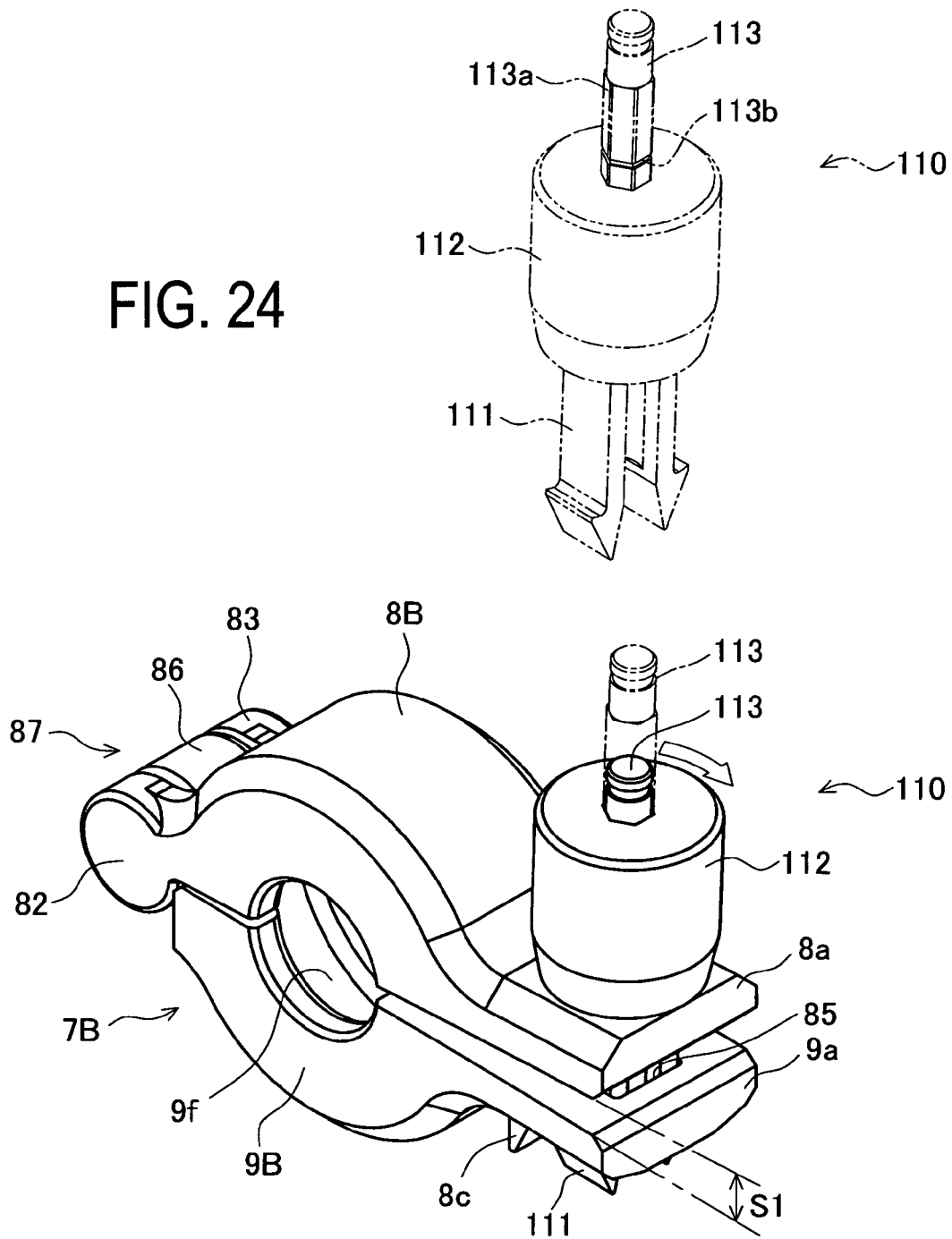
FIG. 24 is an external perspective view of a coupling member and a clamping member to be used in a fluid device connecting structure in a fourth embodiment according to the present invention.
Figure 25:
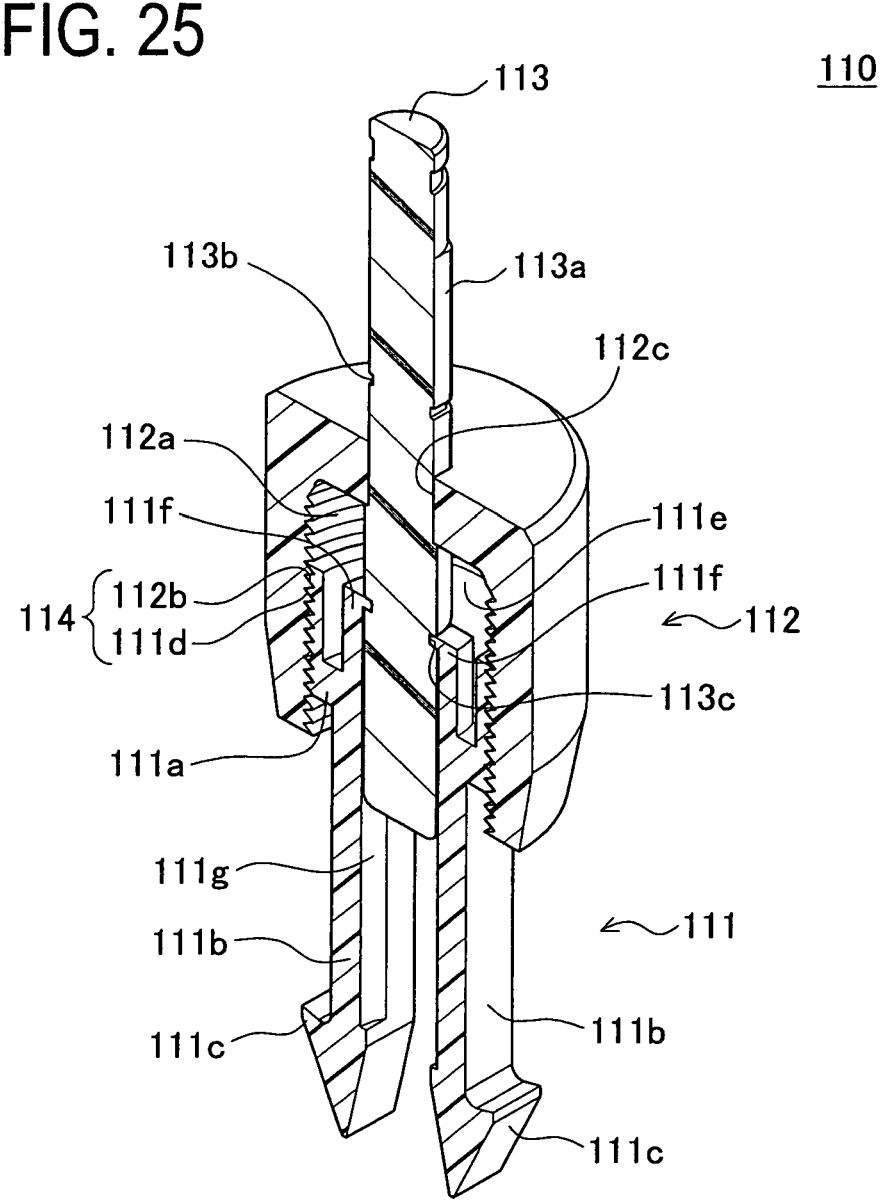
FIG. 25 is a sectional view of the clamping member of FIG. 24, showing a state where a rod member is placed in a second position.
Figure 26:
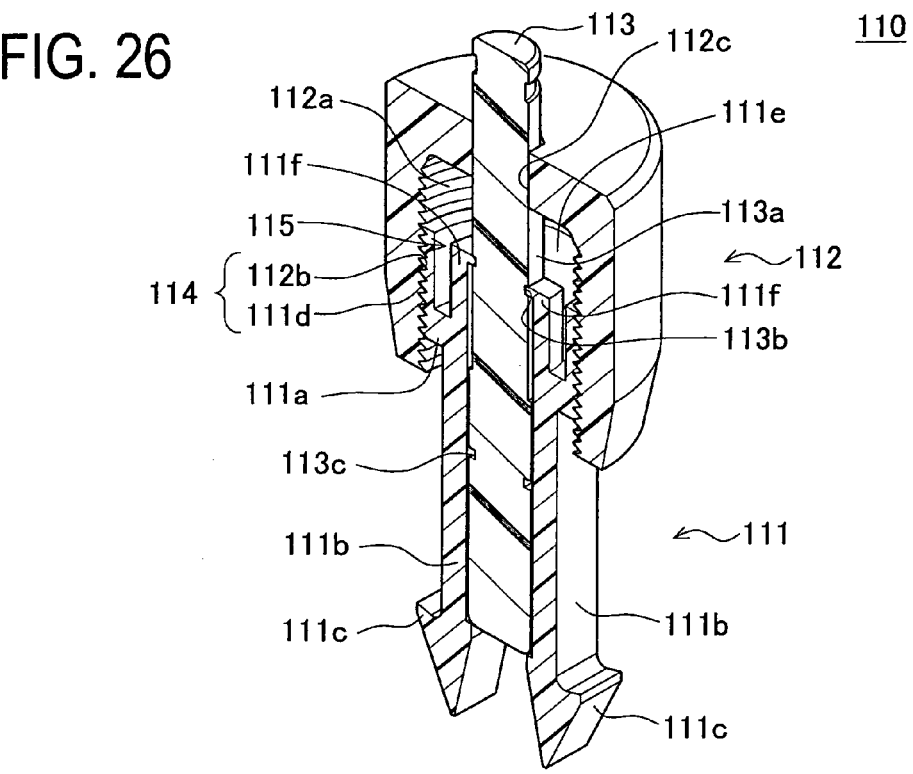
FIG. 26 is a sectional view of the clamping member of FIG. 24, showing a state where the rod member is placed in a first position.
Figure 27:
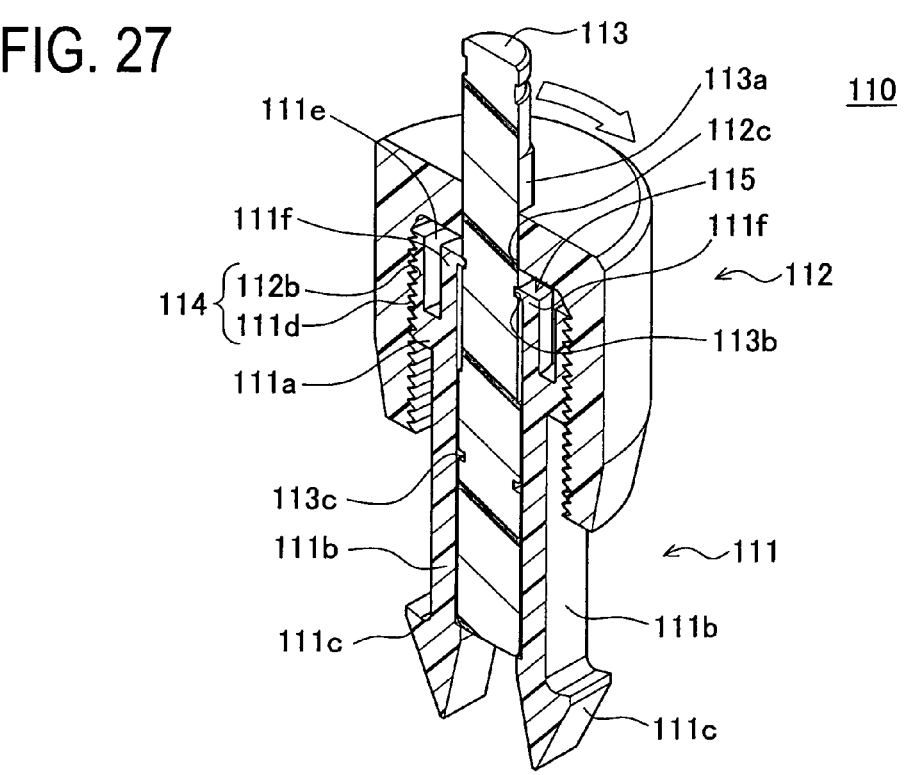
FIG. 27 is a sectional view of the clamping member of FIG. 24, showing a clamping force generating state.

A fourth embodiment of a fluid device connecting structure according to the present invention will be described below. FIG. 24 is an external perspective view of the coupling member 7B and a clamping member 110 to be used in a fluid device connecting structure of this embodiment. FIGS. 25 to 27 are sectional views of the clamping member 110 shown in FIG. 24. FIG. 25 shows a state before an initial assembly. FIG. 26 shows a state after the initial assembly. FIG. 27 shows a clamping force generating state.

The fluid device connecting structure of the fourth embodiment is identical in structure to that of the third embodiment excepting the clamping member 110. Accordingly, the following explanation is focused on the clamping member 110 by using the same reference signs for the same or similar components as those of the third embodiment without their detailed explanation.

<Configuration of Clamping Member>

As shown in FIG. 24, the clamping member 110 is attached in the attachment holes 81 and 85 of the coupling member 7B. The clamping member 110 is constituted of a clip member 111, a nut member 11, and a rod member 113. These clip member 111, nut member 112, and rod member 113 are made of resin.

As shown in FIGS. 25 to 27, the clip member 111 includes a cylindrical portion 111a and a pair of flexible pieces 111b vertically extending therefrom downward. The pair of flexible pieces 111b are inserted in the attachment holes 81 and 85 and held against rotation. Each flexible piece 111b is formed at its distal end with a hooked locking portion 111c protruding sideways to be engageable with the extended portion 9a. Each locking portion 111c has a slant outer surface, which is tapered in front view, whereby the flexible piece 111b is easily warped or by pressure of the inner walls of the attachment holes 81 and 85. In the flexible pieces 111b, guide grooves 111g are formed on surfaces facing each other. Each guide groove 111g serves to guide sliding of the rod member 113.

The cylindrical portion 111a has external threads 111d on an outer periphery. The cylindrical portion 111a has a bottom-closed hole 111e opening on an opposite side from the flexible pieces 111b. On the bottom of the hole 111e, a pair of positioning protrusions 111f are vertically provided around an opening through which the rod member 113 is slidably inserted. Each positioning protrusion 111f has an inwardly bent distal end.

The nut member 112 has a cup shape having a hollow part 112a opening on one end face (a lower end face in FIG. 25). The hollow part 112a has internal threads 112b on an inner surface which is engaged with the external threads 111d to constitute a screw part 114. The nut member 112 is formed on top thereof with a through hole 112c through which the rod member 113 runs. This through hole 112c is formed to have a polygonal outer shape (a hexagonal shape in this embodiment).

The rod member 113 is slidably held by the nut member 112 and the clip member 111. The rod member 113 has an outer periphery with a synchronization face (sync face) 113a having a polygonal outer shape conforming to the through hole 112c.

The rod member 113 is formed with a first positioning circumferential groove 113b in the sync face 113a. The rod member 113 is further formed with a second circumferential groove 113b below the sync face 113a. The first and second positioning grooves 113b and 113c are formed in parallel with each other and perpendicular to the central axis of the rod member 113 and configured to slidably receive the bent ends of the positioning protrusions 111f of the clip member 111. In this embodiment, each of the first and second grooves 113b and 113c has a bottom face of a hexagonal shape in cross-section of the rod member 113. The bottom faces of the first and second grooves 113b and 113c may be not formed in only the hexagonal shape but also a polygonal shape or an elliptical shape in cross-section of the rod member 113.

Each positioning protrusion 111f will not be elastically deformed while each bent end is in contact with the center of a flat portion of the bottom face of the first positioning groove 113b. As the nut member 112 is rotated, the rod member 113 is synchronously rotated. Simultaneously each protrusion 111f is elastically deformed as coming from the center of the flat portion to a peak or vertex of the bottom face of the groove 113b, causing resistance with respect to the bottom face. The clamping member 110 produces resistance at fixed intervals during rotation of the nut member 112. In such clamping member 110, the positioning protrusions 111f and the first positioning groove 113b constitute a rotation inhibition mechanism 115.

<Operations and Advantages of the Fluid Device Connecting Structure of the Fourth Embodiment>

When the clamping member 110 is to be attached to the coupling member 7B, the rod member 113 is first pulled upward from the nut member 112 and the bent ends of the positioning protrusions 111f are engaged in the second positioning groove 113c (this position of the rod member 113 is referred to as a "second position") as shown in FIGS. 24 and 25. The flexible pieces 111b are thus allowed to be elastically deformed to tilt inward, closer to each other.

The locking portions 111c of the flexible pieces 111b are aligned with the attachment hole 81 and then pushed therein to attach the clamping member 110 to the coupling member 7B. The clip member 111 is inserted in the holes 81 and 85 in such a way that the slant surfaces of the locking portions 111c are pressed by the inner wall of the hole 81, thereby elastically warping or tilting the flexible pieces 111b inward to be inserted in the holes 81 and 85. When the locking portions 111c pass through the holes 81 and 85 and are released from the pressure, the flexible pieces 111b are deformed outward to return to their original shapes, causing the locking portions 111c to engage with the surface of the extended portion 9a around the hole 85.

As shown in FIGS. 24 and 26, the rod member 113 is pushed downward in the nut member 112 to make the positioning protrusions 111f engage in the first positioning groove 113b (this position of the rod member 113 is referred to as a "first position"). At this time, the rod member 113 is guided along the through hole 112c and the guide grooves 111g to move down without rotating the nut member 112. Accordingly, the rod member 113 is deeply inserted up to the vicinity of the locking portions 111c, thereby preventing the flexible pieces 111b from becoming inwardly deformed. Since the flexible pieces 111b will not be deformed as above, the clip member 111 will not disengage from the attachment holes 81 and 85 even when the clamping member 110 is strongly pulled upward.

According to the fluid device connecting structure of the fourth embodiment, as mentioned above, the clamping member 110 can be attached to the coupling member 7B by a simple one touch operation of aligning and inserting the flexible pieces 111b of the clamping member 110 with respect to the attachment holes 81 and 85 of the coupling member 7B.

On the other hand, when the sealing strength of the first and second connection parts 4 and 5 lowers, the nut member 102 is rotated in a direction indicated by an arrow in FIGS. 24 and 27 while the positioning protrusions 111f remain engaged in the first positioning groove 113b. Then, the clip member 111 is lifted upward in the hollow part 112a of the nut member 112 by screw feed of the screw part 114. Accordingly, the distance between the nut member 112 and the locking portions 111c is decreased, thereby bringing the extended portions 8a and 9a closer to each other to eliminate the clearance S1 shown in FIG. 24. The coupling member 7B thus generates a clamping force to draw the first and second connection parts 4 and 5 to each other to enhance the sealing strength.

In the clamping member 110 attached to the coupling member 7B, as mentioned above, the rod member 113 is placed in the first position for inhibiting deformation of the flexible pieces 111b. Therefore, even when the clip member 111 is pulled upward strongly by screwing the nut member 112 on the rod member 113, the clamping member 110 will not disengage from the attachment holes 81 and 85.

The protruding length of the rod member 113 from the nut member 112 is different between the cases where the rod member 113 is placed in the first position, where rod member 113 is placed in the second position, and where the clamping member 110 is in a clamping force generating state to draw the first and second connection parts 4 and 5 to each other. Accordingly, an operator can easily check by visually observing the protruding length of the rod member 113 whether the rod member 113 is placed in the first position for inhibiting disengagement of the clamping member 110 or the clamping member 110 is generating the clamping force to the connection parts 4 and 5.

In the clamping member 110, meanwhile, the bent ends of the positioning protrusions 111*f* are in slidably contact with the polygonal bottom face of the first positioning groove 113*b*. The clip member 111 with the positioning protrusions 111*f* is inserted in the attachment holes 81 and 85 while the flexible pieces 111*b* are held against rotation. When the nut member 112 is rotated together with the rod member 113, each protrusion 111*f* is not elastically deformed as long as the center of the flat portion of the bottom face of the groove 113*b* contacts with the bent end of each protrusion 111*f*. Thus, the rod member 113 will not cause resistance with respect to the positioning protrusions 111*f*. On the other hand, while an area from the center of the flat portion to the peak of the bottom face contacts with each protrusion 111*f*, each protrusion 111*f* is elastically deformed outward and hence the rod member 113 will cause resistance with respect to the protrusions 111*f*. In this case, the nut member 112 is hard to rotate. Consequently, even when the nut member 112 of the clamping member 110 is about to loosen due to deformation or the like, the rotation of the nut member 112 is restrained by the resistance caused between the protrusions 111*f* and the first positioning groove 113*b*.

In the fluid device connecting structure of the fourth embodiment, as mentioned above, the first and second split members 8B and 9B of the coupling member 7B are formed with the attachment holes 81 and 85 in which the clamping member 110 is attached, and the clamping member 110 includes the clip member 111 that is inserted in the holes 81 and 85 and held against rotation, the nut member 112 threadedly mounted on the clip member 111, and the rotation inhibiting mechanism 115 for inhibiting rotation of the nut member 112 relative to the clip member 111. According to the fluid device connecting structure of the fourth embodiment, therefore, even when the first and second connection parts 4 and 5 and the coupling member 7B are creep deformed or the like, the rotation inhibiting mechanism 115 inhibits the rotation of the nut member 112 and hence the connection parts 4 and 5 can be maintained in the connecting relation.

Fifth Embodiment

Figure 28:
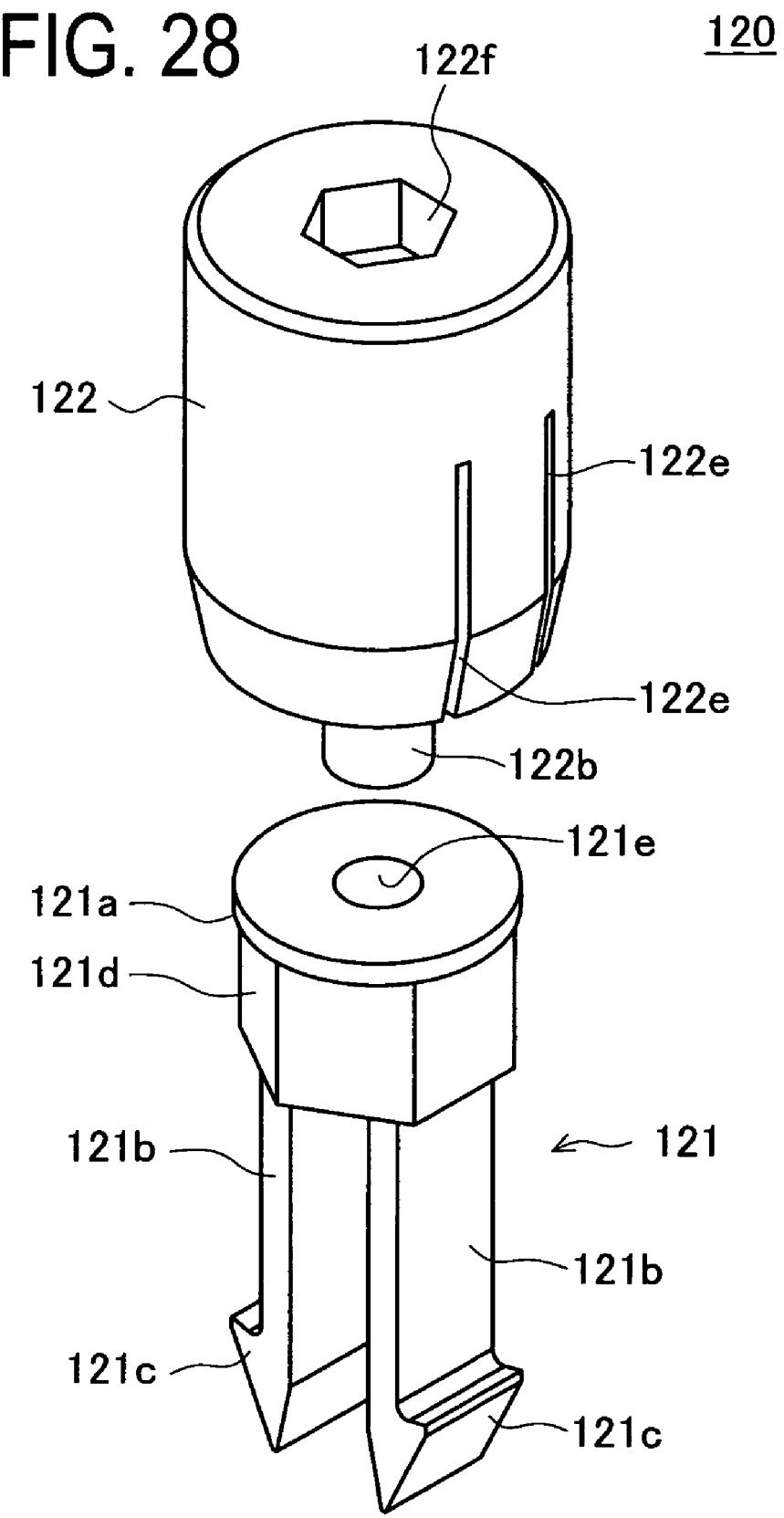
FIG. 28 is an exploded perspective view of a clamping member to be used in a fluid device connecting structure in a fifth embodiment according to the present invention.
Figure 29:
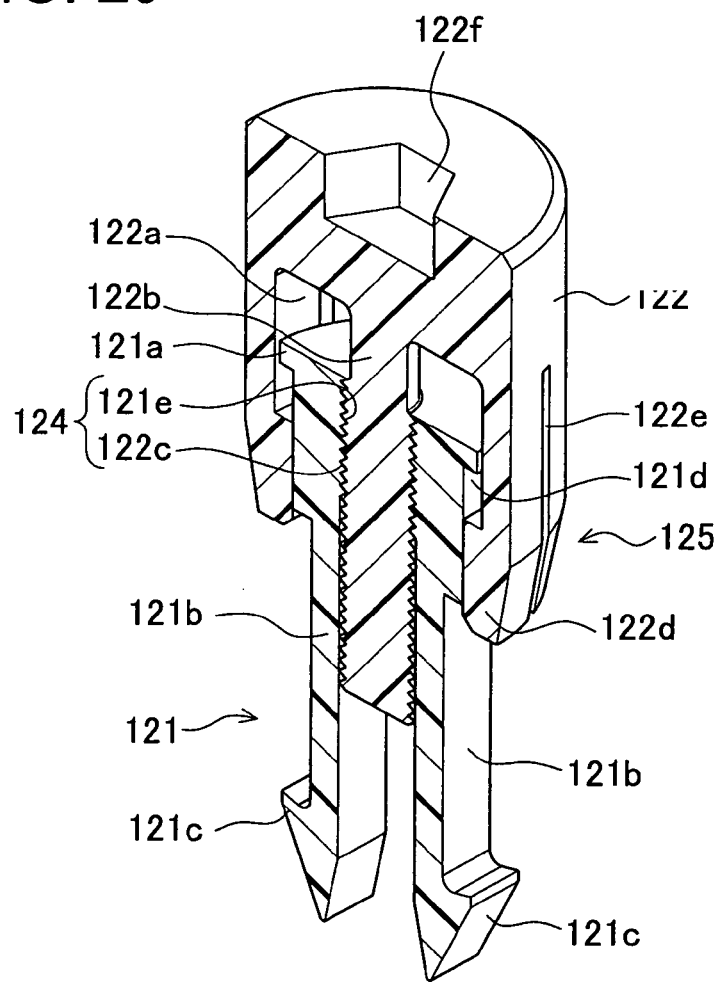
FIG. 29 is a sectional view of the clamping member of FIG. 28.

A fifth embodiment of a fluid device connecting structure according to the present invention will be described below. FIG. 28 is an exploded perspective view of a clamping member 120 to be used in a fluid device connecting structure of this embodiment. FIG. 29 is a sectional view of the clamping member 120 shown in FIG. 28.

The fluid device connecting structure of the fifth embodiment is identical in structure to that of the third embodiment excepting the clamping member 120. Accordingly, the following explanation is focused on the clamping member 120 by using the same reference signs for the same or similar components as those of the third embodiment without their detailed explanation.

<Configuration of Clamping Member>

As shown in FIGS. 28 and 29, the clamping member 120 is constituted of a resin clip member 121 and a resin nut member 122. The clamping member 120 is attached to the coupling member 7B by inserting the clip member 121 into the attachment holes 81 and 85. As shown in FIG. 29, a rotation inhibiting mechanism 125 is provided between the clip member 121 and the nut member 122.

The clip member 121 includes a columnar portion 121*a* centrally formed with an internal threaded hole 121*e*. The columnar portion 121*a* is further provided with a pair of flexible pieces 121*b* vertically extending downward around one open end (a lower end in FIG. 29) of the hole 121*e*. Each flexible piece 121*b* is formed with a locking portion 121*c* protruding sideways. Each locking portion 121*c* has a slant outer surface, which is tapered in front view. The outer periphery of the columnar portion 121*a* has a chamfered lower portion forming a polygonal loosening-preventing portion 121*d*.

The nut member 122 has a cup shape having a hollow part 122*a* opening on one end face (a lower end face in the figure) as shown in FIG. 29. The nut member 122 includes a rod portion 122*b* axially protruding from the bottom (i.e. an upper wall in FIG. 29) of the hollow part 122*a*. The rod portion 122*b* is threadedly engaged in the internal threaded hole 121*e*. External threads 122*c* formed on the outer periphery of the rod portion 122*b* and the internal threaded hole 121*e* constitute a screw part 124.

A sliding portion 122*d* is formed inwardly protruding from the inner surface of the hollow part 122*a* to slidably contact with the loosening-preventing part 121*d*. The sliding portion 122*d* has an inner surface of a polygonal shape conforming the loosening-preventing part 121*d*. The nut member 122 is formed, in the periphery, with a plurality of slits 122*e* extending in the axial direction of the nut member 122 and opening in the lower end face, so that the nut member 122 can be rotated relative to the clip member 121 by changing an opening area of the nut member 122. A tool attachment hole 122*f* is formed on the top of the nut member 122.

<Operations and Advantages of the Fluid Device Connecting Structure of the Fifth Embodiment>

When the clamping member 120 is to be attached to the coupling member 7B, the screw part 124 is loosened to move the clip member 121 downward relative to the nut member 122. The rod portion 122*b* is therefore relatively moved upward between the flexible pieces 121*b*, thus allowing the flexible pieces 121*b* to be elastically deformed inward.

The clip member 121 is aligned with and inserted in the attachment holes 81 and 85 of the coupling member 7B to attach the clamping member 120 to the coupling member 7B. The clip member 121 is inserted in the attachment holes 81 and 85 in such a way that the slant surfaces of the locking portions 121*c* are pressed by the inner wall of the hole 81, thereby elastically deforming the flexible pieces 121*b* inward to be inserted in the holes 81 and 85. When the locking portions 121*c* pass through the holes 81 and 85 and are released from the pressure, the flexible pieces 121*b* are deformed outward to return to their original shapes, causing the locking portions 121*c* to engage with the surface of the extended portion 9*a* around the hole 85.

The nut member 122 of the clamping member 120 is then screwed on the clip member 121. The clip member 121 is thus lifted upward toward the nut member 122 by screw feed of the screw part 124. Accordingly, the extended portions 8*a* and 9*a* are held with the clearance S1 between the nut member 122 and the locking portions 121c.

When the nut member 122 is screwed on the clip member 121, the rod portion 122b is relatively moved downward between the flexible pieces 121b, restraining the flexible pieces 121b from becoming elastically deformed inward. The flexible pieces 121b are thus held against elastic deformation. Accordingly, even when the clamping member 120 is pulled upward strongly, the clamping member 120 will not disengage from the attachment holes 81 and 85.

When the sealing strength of the first and second connection parts 4 and 5 lowers, the nut member 120 is further screwed on the clip member 121 with a tool attached in the tool attachment hole 122f of the nut member 120. Accordingly, the distance between the nut member 120 and the locking portions 121c is shortened, thereby bringing the extended portions 8a and 9a closer to each other to eliminate the clearance S1. Consequently, the coupling member 7B generates a clamping force to draw the first and second connection parts 4 and 5 to each other, with the result of enhanced sealing strength.

As the nut member 122 of the clamping member 120 is rotated, resistance is produced between the contact faces of the sliding portion 122d and the loosening-preventing portion 121d at the time when the contact faces are changed. Even when the nut member 122 of the clamping member 120 is about to loosen by deformation or the like, the nut member 122 is restrained from rotating by the resistance caused between the sliding portion 122d and the loosening-preventing portion 121d.

In the fluid device connecting structure of the fifth embodiment, as mentioned above, the first and second split members 8B and 9B of the coupling member 7B are formed with the attachment holes 81 and 85 in which the clamping member 120 is attached, and the clamping member 120 includes the clip member 121 inserted and held against rotation in the holes 81 and 85, the nut member 122 threadedly mounted on the clip member 121, and the rotation inhibiting mechanism 125 for inhibiting rotation of the nut member 122 relative to the clip member 121. According to the fluid device connecting structure of the fifth embodiment, therefore, even when the first and second connection parts 4 and 5 and the coupling member 7B are creep deformed or the like, the rotation inhibiting mechanism 125 restrains the rotation of the nut member 122 and hence the connection parts 4 and 5 can be maintained in the connecting relation.

Sixth Embodiment

Figure 30:
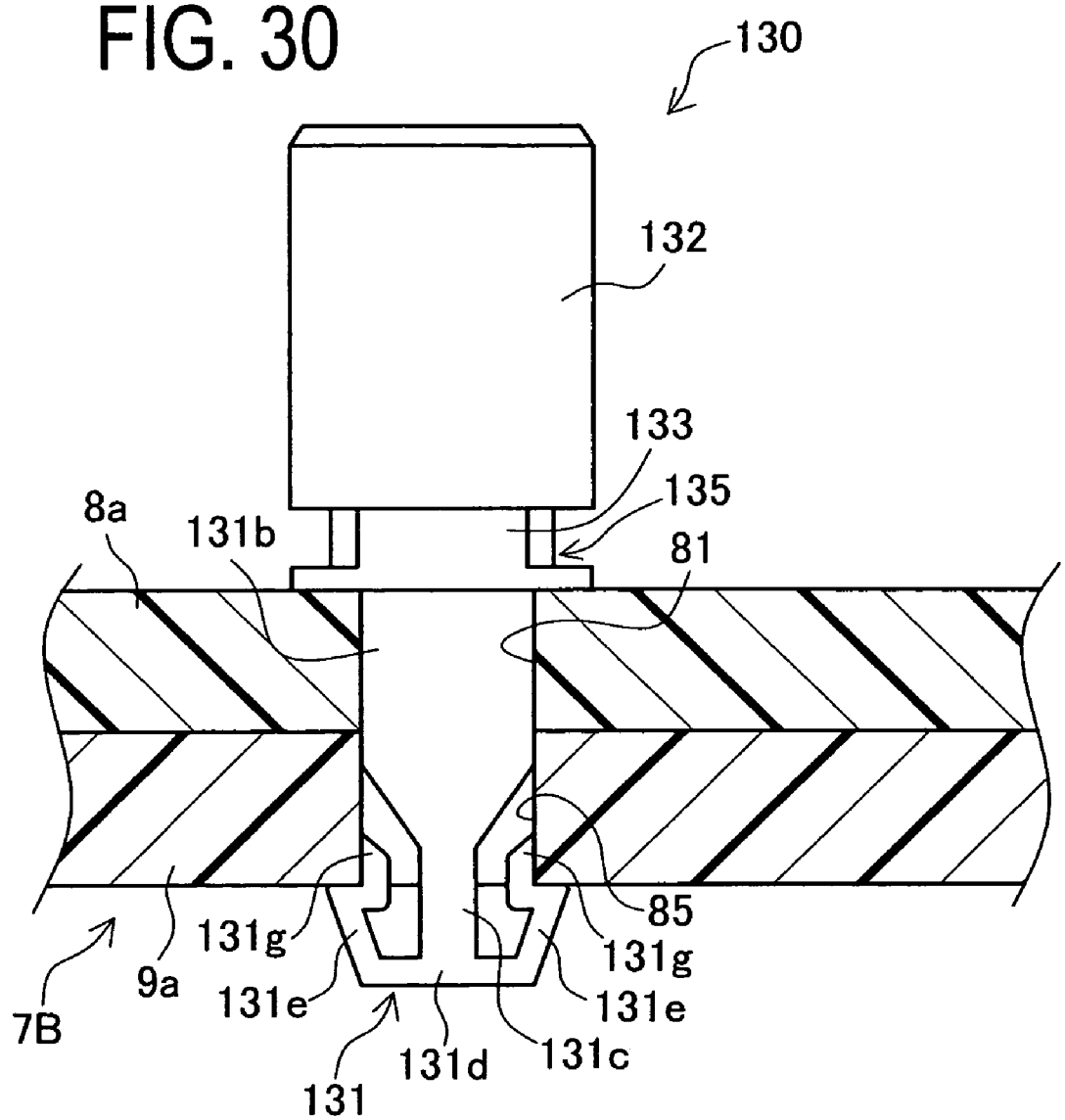
FIG. 30 is a view showing a state where a clamping member is attached to a coupling member to be used in a fluid device connecting structure in a sixth embodiment according to the present invention.
Figure 32:
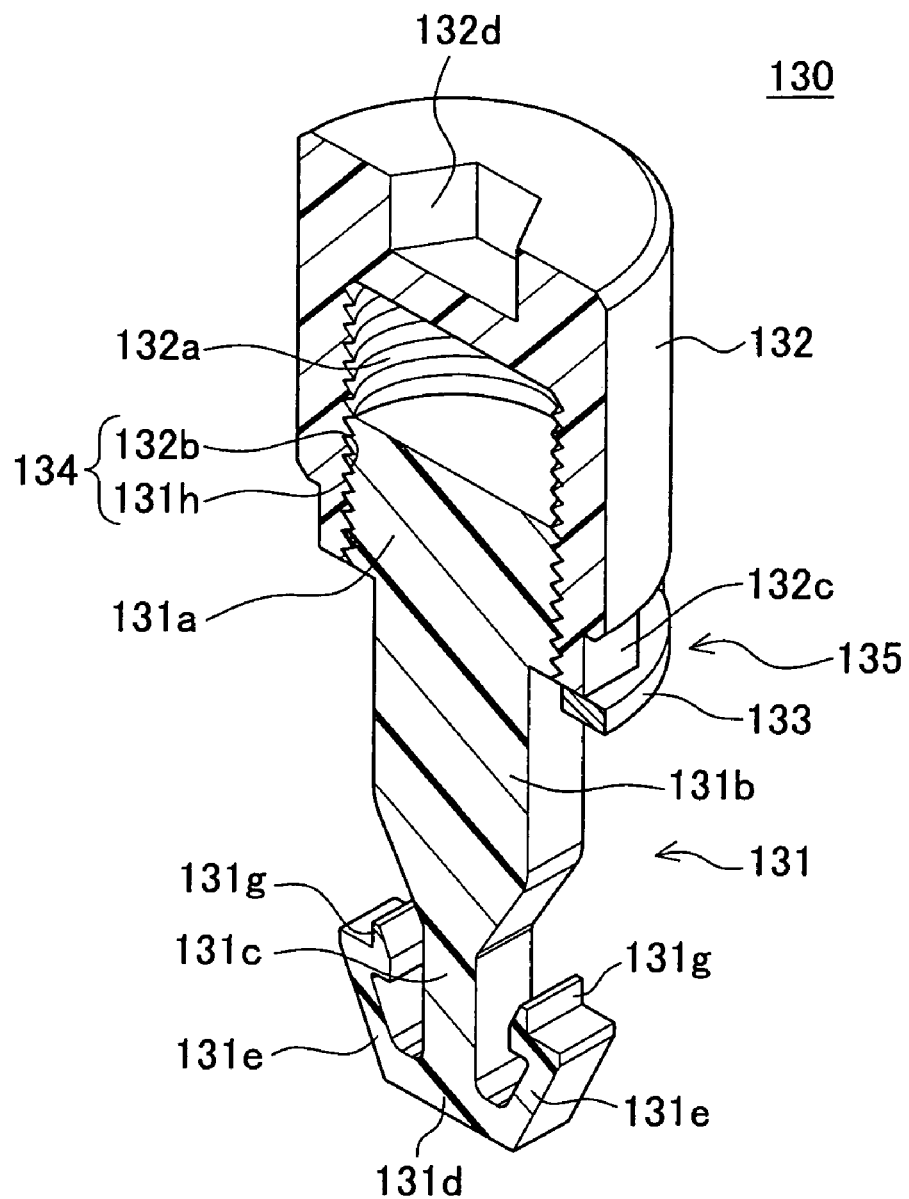
FIG. 32 is another longitudinal sectional view of the clamping member of FIG. 30.

A sixth embodiment of a fluid device connecting structure according to the present invention will be described below. FIG. 30 is a view showing a state where a clamping member 130 attached to the coupling member 7B to be used in the fluid device connecting structure of this embodiment. FIG. 31 is an exploded view of the clamping member 130 of FIG. 30. FIG. 32 is a longitudinal sectional view of the clamping member 130 of FIG. 30.

The fluid device connecting structure of the sixth embodiment is identical in structure to that of the third embodiment excepting the clamping member 130. Accordingly, the following explanation will be focused on the clamping member 130 by using the same reference signs for the same or similar components as those of the third embodiment without their detailed explanation.

<Configuration of Clamping Member>

The clamping member 130 includes a resin clip member 131 and a resin nut member 132 threadedly engaged on the clip member 131. The clamping member 130 further includes a rotation inhibiting plate 133 made of resin placed between the nut member 132 and the clip member 131, constituting a rotation inhibiting mechanism 135 for preventing rotation of the nut 132.

As shown in FIG. 30, the clip member 131 includes a body portion 131b having a rectangular cross section to prevent rotation of the clip member 131 when inserted in the attachment holes 81 and 85. A lower part of the body portion 131b is made narrower than an upper part to form a leg portion 131c. This leg portion 131c is configured to protrude out of the attachment hole 85 when the clamping member 130 is attached to the coupling member 7B. A lower end of the leg portion 131c is continuous with a support portion 131d equal to or slightly smaller in width than the body portion 131b.

The support portion 131d is provided, at both ends, with a pair of flexible pieces 131e each protruding toward the body portion 131a. Each flexible piece 131e has a distal end with a claw 131g which will be hooked on the inner wall of the attachment hole 85 near an open end thereof when the clamping member 130 is attached to the coupling member 7B.

As shown in FIG. 31, a columnar portion 131a is integrally formed on top of the body portion 131b. The columnar portion 131a is formed with external threads 131h on an outer periphery.

As shown in FIG. 32, the nut member 132 has a cup shape having a hollow part 132a opening on one end face (a lower end face in the figure). The hollow part 132a has internal threads 132b on an inner surface. The internal threads 132b are threadedly engaged with the external threads 131h of the clip member 131, constituting the screw part 134.

As shown in FIG. 31, the nut member 132 is formed, on its outer lower periphery, with an engagement face 132c engageable with the rotation stopper plate 133. This engagement face 132c is polygonal in cross section to allow surface contact with the rotation stopper plate 133. A tool attachment hole 132d is formed on the top of the nut member 132.

The rotation stopper plate 133 is formed in a disc shape with a long groove 133a opening in an outer edge. This plate 133 is attached to the clip member 131 by inserting the body portion 131b of the clip member 131 in the groove 133a. The rotation stopper plate 133 includes a pair of rotation stopper portions 133b formed vertically protruding and arranged on both sides of the groove 133a. The rotation stopper portions 133b are provided to surface contact with the flat portions of the engagement face 132 of the nut member 132 in order to inhibit the rotation of the nut member 132.

<Operations and Advantages of the Fluid Device Connecting Structure of the Sixth Embodiment>

When the clamping member 130 is to be attached to the coupling member 7B, the support portion 131d of the clip member 131 is aligned with the attachment hole 81 of the coupling member 7B and inserted therein under pressure. At that time, the flexible pieces 131e are pressed by the inner wall of the hole 81 to be elastically deformed inward toward the leg portion 131c, and are inserted in the attachment holes 81 and 85. After passing through the holes 81 and 85, the flexible pieces 131e are deformed outward to come apart from the leg portion 131c to return to their original shapes and abut on the extended portion 9a around the hole 85. In this state, the claws 131g are hooked on the inner wall of the hole 85, thereby preventing the flexible pieces 131e from excessively tilting outward leading to deformation and breakage.

The clamping member 130 holds the rotation stopper plate 133 and the extended portions 8a and 9a of the coupling member 7B between the nut member 132 and the flexible pieces 131e. In this state, the extended portions 8a and 9a are held with the clearance S1.

When the nut member 132 is about to loosen by deformation or the like, the engagement face 132c of the nut member 132 is caused to change from a flat portion that contacts with the rotation stopper portion 133b of the plate 133 to a peak (a vertical). Accordingly, the peak of the engagement face 132c abuts on the rotation stopper portion 133b, and the nut member 132 attempts to rotate together with the plate 133.

However, the rotation stopper plate 133 is held against rotation by the body portion 131b of the clip member 131 engaged in the groove 133a. In addition, the clip member 131 is inserted in the attachment holes 81 and 85 with the body portion 131b held against rotation. Consequently, even when the nut member 132 is about to loosen and rotate, the engagement face 132c is locked with respect to the extended portions 8a and 9a of the coupling member 7B by the stopper portions 133b of the rotation stopper plate 133 and the body portion 131b of the clip member 131, and thus the nut member 132 is inhibited from rotating.

In the fluid device connecting structure of the sixth embodiment, as mentioned above, the first and second split members 8B and 9B of the coupling member 7B are formed with the attachment holes 81 and 85 in which the clamping member 130 is attached, and the clamping member 130 includes the clip member 131 inserted in the holes 81 and 85 and held against rotation, the nut member 132 threadedly mounted on the clip member 131, and the rotation inhibiting mechanism 135 for inhibiting rotation of the nut member 132 relative to the clip member 131. Accordingly, even when the first and second connection parts 4 and 5 and the coupling member 7B are creep deformed or the like, the rotation inhibiting mechanism 135 inhibits the rotation of the nut member 132 and hence the connection parts 4 and 5 can be maintained in the connecting relation.

When the nut member 132 is screwed on the clip member 131, meanwhile, the distance, between the nut member 132 and the flexible pieces 131e is shortened, bringing the extended portions 8a and 9a of the coupling member 7B closer to each other to eliminate the clearance S1. At that time, the flexible pieces 131e are firmly pressed against the extended portion 9a and tend to tilt outward. However, each claw 131g formed at the distal end of each flexible piece 131e is hooked on the inner wall of the attachment hole 85 and therefore each flexible piece 131e is restricted from tilting outward. Consequently, while the clamping member 130 is in a clamping force generating state to draw the connection parts 4 and 5 to each other, each flexible piece 131e can be prevented from tilting outward leading to deformation and breakage.

Seventh Embodiment

Figure 33:
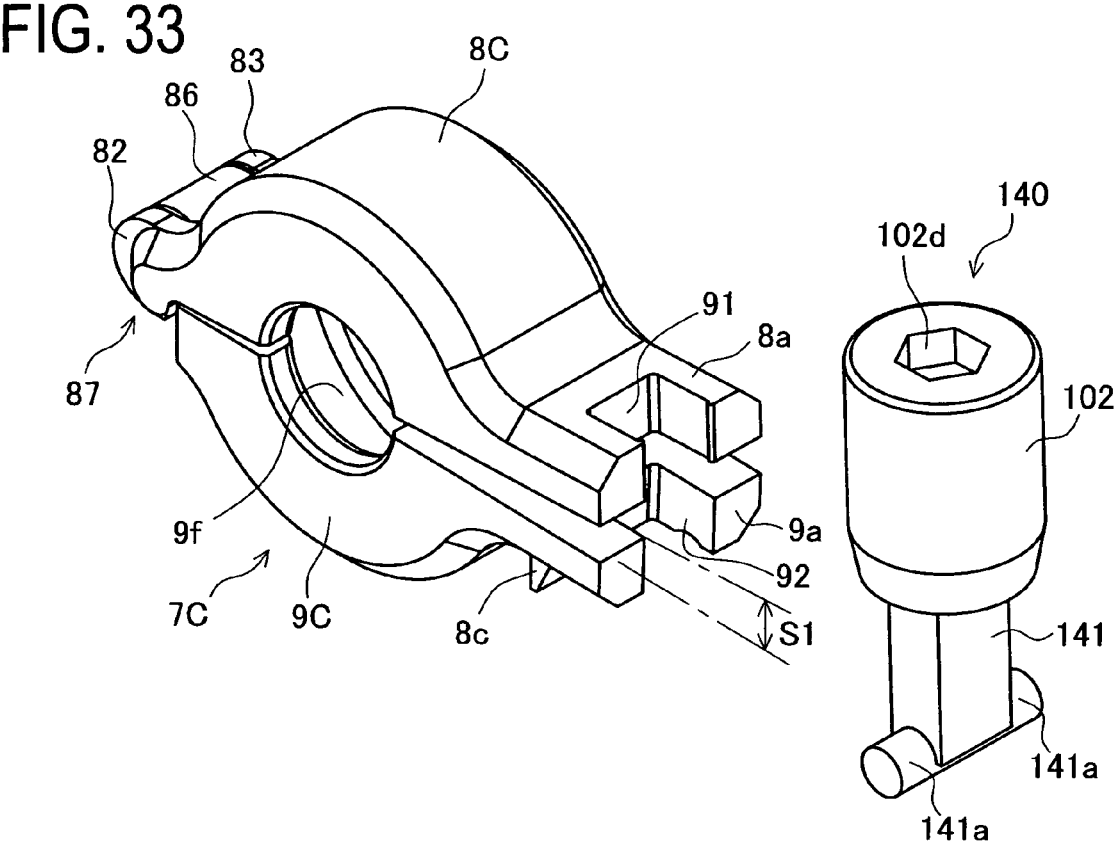
FIG. 33 is an exploded perspective view of a coupling member and a clamping member to be used in a fluid device connecting structure in a seventh embodiment according to the present invention.
Figure 34:
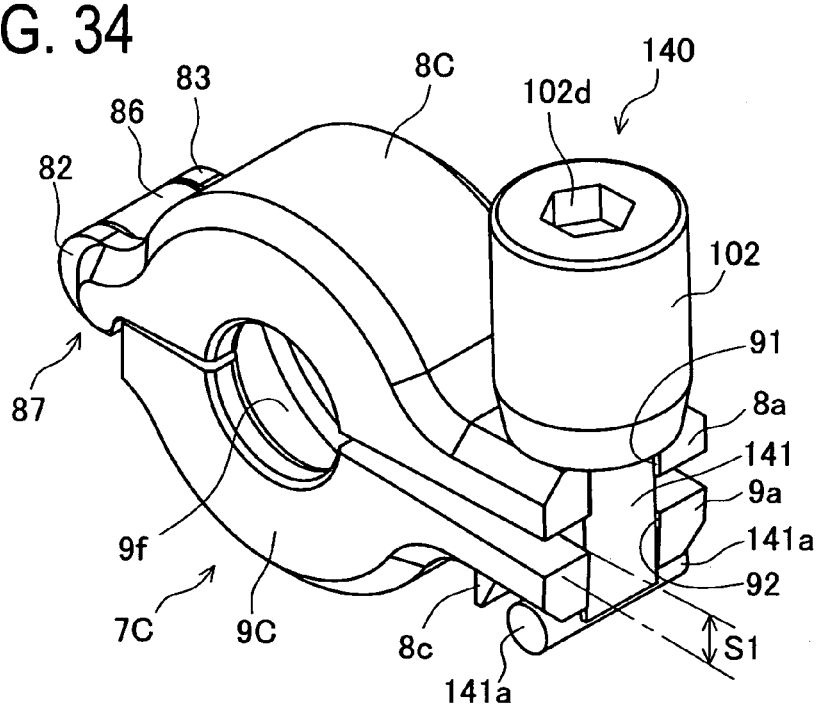
FIG. 34 is an external perspective view showing a state where the clamping member of FIG. 33 is attached to a coupling member.

A seventh embodiment of a fluid device connecting structure according to the present invention will be described below. FIG. 33 is an exploded perspective view of a coupling member 7C and a clamping member 140 to be used in the fluid device connecting structure of this embodiment. FIG. 34 is an external perspective view showing a state where the clamping member 140 is attached to the coupling member 7C.

The fluid device connecting structure of the seventh embodiment is identical in structure to that of the third embodiment excepting the coupling member 7C and the clamping member 140. Accordingly, the following explanation will be focused on the coupling member 7C and the clamping member 140 by using the same reference signs for the same or similar components as those of the third embodiment without their detailed explanation.

<Configuration of Coupling Member>

The coupling member 7C is formed with attachment holes 91 and 92 (examples of the "attachment part") for attachment of the clamping member 140. Those holes 91 and 92 open in side surfaces of the extended portions 8a and 9a respectively.

<Configuration of Clamping Member>

The clamping member 140 includes a clip member 141 and the nut member 102 threadedly engaged on the clip member 141. The clip member 141 is formed in a rectangular parallelepiped shape to be held against rotation in the attachment grooves 91 and 92. At a lower end of the clip member 141, a pair of locking portions 141a is provided extending sideways to be engaged with the extended portion 9a on both sides of the groove 92. The clip member 141 is configured to prevent loosening of the nut member 102 by the rotation inhibiting mechanism 104 as in the third embodiment.

<Operations and Advantages of the Fluid Device Connecting Structure of the Seventh Embodiment>

The coupling member 7C is arranged such that a first split member 8C is rotated relative to a second split member 9C about the rotatable connecting part 87 and the locking claw 8c is inserted in the through hole 9c to engage the distal end 8d with the extended portion 9a. In this state, the first and second split members 8C and 9C are spaced with a clearance S1 between the extended portions 8a and 9a.

When the clamping member 140 is to be attached to the coupling member 7C, the clip member 141 is inserted in the attachment grooves 91 and 92 of the extended portions 8a and 9a through their open ends and is attached in place to the coupling member 7C.

In the fluid device connecting structure of the seventh embodiment, as mentioned above, the clip member 141 can be attached to the coupling member 7C easily by being simply inserted from the open ends of the grooves 91 and 92.

When the sealing strength of the first and second connection parts 4 and 5 lowers thereafter, the nut member 102 is rotated relative to the clip member 141. This shortens the distance between the nut member 102 and the locking portions 141a, bringing the extended portions 8a and 9a closer to each other to eliminate the clearance S1. Herein, the clip member 141 has a single lower end, not bifurcated. Accordingly, even when the nut member 102 is tightened, the lower end of the clip member 141 will not be deformed and the locking portions 141a will not be disengaged from the extended portion 9a.

Eighth Embodiment

Figure 35:
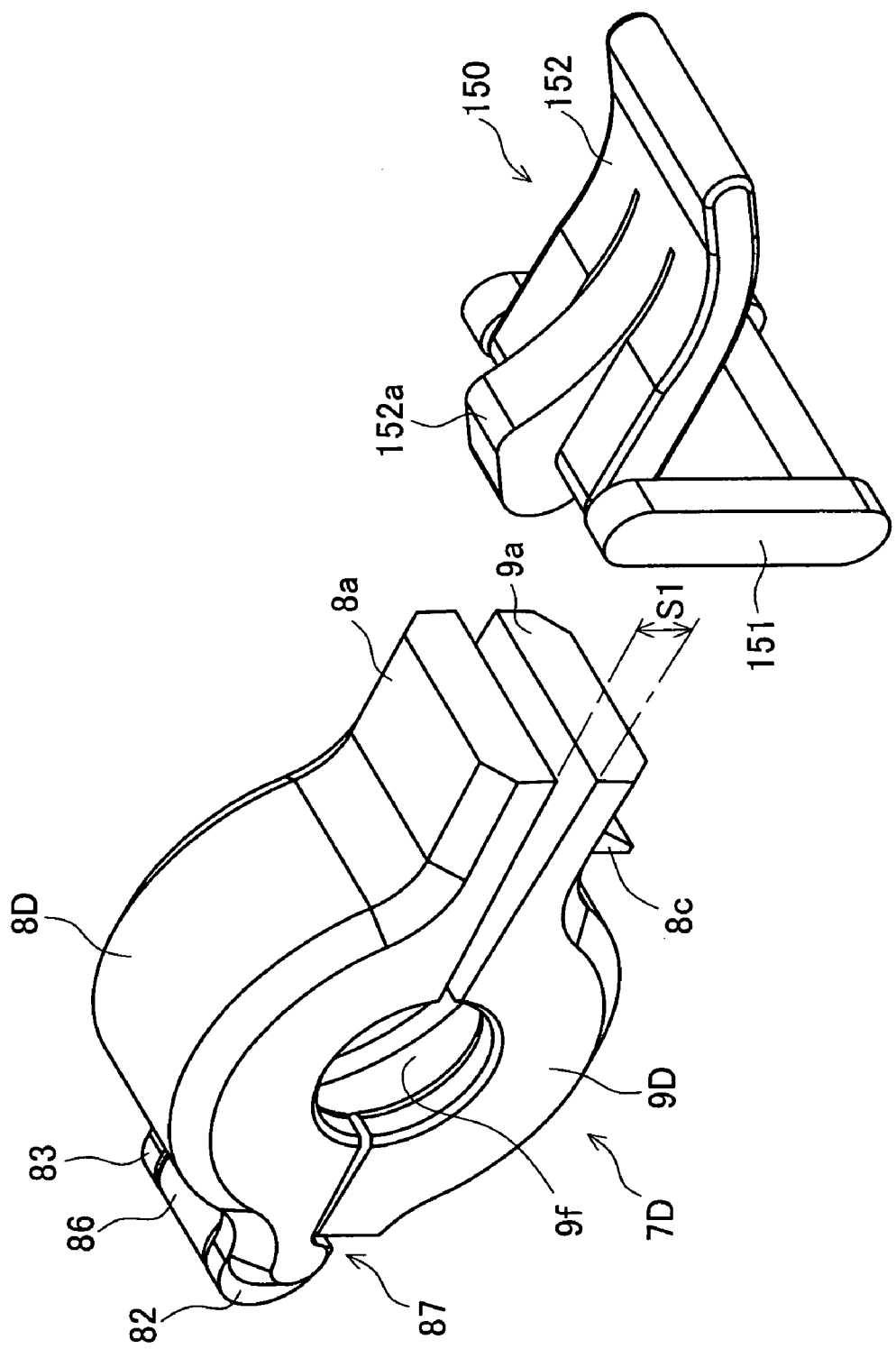
FIG. 35 is an external perspective view of a coupling member and a clamping member to be used in a fluid device connecting structure in an eighth embodiment according to the present invention.
Figure 36:
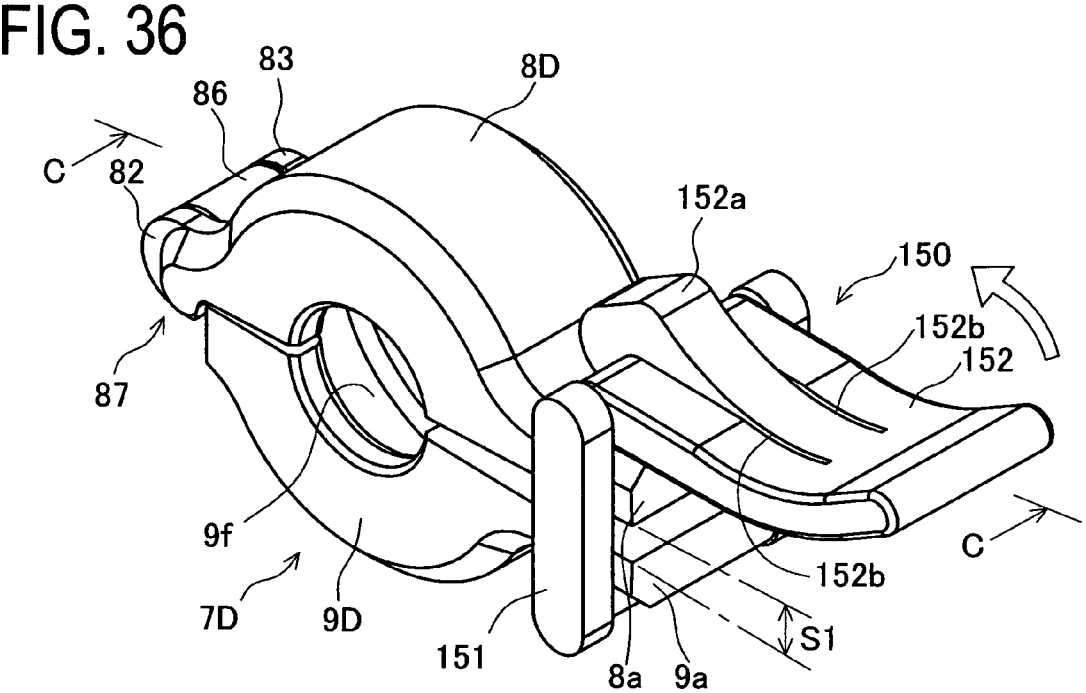
FIG. 36 is an external perspective view showing a state where a clamping member is attached to the coupling member shown in FIG. 35.
Figure 37:
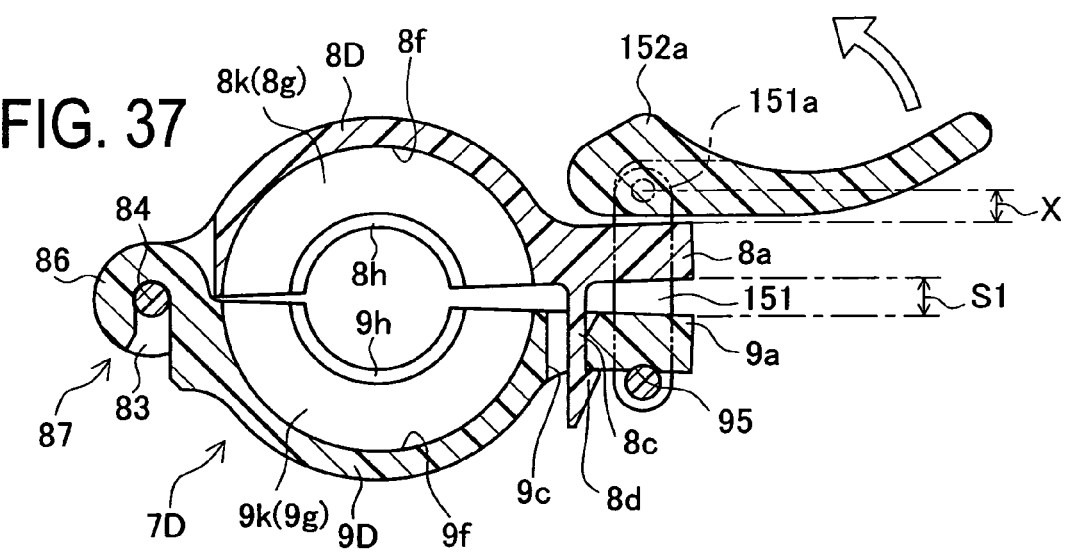
FIG. 37 is a sectional view taken along a line C-C in FIG. 36.
Figure 38:
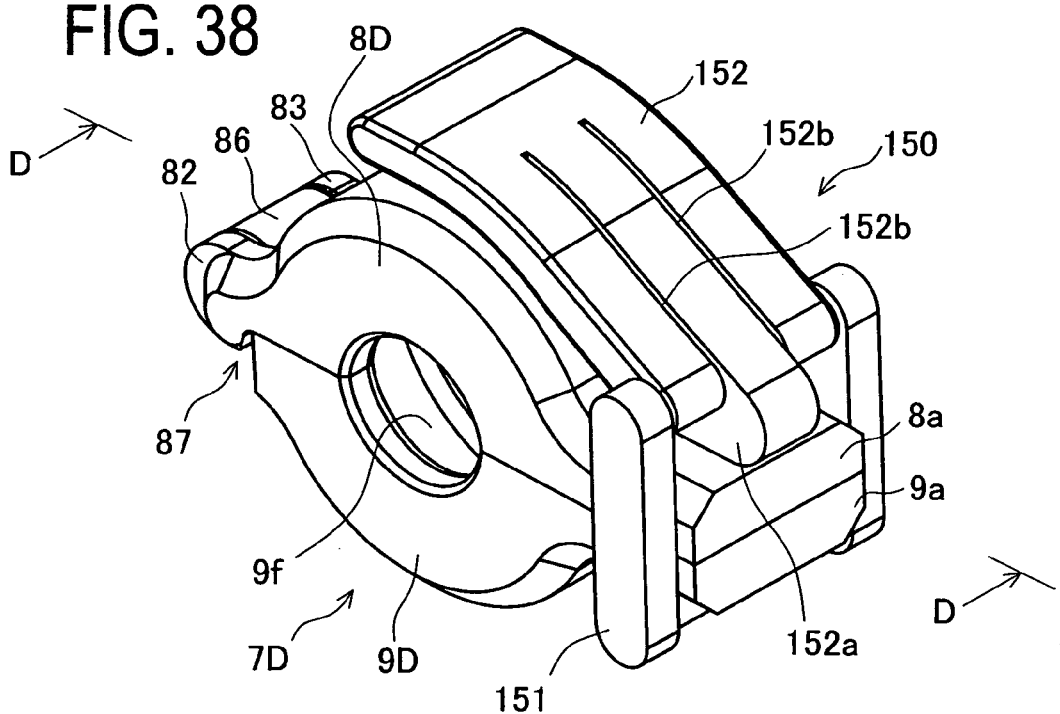
FIG. 38 is an external perspective view of the coupling member of FIG. 35, showing a clamping force generating state.
Figure 39:
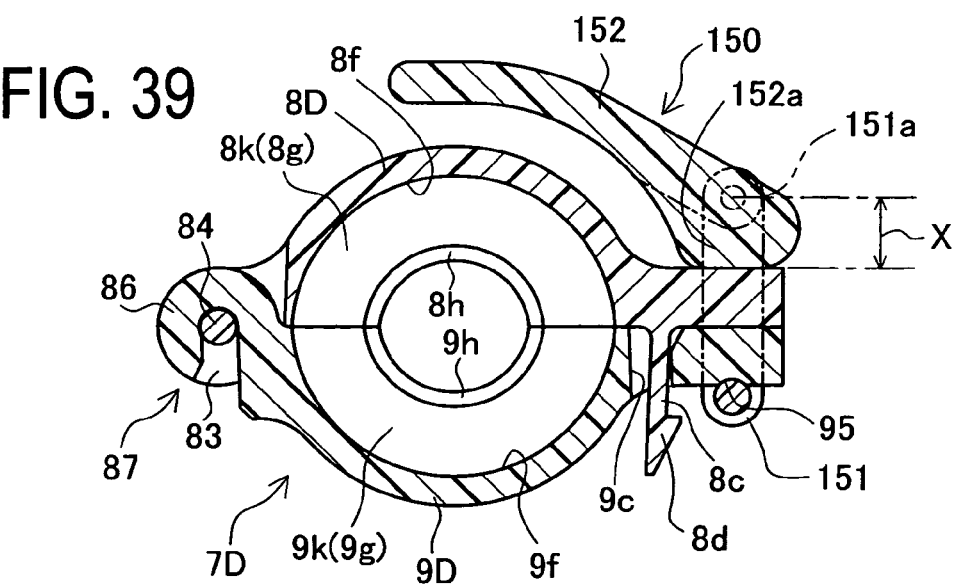
FIG. 39 is a sectional view taken along a line D-D in FIG. 38.

An eighth embodiment of a fluid device connecting structure of the invention will be described below. FIG. 35 is an external perspective view of a coupling member 7D and a clamping member 150 to be used in a fluid device connecting structure of this embodiment. FIG. 36 is an external perspective view showing a state where the clamping member 150 is attached to the coupling member 7D. FIG. 37 is a sectional view taken along a line C-C in FIG. 36. FIG. 38 is an external perspective view of the coupling member 7D, showing a clamping force generating state. FIG. 39 is a sectional view taken along a line D-D in FIG. 38.

The fluid device connecting structure of this embodiment is identical in structure to the fluid device connecting structure 1 of the first embodiment excepting extended portions 8a and 9a of the coupling member 7D and the clamping member 150. Accordingly, the following explanation will be focused on differences from the third embodiment by using the same reference signs for the same or similar components as those of the third embodiment without their detailed explanation.

<Configuration of Coupling Member>

The coupling member 7D in FIG. 35 is made of resin. The extended portions 8a and 9a of the coupling member 7D are formed with the locking claw 8c and the through hole 9c. As shown in FIG. 37, the extended portion 9a is formed on its outer surface with a groove 95 in which a clip member 151 of the clamping member 150 is engaged.

<Configuration of Clamping Member>

The clamping member 150 in FIG. 35 includes the resin clip member 151 and a resin rotatable member 152 rotatably held on the clip member 151. This clip member 151 is formed like an angular U-shaped frame having an upper open side. As shown in FIG. 37, the clip member 151 further includes a pair of support shafts 151a protruding toward each other from inner surfaces of both ends of the clip member 151 on the open side to support the rotatable member 152.

The rotatable member 152 is formed to be nearly circular arc and provided with a cam portion 152a at an end supported by the support shafts 151a. The cam portion 152a is designed to be raised on an end of the rotatable member 152 supported by the support shafts 151a and on one surface of the rotatable member 152 to change the distance between the support shaft 151a and the extended portion 8a, and to have a thickness equal to a thickness of the other end of the rotatable member 152 so as not to protrude therefrom. The rotatable member 152 is formed with slits 152b on both sides of the cam portion 152a so that the cam portion 152a is independently elastically deformed. In this embodiment, the cam portion 152a and the extended portion 8a constitute a "cam mechanism".

The cam portion 152a is configured such that the distance X between the axis of the support shaft 151a and a surface of the cam portion 152a with the extended portion 8a is minimum when the clamping member 150 is attached to the extended portions 8a and 9a with the clearance S1 as shown in FIGS. 36 and 37. The orientation of the rotatable member 152 in this state is referred to as a "first orientation". The cam portion 152a is arranged so that the distance X from the axis of the support shaft 151a to the surface with the extended portion 8a gradually increases as the cam portion 152a is rotated from the first orientation toward the coupling member 7D as indicated by an arrow in FIGS. 36 and 37, and the distance X becomes maximum when the extended portion 8a comes into contact with the extended portion 9a.

The cam portion 152a is also designed to be warped by the repulsive force of the extended portion 8a caused when the rotatable member 152 is further rotated after the extended portion 8a comes into contact with the extended portion 9a. The cam portion 152a has a flat surface which will come into contact with the extended portion 8a so that the rotatable member 152 is held in a second orientation in which the cam portion 152a which is warped as shown in FIGS. 38 and 39.

<Operations and Advantages of the Fluid Device Connecting Structure of the Eighth Embodiment>

The coupling member 7D is mounted on the connecting portions of the first and second connection parts 4 and 5 in such a way that a first split member 8D is rotated about the rotatable connecting part 87 serving as a supporting point and the locking claw 8c is inserted in the through hole 9c as shown in FIG. 35. The clamping member 150 will be attached to the coupling member 7D when the sealing strength of the connection parts 4 and 5 lowers.

For attachment of the clamping member 150, the rotatable member 152 is placed in the first orientation as shown in FIG. 35. The clamping member 150 is then set as shown in FIGS. 36 and 37 so that the extended portions 8a and 9a are inserted between the clip member 151 and the rotatable member 152 until the clip member 151 is engaged in the groove 95. Successively, the rotatable member 152 is rotated toward the coupling member 7D as indicated by an arrow in the figures. As the rotatable member 152 is rotated, the cam portion 152a slides in contact with the extended portion 8a.

When the extended portion 8a is pushed down by the cam portion 152a to come into contact with the extended portion 9a, the rotatable member 152 becomes hard to rotate due to the repulsive force of the extended portion 8a. However, the rotatable member 152 is further rotated toward the coupling member 7D, warping upward the cam portion 152a, until the flat surface of the cam portion 152a comes into surface contact with the extended portion 8a. Thus, the rotatable member 152 is held in the second orientation.

The cam portion 152a of the clamping member 150 in this state is warped and pressed against the extended portion 8a. Accordingly, even when the coupling member 7D is deformed for example, the rotatable member 152 of the clamping member 150 will not return from the second orientation to the first orientation. The coupling member 7D is therefore held in a state to generate the force to draw the first and second connection parts 4 and 5 to each other to enhance the sealing strength thereof.

The fluid device connecting structure of the eighth embodiment can draw the connection parts 4 and 5 to each other simply by rotating the clamping member 150 without any specific tool.

In the fluid device connecting structure of the eighth embodiment, the clamping member 150 includes the cam portion 152a which is configured to receive the repulsive force from the first split member 8D when the clamping member 150 rotatably attached to the connecting portions (i.e. the extended portions 8a and 9a) of the first and second split members 8D and 9D is rotated until the first split member 8D contacts with the second split member 9D. Accordingly, even if the first and second split members 8D and 9D receive a force to separate them from the first and second connection parts 4 and 5 and the coupling member 7D due to their thermal deformation, fluid pressure, or the like, the clamping member 150 is prevented from reversely rotating from the position for drawing the connection parts 4 and 5 to each other to the initial position. Therefore, the clamping member 150 can be maintained in the orientation capable of providing enhanced sealing strength.

Ninth Embodiment

Figure 40:
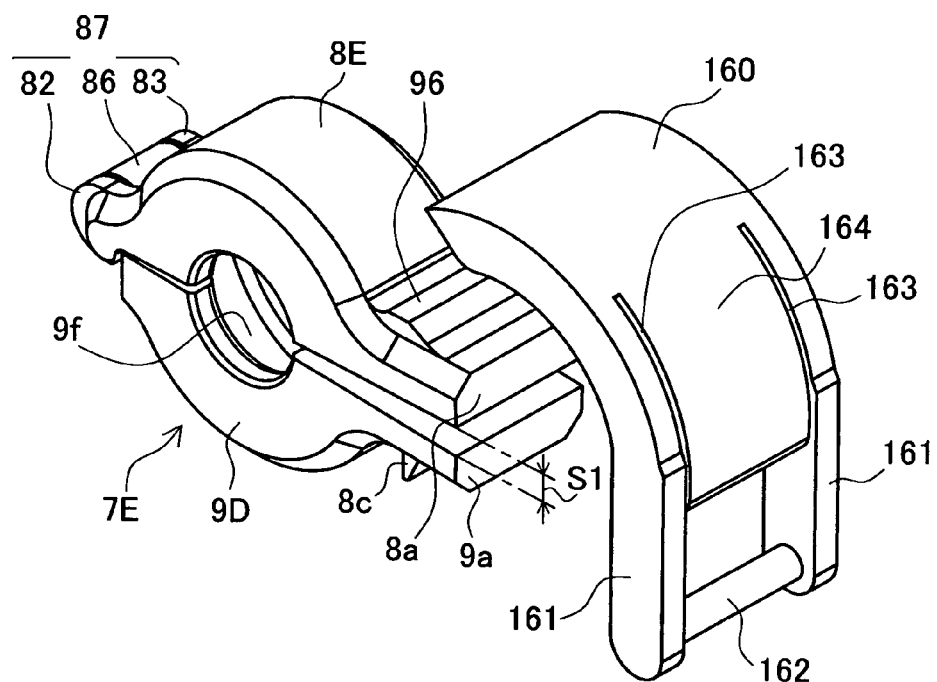
FIG. 40 is an external perspective view of a coupling member and a clamping member to be used in a fluid device connecting structure in a ninth embodiment according to the present invention.
Figure 41:
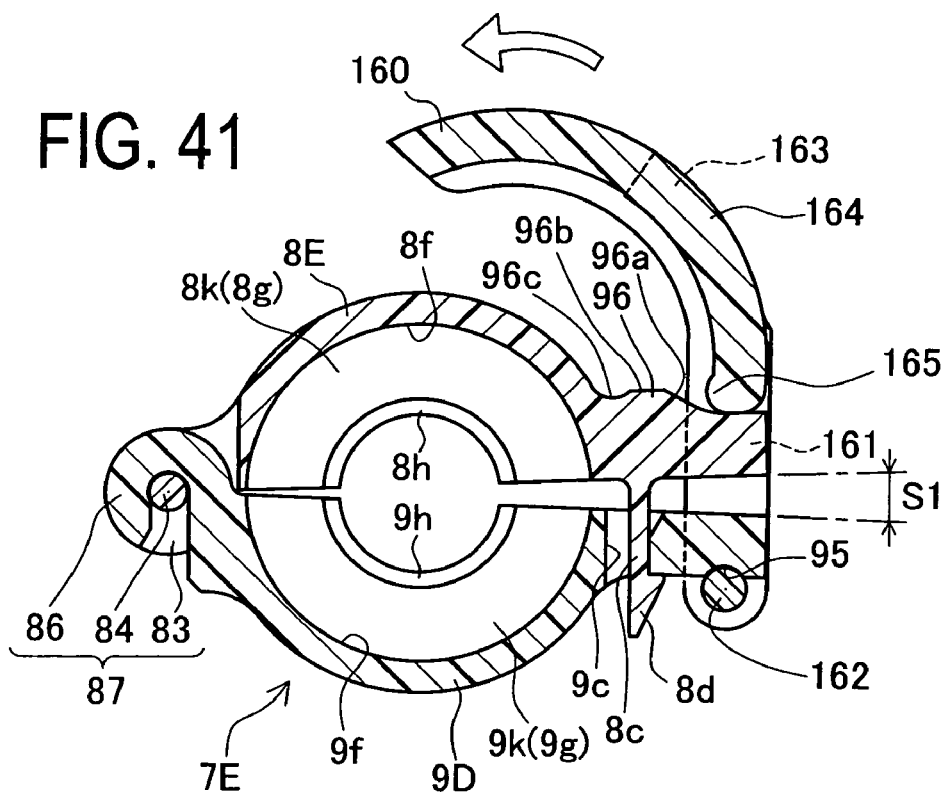
FIG. 41 is a sectional view to explain a process of attaching the clamping member of FIG. 40 to a coupling member, showing a state where the clamping member is disposed in an initial position.
Figure 42:
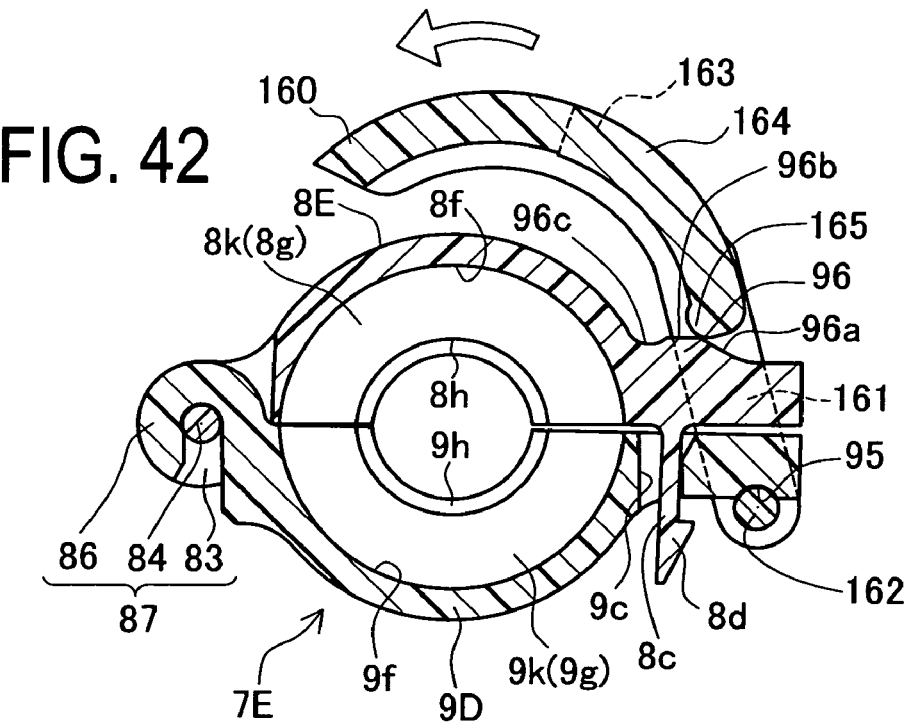
FIG. 42 is a sectional view to explain a process of attaching the clamping member of FIG. 40 to the coupling member, showing a state where the clamping member is disposed in a rotation inhibiting position.
Figure 43:
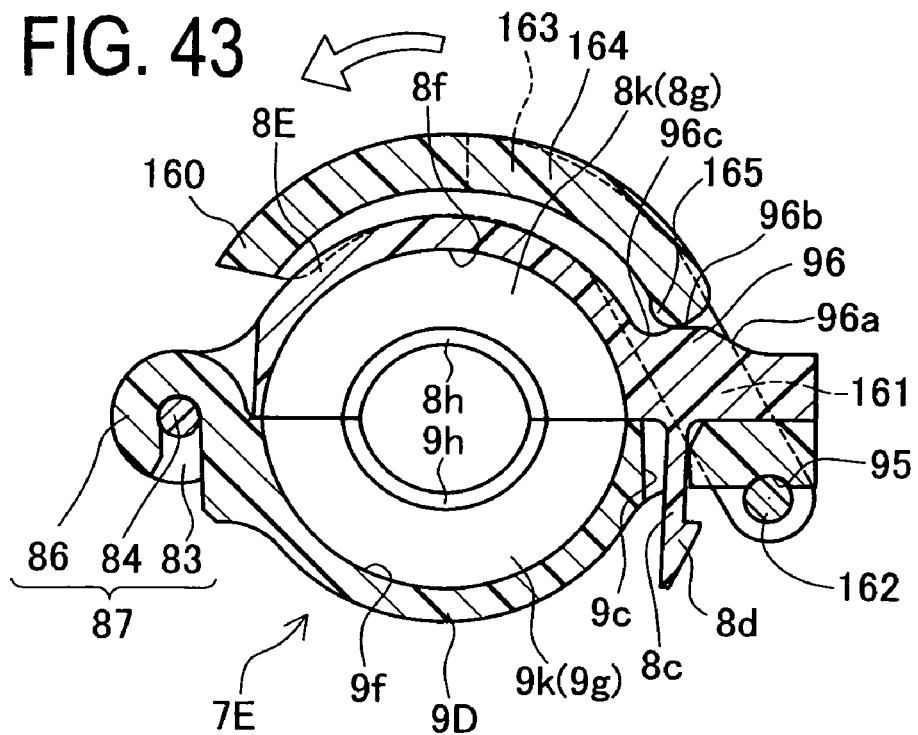
FIG. 43 is a sectional view to explain a process of attaching the clamping member of FIG. 40 to the coupling member, showing a state where the clamping member is disposed in a pressing start position.
Figure 44:
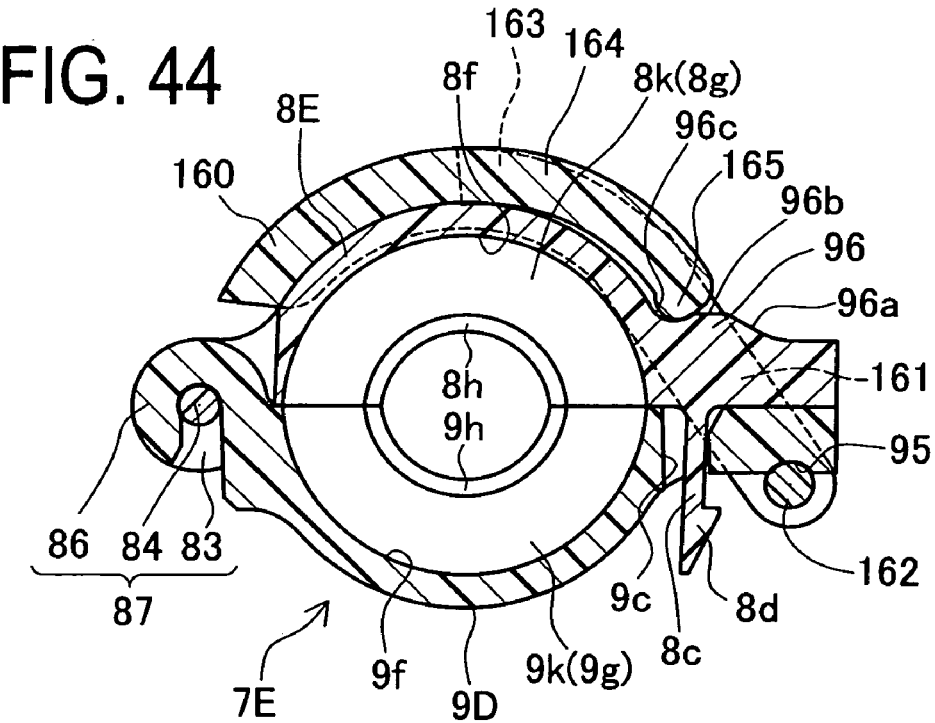
FIG. 44 is a sectional view to explain a process of attaching the clamping member of FIG. 40 to the coupling member, showing a state where the clamping member is disposed in a clamping force generating position.

A ninth embodiment of a fluid device connecting structure according to the present invention will be described below. FIG. 40 is an external perspective view of a coupling member 7E and a clamping member 160 to be used in a fluid device connecting structure of this embodiment. FIGS. 41 to 44 are sectional views to explain a process of attaching the clamping member 160 to the coupling member 7E. Specifically, FIG. 41 shows the clamping member 160 in an initial position; FIG. 42 shows the clamping member 160 in a rotation inhibiting position; FIG. 43 shows the clamping member 160 in a pressing start position; and FIG. 44 shows the clamping member 160 in a clamping force generating position.

The fluid device connecting structure of the ninth embodiment is identical in structure to that of the eighth embodiment excepting the coupling member 7E and the clamping member 160. Accordingly, the following explanation will be focused on differences from the eighth embodiment by using the same reference signs for the same or similar components as those of the eighth embodiment without their detailed explanation.

<Configuration of Coupling Member>

The coupling member 7E includes a first split member 8E provided with a cam portion 96 and rotatably connected with the second split member 9D through the rotatable connecting part 87. The extended portion 8a of the first split member 8E is formed with the cam portion 96 on a surface opposite a surface formed with the locking claw 8c.

The cam portion 96 is configured so that the extended portion 8a is pressed against the extended portion 9a when the clamping member 160 is rotated from the initial position shown in FIG. 41 to the clamping force generating position shown in FIG. 44. Furthermore, the cam portion 96 is also configured to press against the clamping member 160 placed in the clamping force generating position shown in FIG. 44 to thereby prevent the clamping member 160 from returning to the initial position. The cam portion 96 includes a cam face constituted of a slant surface 96a permitting rotation of the clamping member 160, a raised surface 96b which will cause resistance with respect to the clamping member 160, and a recessed surface 96c for holding the clamping member 160 in the clamping force generating position.

<Configuration of Clamping Member>

The clamping member 160 is made of resin and shaped in a circular arc form as shown in FIG. 40. The clamping member 160 includes support walls 161 on both side ends. These support walls 161 are formed to extend from the end of the clamping member 160. A support shaft 162 is attached extending between distal ends of the support walls 161. Accordingly, a space is provided between the clamping member 160, the support shaft 162, and the support walls 161 for allowing insertion of the extended portions 8a and 9a.

The clamping member 160 is formed with slits 163 extending from the end closer to the support shaft 162 to form a flexible piece 164 which is elastically deformable between the slits 163. A distal end of the flexible piece 164 is formed with a sliding protrusion 165 which slides in contact with the cam portion 96 as shown in FIGS. 41 to 44.

<Operations and Advantages of the Ninth Embodiment>

In the coupling member 7E shown in FIG. 40, the first split member 8E is rotated about the rotatable connecting part 87 serving as a supporting point toward the second split member 9D. The locking claw 8c is then inserted through the through hole 9c to engage the distal end 8d with the extended portion 9a as shown in FIG. 41. Thus, the coupling member 7E is mounted on the connecting portions of the first and second connection parts 4 and 5. The clamping member 160 will be attached to the coupling member 7E when the sealing strength of the connection parts 4 and 5 lowers.

As shown in FIG. 41, the clamping member 160 is set so that the extended portions 8a and 9a are inserted between the clamping member 160 and the support shaft 162. The support shaft 162 is then engaged in the groove 95 of the extended portion 9a. Thus, the clamping member 160 is disposed in place with respect to the coupling member 7E. The clamping member 160 is rotated toward the coupling member 7E about the support shaft 162 serving as a support shaft as indicated by an arrow in the figure.

At that time, the clamping member 160 is rotated with the sliding protrusion 165 held in contact with the slant surface 96a, and presses the extended portion 8a toward the extended portion 9a. The extended portion 8a comes closer to the extended portion 9a so as to eliminate the clearance S1.

When the sliding protrusion 165 passes the raised surface 96b as shown FIG. 43, the clamping member 160 causes resistance, thereby warping the flexible piece 164. The extended portion 8a is therefore placed into contact with the extended portion 9a with no clearance S1.

Successively, the clamping member 160 is further rotated as shown in FIG. 44 and the sliding protrusion 165 becomes engaged in the recessed surface 96c. Thus, the clamping member 160 is placed in the clamping force generating position. In this state, the flexible piece 164 warps with the sliding protrusion 165 being held in pressure contact between the raised surface 96b and the recessed surface 96c, thereby pressing the extended portion 8a against the extended portion 9a. The pressing force of the flexible piece 164 becomes largest when the sliding protrusion 165 is at an edge of the raised surface 96b (short of the recessed surface 96c) and becomes slightly smaller as soon as the sliding protrusion 165 starts to contact with the recessed surface 96c. Consequently, the clamping member 160 will not return from the clamping force generating position to the initial position.

In the fluid device connecting structure of the ninth embodiment, as mentioned above, the coupling member 7E has the cam portion 96 in the extended portion 8a which will come into pressure contact with the clamping member 160 when attached to the extended portions 8a and 9a and rotated to bring the extended portion 8a into contact with the extended portion 9a. The clamping member 160 includes the flexible piece 164 which is elastically deformable when slides in contact with the cam portion 96. Accordingly, such fluid device connecting structure can draw the first and second connection parts 4 and 5 to each other without using any special tool.

In the fluid device connecting structure of the ninth embodiment, furthermore, the clamping member 160 is attached rotatably to the connecting portions (i.e. the extended portions 8a and 9a) of the first and second split members 8E and 9D and the coupling member 7E includes the cam portion 96 in the first split member 8E to receive the repulsive force from the clamping member 160 when rotated to bring the first split member 8E into contact with the second split member 9D. Even when the first and second connection parts 4 and 5 and the coupling member 7E receive a force to separate the first and second split members 8E and 9D due to the thermal deformation, fluid pressure, and others, the fluid device connecting structure of the ninth embodiment can prevent the clamping member 160 from reversely rotating from the clamping force generating position to the initial position. Consequently, the clamping member 160 can be maintained in a state for enhancing the sealing strength.

The present invention may be embodied in other specific forms without departing from the essential characteristics thereof.

(1) For instance, in the aforementioned embodiments, the coupling member 7, 7A is constituted of two split members but may be three or more split members. The split members do not always have to be connected integrally by the connecting band 14 and may remain separate.

(2) For example, in the above embodiments, the first and second connection parts 4 and 5 are provided with the annular protrusions 4b and 5b respectively to form the circumferential grooves 11a and 11b in the seal member 6. To the contrary, the seal member may be formed with annular protrusions and accordingly the first and second connection parts may be formed with circumferential grooves which receive the annular protrusions. In this case, a press-fit allowance is preferably formed in each annular protrusion.

(3) In the first embodiment, the clamping member 10 is attached to the bolt holes 8b and 9b of the first and second split members 8 and 9 in the initial assembly state of the coupling member 7. Alternatively, the clamping member 10 may be attached to the bolt holes 8b and 9b if the first and second connection parts are creep deformed and hence the sealing strength has to be enhanced. This makes it possible to prevent the loss of the clamping member 10.

(4) In the aforementioned embodiments, the first and second split members 8 and 9 are connected by engagement between the locking claw 8c and the extended portion 9a, 72 and engagement between the first and second projecting protrusions 8e and 9d and the first and second recesses 8i and 9e. For this connection of the first and second split members 8 and 9, the first and second projecting portions 8e and 9d and the first and second recesses 8i and 9e may be replaced with an engagement configuration using a locking claw and an insertion hole. To form the coupling member by plural split members, each split member connected to another by a rotatable rod to form a chain configuration both ends of which are engaged by deformation of at least one end of them, thus constituting an annular coupling member.

(5) In the aforementioned embodiments, each of the first and second split members 8 and 9 has a semicircular outer shape. As an alternative, the first and second split members may be formed with a rectangular parallelepiped shape or others.

(6) In the aforementioned embodiments, the locking claw 8c is inserted in the through hole 9c and engaged with the extended portion 9a. The through hole 9c may be formed as a bottom-closed hole having an L-shaped section. As another alternative, a locking claw may be provided instead of the through hole 9c so that the locking claws are engaged with each other by being elastically deformed.

(7) The bottom face of the second positioning groove 113c of the fourth embodiment is polygonal but may be circular as viewed in cross-section of the rod member 113.

(8) The clamping member is not limited to a configuration to move the first and second split members 8 and 9 close to each other by a screw or cam structure to draw the first and second connection parts 4 and 5 to each other. For example, the clamping member may be a band, a frame, and others which can be attached on the outer periphery of the extended portions 8a and 9a of the first and second split members 8 and 9 after the members 8 and 9 are moved closer to each other by a jig to eliminate the clearance S1.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A fluid device connecting structure comprising:
   a first fluid device including a first connection part made of resin, a first passage having an open end in an end face of the first connection part, a seal groove formed in the end face of the first connection part around the open end of the first passage, and a first annular protrusion formed in the seal groove;
   a second fluid device including a second connection part made of resin, a second passage having an open end in an end face of the second connection part, a seal groove formed in the end face of the second connection part around the open end of the second passage, and a second annular protrusion formed in the seal groove;
   a resin seal member having an H-shaped section and including other grooves each configured to engage in a press-fit manner between the seal groove of the first connection part and the seal groove of the second connection part;
   a coupling member made of resin configured to couple the first connection part and the second connection part to each other so that the resin seal member is placed between the seal groove of the first connection part and the seal groove of the second connection part,
   wherein the first connection part and the second connection part are connected in such a manner that the first annular protrusion of the first connection part and the second annular protrusion of the second connection part are press-fit in the other grooves of the resin seal member using a jig including two pressurizing plates,
   the first connection part includes:
      a first mounting groove formed on an outer periphery of the first connection part and configured to receive one of the two pressurizing plates of the jig for pressing the first connection part toward the second connection part; and
      a first fitting groove formed between the first mounting groove and the end face of the first connection part, the first fitting groove being configured to receive the coupling member,
   the second connection part includes:
      a second mounting groove formed on an outer periphery of the second connection part and configured to receive the other of the two pressurizing plates of the jig for pressing the second connection part toward the first connection part; and
      a second fitting groove formed between the second mounting groove and the end face of the second connection part, the second fitting groove being configured to receive the coupling member,
   the coupling member includes a plurality of split members each including a first projecting portion held in contact with an end-face-side inside surface of the first fitting groove and a second projecting portion held in contact with an end-face-side inside surface of the second fitting groove, the first and second projecting portions being arranged at a predetermined distance, and
   an end-face-side inside surface of the first mounting groove and the end-face-side inside surface of the first fitting groove are parallel with the end face of the first connection part, and an end-face-side inside surface of the second mounting groove and the end-face-side inside surface of the second fitting groove are parallel with the end face of the second connection part.

2. The fluid device connecting structure according to claim 1, wherein
   each of the first and second fitting grooves is formed with a taper between a bottom surface of the first and second fitting grooves and the end-face-side inside surface of the first and second fitting grooves, and
   the coupling member is provided with a taper at each distal end of the first and second projecting portions so that each taper of the coupling member faces each taper of the first and second fitting grooves, and
   the fluid device connecting structure further includes a clamping member for bringing the plurality of split members close to each other so that each taper of the coupling member slides along each taper of the first and second fitting grooves to continuously generate a force to draw the first connection part and the second connection part to each other when a sealing strength of the first connection part and the second connection part lowers.

3. The fluid device connecting structure according to claim 2, wherein the coupling member has an attachment part in at least one of the plurality of split members, in which the clamping member is to be fitted, the clamping member includes a clip member to be fitted in the attachment part and held against rotation, a nut member threadedly mounted on the clip member, and a rotation inhibiting mechanism placed between the nut member and the clip member for inhibiting rotation of the nut member relative to the clip member.

4. The fluid device connecting structure according to claim 2, wherein the clamping member is rotatably attached to connecting portions of the plurality of split members, and the clamping member is formed with a cam part configured to receive a repulsive force of one of the plurality of split members when the one of the plurality of split members is brought into contact with an other of the plurality of split members by rotation of the clamping member.

5. The fluid device connecting structure according to claim 2, wherein the clamping member is rotatably attached to connecting portions of the plurality of split members, and the coupling member is formed with a cam part in one of the plurality of split members, the cam part being configured to receive a repulsive force of the one of the plurality of split members when the one of the plurality of split members is brought into contact with the other of the plurality of split members by rotation of the clamping member.

6. The fluid device connecting structure according to claim 1, wherein the coupling member is constituted of a first split member and a second split member and further includes a rotatable connecting part with which one end of the first split member is rotatably connected to an end of the second split member, an elastically deformable locking claw provided in the first split member, and a through hole formed in the second split member, the locking claw being configured to pass through the through hole by being elastically deformed and to return to an original shape to be engaged with an outer surface of the second split member around an open end of the through hole.

7. The fluid device connecting structure according to claim 6, wherein the rotatable connecting part is constituted of an engagement protrusion and an engagement recess formed in the first split member and an engagement protrusion and an engagement recess formed in the second split member, and when the engagement protrusion of the first split member is engaged in the engagement recess of the second split member and the engagement protrusion of the second split member is engaged in the engagement recess of the first split member, each engagement protrusion is constrained against an inner wall of each corresponding engagement recess.

8. The fluid device connecting structure according to claim 6, wherein the rotatable connecting part is constituted of a rotation shaft provided in the first split member and a rotatable engagement part provided in the second split member, the rotatable engagement part having a U-shape engageable with the rotation shaft, and the rotatable engagement part has an opening that opens opposite a surface of the second split member which will contact with the first split member.

\* \* \* \* \*

UNITED STATES PATENT AND TRADEMARK OFFICE
CERTIFICATE OF CORRECTION

PATENT NO. : 8,033,579 B2
APPLICATION NO. : 12/230401
DATED : October 11, 2011
INVENTOR(S) : Hideyuki Takeda et al.

It is certified that error appears in the above-identified patent and that said Letters Patent is hereby corrected as shown below:

ON THE TITLE PAGE

Item (73) Assignee: should read, CKD Corporation, ~~Kamaki-Shi (JP)~~ Komaki-Shi (JP)

Signed and Sealed this
Thirty-first Day of January, 2012

David J. Kappos
*Director of the United States Patent and Trademark Office*